US011981254B2

(12) United States Patent
Cobb et al.

(10) Patent No.: US 11,981,254 B2
(45) Date of Patent: May 14, 2024

(54) CONTROL OF HIGH VISIBILITY VEHICLE LIGHT COMMUNICATION SYSTEMS

(71) Applicant: ESS-HELP, INC., Houston, TX (US)

(72) Inventors: John Zachariah Cobb, Seabrook, TX (US); Daniel Anthony Tucker, Santee, CA (US); David M. Tucker, Katy, TX (US); Stephen T. Powers, Houston, TX (US); Austin Reece Tucker, Katy, TX (US); Kenneth E. Wagner, Broken Arrow, OK (US); Mike Incorvaia, Hendersonville, TN (US)

(73) Assignee: ESS-Help, Inc., Houston, TX (US)

( * ) Notice: Subject to any disclaimer, the term of this patent is extended or adjusted under 35 U.S.C. 154(b) by 0 days.

(21) Appl. No.: 17/499,593

(22) Filed: Oct. 12, 2021

(65) Prior Publication Data

US 2022/0063489 A1     Mar. 3, 2022

Related U.S. Application Data

(62) Division of application No. 16/820,500, filed on Mar. 16, 2020, now abandoned.

(60) Provisional application No. 62/825,537, filed on Mar. 28, 2019, provisional application No. 62/819,272, filed on Mar. 15, 2019.

(51) Int. Cl.
| | |
|---|---|
| *B60Q 1/52* | (2006.01) |
| *B60Q 1/00* | (2006.01) |
| *B60Q 1/38* | (2006.01) |
| *B60Q 1/46* | (2006.01) |
| *B60Q 3/80* | (2017.01) |
| *B60Q 9/00* | (2006.01) |

(Continued)

(52) U.S. Cl.
CPC .............. *B60Q 1/52* (2013.01); *B60Q 1/0023* (2013.01); *B60Q 1/38* (2013.01); *B60Q 1/46* (2013.01); *B60Q 3/80* (2017.02); *B60Q 9/00* (2013.01); *H05B 47/165* (2020.01); *H05B 47/17* (2020.01)

(58) Field of Classification Search
CPC ...... B60Q 1/0017; B60Q 1/0023; B60Q 1/26; B60Q 1/46; B60Q 1/50; B60Q 1/52; B60Q 3/80; B60Q 9/00; B60Q 9/004; B60Q 9/005; B60Q 9/006; H05B 47/165; H05B 47/17
See application file for complete search history.

(56) References Cited

U.S. PATENT DOCUMENTS

| | | |
|---|---|---|
| 3,553,644 A | 1/1971 | Elmer |
| 4,176,340 A | 11/1979 | Steinmeier |

(Continued)

FOREIGN PATENT DOCUMENTS

| | | |
|---|---|---|
| BG | 66564 B1 | 3/2017 |
| CN | 203273673 U | 11/2013 |

(Continued)

OTHER PUBLICATIONS

"99630 Strobe Power Module", , Publisher: http://www.grote.com/products/99630-alternating-x-pattern-led-strobe-lamp-kit-strobe-power-module/.

(Continued)

*Primary Examiner* — Jason M Crawford
(74) *Attorney, Agent, or Firm* — David G. Woodral; GableGotwals

(57) ABSTRACT

A system prevents activation of strobe lights on a vehicle in response to events calculated to indicate a nuisance activation. Directional strobing may be activated based on input from vehicles systems.

9 Claims, 32 Drawing Sheets

(51) Int. Cl.
  *H05B 47/165* (2020.01)
  *H05B 47/17* (2020.01)

(56) References Cited

U.S. PATENT DOCUMENTS

| | | | |
|---|---|---|---|
| 4,227,174 A | 10/1980 | Belcher et al. | |
| 4,357,594 A | 11/1982 | Ehrlich et al. | |
| 4,550,305 A | 10/1985 | Bookbinder | |
| 4,952,910 A | 8/1990 | Straten et al. | |
| 4,981,363 A | 1/1991 | Lipman | |
| 5,043,699 A | 8/1991 | Hayden | |
| 5,264,826 A | 11/1993 | Henderson et al. | |
| 5,374,920 A | 12/1994 | Evens | |
| 5,434,758 A | 7/1995 | Zeidler | |
| 5,481,243 A | 1/1996 | Lurie et al. | |
| 5,510,763 A | 4/1996 | Deckard et al. | |
| 5,515,026 A | 5/1996 | Ewert | |
| 5,519,389 A | 5/1996 | DeGunther et al. | |
| 5,646,385 A | 7/1997 | Bogovican et al. | |
| 5,736,925 A | 4/1998 | Knauff | |
| 5,775,712 A | 7/1998 | Link et al. | |
| 5,850,177 A | 12/1998 | Zimmerman | |
| 6,023,221 A * | 2/2000 | Michelotti | B60Q 1/52 340/471 |
| 6,025,775 A | 2/2000 | Erlandson | |
| 6,028,512 A | 2/2000 | Schropp et al. | |
| 6,078,145 A | 6/2000 | Tillinghast et al. | |
| 6,081,188 A | 6/2000 | Kutlucinar et al. | |
| 6,181,243 B1 | 1/2001 | Yang | |
| 6,229,438 B1 | 5/2001 | Kutlucinar et al. | |
| 6,323,766 B1 * | 11/2001 | Bartlett | B60Q 1/52 340/471 |
| 6,351,211 B1 | 2/2002 | Bussard | |
| 6,397,133 B1 | 5/2002 | van der Pol et al. | |
| 6,411,204 B1 | 6/2002 | Bloomfield et al. | |
| 6,420,799 B1 | 7/2002 | Sakamoto et al. | |
| 6,445,289 B1 | 9/2002 | Roberts | |
| 6,456,206 B1 | 9/2002 | Rocca et al. | |
| 6,515,584 B2 * | 2/2003 | DeYoung | B60Q 1/46 340/471 |
| 6,623,151 B2 | 9/2003 | Pederson | |
| 6,674,182 B2 | 1/2004 | Maynard et al. | |
| 6,744,359 B1 | 6/2004 | Wasilewski et al. | |
| 6,842,111 B1 | 1/2005 | Smithson | |
| 6,858,986 B2 | 2/2005 | Monk | |
| 6,879,251 B2 | 4/2005 | Robbins et al. | |
| 6,922,137 B1 * | 7/2005 | Bycroft | B60Q 1/52 340/426.25 |
| 7,046,160 B2 | 5/2006 | Pederson et al. | |
| 7,119,672 B2 | 10/2006 | Subbaraman | |
| 7,150,554 B2 | 12/2006 | Calderas | |
| 7,199,704 B2 | 4/2007 | Herrig et al. | |
| 7,404,372 B2 * | 7/2008 | Aasgaard | B60Q 1/52 340/471 |
| 7,455,139 B2 | 11/2008 | Lee | |
| 7,834,751 B2 | 11/2010 | Tewari | |
| 7,852,203 B2 | 12/2010 | Herrig et al. | |
| 7,961,086 B2 | 6/2011 | Bradley | |
| 8,049,610 B2 | 11/2011 | Malik | |
| 8,319,662 B1 | 11/2012 | Bontemps et al. | |
| 8,393,750 B2 | 3/2013 | Clement | |
| 8,398,284 B1 | 3/2013 | Dvorzsak | |
| 8,405,498 B1 * | 3/2013 | Smith | B60Q 1/54 340/471 |
| 8,415,901 B2 | 4/2013 | Recker et al. | |
| 8,669,853 B1 | 3/2014 | Gardner | |
| 8,903,617 B2 | 12/2014 | Braunberger et al. | |
| 9,333,913 B1 | 5/2016 | Elders et al. | |
| 9,481,331 B1 * | 11/2016 | Tucker | B60R 16/0231 |
| 9,494,940 B1 | 11/2016 | Kentley | |
| 9,616,810 B1 * | 4/2017 | Tucker | B60R 16/0231 |
| 9,643,533 B1 | 5/2017 | Houss | |
| 9,679,487 B1 | 6/2017 | Hayward | |
| 10,055,985 B1 | 8/2018 | Hayward | |
| 10,124,757 B1 * | 11/2018 | Kerr | B60Q 7/00 |
| 10,127,813 B2 | 11/2018 | Walsh et al. | |
| 10,173,674 B2 | 1/2019 | Bidner | |
| 10,185,327 B1 | 1/2019 | Konrardy et al. | |
| 10,217,357 B1 * | 2/2019 | Elsheemy | G08G 1/0112 |
| 10,351,050 B1 | 7/2019 | Elwell | |
| 10,598,332 B1 | 3/2020 | Elwell | |
| 10,870,390 B2 | 12/2020 | Tucker et al. | |
| 10,891,858 B2 | 1/2021 | Walsh | |
| 11,021,117 B2 | 6/2021 | Tucker et al. | |
| 11,135,968 B2 | 10/2021 | Cobb et al. | |
| 2002/0000912 A1 | 1/2002 | DeYoung | |
| 2002/0036908 A1 | 3/2002 | Pederson | |
| 2002/0078879 A1 | 6/2002 | Wood | |
| 2002/0105432 A1 | 8/2002 | Pederson et al. | |
| 2003/0001728 A1 | 1/2003 | Flick | |
| 2003/0132852 A1 | 7/2003 | Povey et al. | |
| 2004/0100373 A1 | 5/2004 | Ponziani | |
| 2004/0257214 A1 | 12/2004 | Smithson | |
| 2005/0018444 A1 | 1/2005 | Todd | |
| 2005/0063194 A1 | 3/2005 | Lys et al. | |
| 2005/0072350 A1 * | 4/2005 | Aasgaard | B60Q 1/52 340/471 |
| 2005/0096798 A1 | 5/2005 | Bowman | |
| 2005/0099286 A1 * | 5/2005 | DeYoung | B60Q 1/46 340/463 |
| 2005/0134448 A1 | 6/2005 | Perlman et al. | |
| 2005/0174227 A1 | 8/2005 | Bolander et al. | |
| 2005/0237219 A1 | 10/2005 | Pederson | |
| 2006/0022520 A1 | 2/2006 | Matheny | |
| 2006/0043433 A1 | 3/2006 | Matsushita | |
| 2006/0103543 A1 | 5/2006 | Chen et al. | |
| 2006/0125616 A1 | 6/2006 | Song | |
| 2006/0209547 A1 | 9/2006 | Biondo et al. | |
| 2007/0142977 A1 | 6/2007 | Munoz | |
| 2007/0159319 A1 | 7/2007 | Maldonado | |
| 2007/0194905 A1 | 8/2007 | Herrig et al. | |
| 2008/0023253 A1 * | 1/2008 | Prost-Fin | B62D 1/06 701/41 |
| 2008/0100432 A1 | 5/2008 | Hoffman | |
| 2008/0218329 A1 | 9/2008 | Fan et al. | |
| 2009/0009315 A1 | 1/2009 | Liu et al. | |
| 2009/0045754 A1 | 2/2009 | Jozwik | |
| 2009/0219150 A1 * | 9/2009 | DeYoung | B60Q 1/46 340/471 |
| 2009/0322508 A1 | 12/2009 | Malik | |
| 2010/0109859 A1 | 5/2010 | Lakosky | |
| 2010/0134271 A1 | 6/2010 | Edwards et al. | |
| 2010/0225465 A1 | 9/2010 | Ekchian et al. | |
| 2010/0253499 A1 | 10/2010 | Haab et al. | |
| 2011/0063129 A1 | 3/2011 | Stahlin | |
| 2011/0187518 A1 * | 8/2011 | Strumolo | B62D 15/029 340/438 |
| 2011/0196566 A1 | 8/2011 | Slater | |
| 2011/0205521 A1 | 8/2011 | Mimeault et al. | |
| 2012/0043888 A1 | 2/2012 | Salter et al. | |
| 2012/0185130 A1 * | 7/2012 | Ekchian | B60Q 1/444 701/36 |
| 2012/0268262 A1 | 10/2012 | Popovic | |
| 2012/0313792 A1 | 12/2012 | Behm et al. | |
| 2013/0054087 A1 | 2/2013 | Mohamed | |
| 2013/0057160 A1 | 3/2013 | Adams et al. | |
| 2013/0093582 A1 | 4/2013 | Walsh et al. | |
| 2013/0141251 A1 | 6/2013 | Sims et al. | |
| 2013/0190985 A1 | 7/2013 | Nakano et al. | |
| 2013/0229289 A1 | 9/2013 | Bensoussan et al. | |
| 2014/0055619 A1 | 2/2014 | Holland et al. | |
| 2014/0109719 A1 * | 4/2014 | Lisseman | B62D 1/06 74/552 |
| 2014/0111324 A1 * | 4/2014 | Lisseman | B60Q 3/283 74/552 |
| 2014/0111325 A1 * | 4/2014 | Lisseman | B62D 1/06 340/435 |
| 2014/0146552 A1 | 5/2014 | Hui | |
| 2014/0149025 A1 | 5/2014 | Fazi | |
| 2014/0266658 A1 | 9/2014 | Feldman | |
| 2014/0300462 A1 | 10/2014 | Russ | |
| 2014/0301101 A1 * | 10/2014 | Russ | B60Q 1/52 362/520 |

(56) References Cited

U.S. PATENT DOCUMENTS

| | | | |
|---|---|---|---|
| 2014/0306826 A1* | 10/2014 | Ricci | G01C 21/26 340/573.1 |
| 2014/0309855 A1 | 10/2014 | Tran | |
| 2014/0350837 A1 | 11/2014 | Galbas et al. | |
| 2014/0361686 A1 | 12/2014 | Wolfe | |
| 2014/0368324 A1* | 12/2014 | Seifert | B60Q 1/46 340/435 |
| 2014/0375810 A1* | 12/2014 | Rodriguez | B60Q 1/525 348/148 |
| 2015/0061492 A1 | 3/2015 | Braunberger | |
| 2015/0061895 A1* | 3/2015 | Ricci | B60K 28/00 340/902 |
| 2015/0088397 A1 | 3/2015 | Burton | |
| 2015/0116133 A1 | 4/2015 | Mawbey et al. | |
| 2015/0127212 A1 | 5/2015 | Chacon et al. | |
| 2015/0151671 A1 | 6/2015 | Refior et al. | |
| 2015/0179066 A1 | 6/2015 | Rider et al. | |
| 2015/0314723 A1* | 11/2015 | Ghiata | B60Q 1/46 340/471 |
| 2016/0039336 A1 | 2/2016 | Nordstrom et al. | |
| 2016/0098369 A1 | 4/2016 | Berkobin | |
| 2016/0144778 A1* | 5/2016 | Tucker | B60Q 1/46 340/471 |
| 2016/0152176 A1 | 6/2016 | Kang | |
| 2016/0257243 A1 | 9/2016 | Son et al. | |
| 2016/0339837 A1 | 11/2016 | Bolduc et al. | |
| 2016/0355123 A1 | 12/2016 | Oooka | |
| 2017/0072835 A1 | 3/2017 | Shank et al. | |
| 2017/0080850 A1 | 3/2017 | Drexler et al. | |
| 2017/0124876 A1 | 5/2017 | Rogers | |
| 2017/0243450 A1 | 8/2017 | Keller et al. | |
| 2017/0246987 A1* | 8/2017 | Liljestrand | B60Q 1/54 |
| 2017/0259734 A1 | 9/2017 | Imaishi et al. | |
| 2017/0274816 A1 | 9/2017 | Zhao | |
| 2017/0274819 A1 | 9/2017 | Domingo | |
| 2017/0305349 A1 | 10/2017 | Naboulsi | |
| 2017/0351266 A1 | 12/2017 | Nickolaou | |
| 2017/0352274 A1 | 12/2017 | Kodama et al. | |
| 2017/0364070 A1 | 12/2017 | Oba | |
| 2018/0056857 A1 | 3/2018 | Natale et al. | |
| 2018/0061225 A1 | 3/2018 | Miglianico | |
| 2018/0094777 A1 | 4/2018 | Vargas-Chambers | |
| 2018/0208111 A1* | 7/2018 | Lisseman | G02B 6/0036 |
| 2018/0281782 A1* | 10/2018 | Salter | B60W 30/08 |
| 2018/0304886 A1 | 10/2018 | Tannenbaum | |
| 2019/0176639 A1 | 6/2019 | Kumar et al. | |
| 2019/0202476 A1 | 7/2019 | Tao et al. | |
| 2019/0210515 A1* | 7/2019 | Aust | B60Q 1/381 |
| 2019/0234601 A1* | 8/2019 | Wescott | B60Q 1/54 |
| 2019/0243364 A1 | 8/2019 | Cohen | |
| 2019/0248278 A1 | 8/2019 | Salter et al. | |
| 2019/0248364 A1 | 8/2019 | Dastgir et al. | |
| 2019/0275935 A1* | 9/2019 | Lisseman | B60Q 3/80 |
| 2019/0279447 A1* | 9/2019 | Ricci | A61B 5/4809 |
| 2019/0283693 A1* | 9/2019 | Tucker | B60R 16/0231 |
| 2019/0359125 A1 | 11/2019 | Nagata | |
| 2019/0361453 A1 | 11/2019 | Kentley-Klay et al. | |
| 2020/0094734 A1* | 3/2020 | King | B60Q 1/543 |
| 2020/0189446 A1* | 6/2020 | Tucker | F21V 23/0407 |
| 2020/0189453 A1* | 6/2020 | Tucker | F21V 23/0407 |
| 2020/0236745 A1 | 7/2020 | Garrett et al. | |
| 2020/0290507 A1* | 9/2020 | Cobb | B60Q 1/38 |
| 2021/0049909 A1 | 2/2021 | Tucker et al. | |
| 2021/0056842 A1 | 2/2021 | Walsh et al. | |
| 2021/0253023 A1* | 8/2021 | Tucker | B60Q 1/52 |
| 2021/0331619 A1* | 10/2021 | Cobb | B60Q 1/38 |
| 2022/0051340 A1 | 2/2022 | Rose et al. | |
| 2022/0063489 A1* | 3/2022 | Cobb | B60Q 9/00 |
| 2022/0126769 A1* | 4/2022 | Tucker | B60R 16/0231 |
| 2023/0298465 A1 | 9/2023 | Walsh et al. | |

FOREIGN PATENT DOCUMENTS

| | | |
|---|---|---|
| CN | 105423220 A | 3/2016 |
| CN | 106852137 A | 6/2017 |
| CN | 107650778 A | 2/2018 |
| CN | 110949241 A | 4/2020 |
| CN | 111216624 A | 6/2020 |
| DE | 19507433 A1 | 6/1996 |
| DE | 10010172 A1 | 9/2000 |
| DE | 10218652 A1 | 11/2003 |
| DE | 102009051837 A1 | 5/2011 |
| DE | 202011103598 U1 | 10/2011 |
| DE | 102015205368 A1 | 9/2016 |
| DE | 102015215766 A1 | 2/2017 |
| DE | 202017100790 U1 | 3/2017 |
| DE | 202016007685 U1 | 4/2018 |
| DE | 102017215865 A1 | 3/2019 |
| DE | 102018128565 A1 | 5/2020 |
| EP | 2827250 A2 | 1/2015 |
| EP | 3178698 A1 | 6/2017 |
| EP | 3287320 A1 | 2/2018 |
| EP | 3702213 A1 | 9/2020 |
| FR | 2833903 | 6/2003 |
| FR | 3056801 A1 | 3/2018 |
| GB | 2483071 A | 2/2012 |
| JP | H00439939 U | 4/1992 |
| JP | 2002274295 A | 9/2002 |
| JP | 2003-205782 | 7/2003 |
| JP | 2005170311 A | 6/2005 |
| JP | 2006069245 | 3/2006 |
| JP | 4485901 B2 | 4/2006 |
| JP | 2006111031 A | 4/2006 |
| JP | 2006182172 A | 7/2006 |
| JP | 2009012554 A | 1/2009 |
| JP | 2011189776 A | 9/2011 |
| JP | 2013-86657 | 5/2013 |
| JP | 2013133071 A | 7/2013 |
| JP | 2014201298 A | 10/2014 |
| JP | 2015009647 A | 1/2015 |
| JP | 2015-44491 | 3/2015 |
| JP | 2015536569 A | 12/2015 |
| JP | 2016222171 A | 12/2016 |
| JP | 2018020751 A | 2/2018 |
| JP | 6561286 B1 | 8/2019 |
| JP | 2019206225 A | 12/2019 |
| JP | 2020090183 A | 6/2020 |
| KR | 2019970032975 U | 7/1997 |
| KR | 2019980031131 | 8/1998 |
| KR | 1020030015908 | 2/2003 |
| KR | 100500669 B1 | 7/2005 |
| KR | 100656243 B1 | 12/2006 |
| KR | 1020120048948 | 5/2012 |
| KR | 1020120106036 | 9/2012 |
| KR | 1020150110986 A | 10/2015 |
| KR | 1020160063729 A | 6/2016 |
| KR | 200484734 Y1 | 11/2017 |
| KR | 1020180108943 | 10/2018 |
| SI | 25623 A | 10/2019 |
| TW | 202022812 A | 6/2020 |
| TW | 202041101 A | 11/2020 |
| WO | 9227078 A1 | 7/1997 |
| WO | 0100446 A1 | 1/2001 |
| WO | 2004018256 A1 | 3/2004 |
| WO | 2008056186 A1 | 5/2008 |
| WO | WO2011154691 A1 | 12/2011 |
| WO | 2016027312 A1 | 2/2016 |
| WO | WO2016118575 A1 | 7/2016 |
| WO | 2017062055 A1 | 4/2017 |
| WO | 2018063253 A1 | 4/2018 |
| WO | 2020096060 A1 | 5/2020 |

OTHER PUBLICATIONS

"Amber Vehicle Car Truck Emergency Hazard Warning", , Publisher: www.amazon.com/Vehicle-Emergency-Hazard-Warning-Strobe/dp/B00MA7744G#productDetails.

"Brake Light Strobe Module", , Publisher: https://www.superbrightleds.com/moreinfo/strobe-controllers/brake-light-strobe-module/195/.

(56) References Cited

OTHER PUBLICATIONS

Chris Davies, "Inside Cadillac's early bet on Vehicle-to-Vehicle tech", Inside Cadillac's early bet on Vehicle-to- Vehicle tech, Mar. 10, 2017, Publisher: https://www.slashgear.com/inside-cadillacs-early-bet-on-v2v-vehicle-to-vehicle-tech-10478130/.
EPO, "EPO Search Report for EPO App. No. 16917956-1 dated May 13, 2020", Extended European Search Report prepared for EPO Application No. 16917956.1 dated May 13, 2020, dated May 13, 2020, Publisher: European Patent Office.
"European Search Report dated Oct. 2, 2019 prepared for EPO Appl. No. EP19181421".
"Extended European Search Report", dated Jan. 12, 2018.
"ELFR-1 QD Electronic LED Flasher Relay With Quick Disconnects", , Publisher: www.customled.com/products/elfr-1-qd-electronic-led-flasher-relay.
"ELFR-P Programmable Electronic LED Flasher With OEM Connector", , Publisher: www.customled.com/products/elfr-p-led-flasher-relay.
"Flashing Brakes Lights Make a Difference—Look at The Facts", , Publisher: http://www.flashingbrakelights.com/.
"Flashing LED Brake Lights", , Publisher: http://www.ebay.com/bhp/flashing-led-brake-lights.
"V2V Safety Technology Now Standard on Cadillace CTS Sedans video", , Publisher: https://media.chevrolet.com/media/ca/en/cadillac/bcportal.html/currentVideoId/5353289496001/pnId/0/typeId/c/currentChannelId/Most%20Recent.html.
"How to Change Hazard Flashers to STrobe Flashers—Chevy Blazer Forums", , Publisher: http://blazerforum.com/forum/2nd-gen-s-series-1995-2005-tech-41/how-change-hazard-flashers-strobe-flashers-62080/.
"Intelligent Flashing LED Brake Lights (See How They Work)", , Publisher: http://safelightstore.com/.
Kelley Blue Book, "2017 Cadillac CTS Sedan Adds V2V Capability", Mar. 10, 2017, Publisher: https://www.kbb.com/car-news/2017-cadillac-cts-sedan-adds-v2v-capability/.
"ELFR-1 Electronic LED Flasher Relay With OEM Connector", , Publisher: www.customled.com/products/elfr-1-electronic-led-flasher-relay.
"Motorcycle Run Brake Turn Conversion Kit", , Publisher: http://www.customdynamics.com/tailconversion_kit.htm.
Christianson et al., "Workzone Safety Improvements through Enhanced Warning Signal Devices", https://escholarship.org/content/qt6nm2g4tg/qt6nm2g4tg.pdf, , Publisher: University of California, Berkeley 2008, Published In: US.
ISA/US, "International Search Report for PCT/US2016/054489", dated Dec. 29, 2016.
PCT/ISA/US, "PCT International Search Report for PCT/US2016/015125", dated Mar. 31, 2016.
Speed Turtle Engineering LLC, "Easy Flash Module User Manual", 00/00/2016, pp. 1-10, vol. 1.4.
Speed Turtle Engineering LLC, "Easy Flash Module 2.0 User Manual", 00/00/2019, pp. 1-15, vol. 1.3.
Speed Turtle Engineering LLC, "Easy Flash Module 3.0 User Manual", 00/00/2020, pp. 1-16, vol. 1.4.
"10 Car Options the Law Won't Let You Have: Strobe Brake Lights", , Publisher: http://www.popularmechanics.com/cars/news/industry/10-car-options-the-law-wont-let-you-have-4#/slide-4.
"Vehicle Brake Light Flasher Module Safety Flash Light Alert", , Publisher: http://www.amazon.com/Vehicle-Flasher-Module-Safety-Universal/dp/B00FADDOL4.

\* cited by examiner

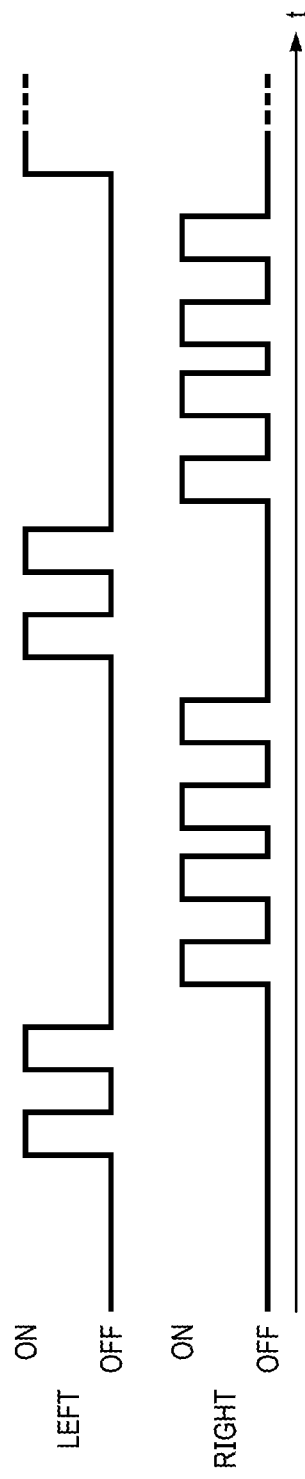
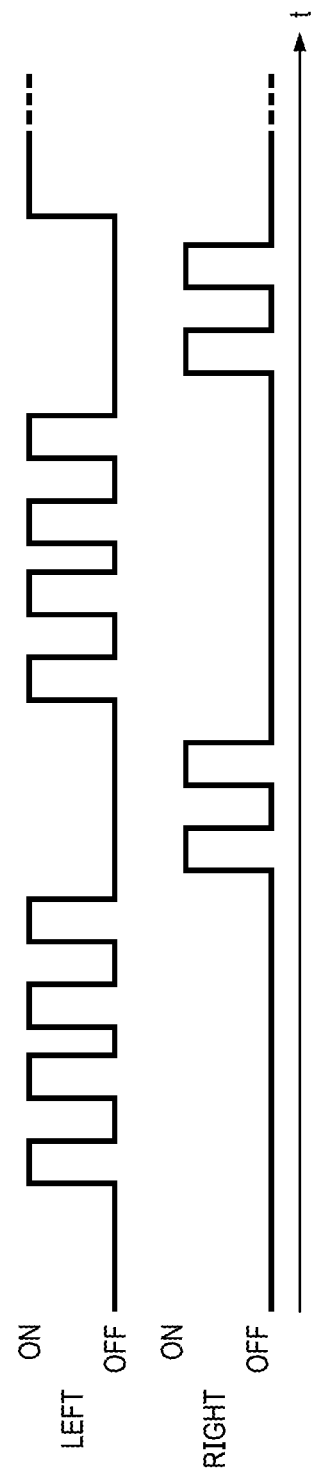

CONTROL OF HIGH VISIBILITY VEHICLE LIGHT COMMUNICATION SYSTEMS

CROSS-REFERENCE TO RELATED CASES

This application is a divisional of U.S. patent application Ser. No. 16/820,500 entitled CONTROL OF HIGH VISIBILITY VEHICLE LIGHT COMMUNICATION SYSTEMS filed on Mar. 16, 2020 which claims the benefit of U.S. provisional patent application Ser. No. 62/819,272, filed on Mar. 15, 2019 entitled CONTROL OF HIGH VISIBILITY VEHICLE LIGHT COMMUNICATION SYSTEMS and U.S. provisional patent application Ser. No. 62/825,537, filed on Mar. 28, 2019 entitled DIRECTIONAL CONTROL OF HIGH VISIBILITY VEHICLE LIGHT COMMUNICATION SYSTEMS, and incorporates such provisional applications by reference into this disclosure as if fully set out at this point.

FIELD OF THE INVENTION

This disclosure relates to emergency or hazard lights for automobiles, RVs, trailers, motorcycles and vehicles in general, and, more particularly, to emergency or hazard lights that strobe and give visual direction for increased safety and visibility. Even more particularly, this disclosure relates to systems and methods for convenient and safe deployment of enhanced vehicle emergency and hazard lighting systems.

BACKGROUND OF THE INVENTION

For non-emergency vehicles (e.g., passenger cars) standard emergency or hazard flasher lights provide a relatively low amount of visual distinction compared with non-emergency lighting (e.g., headlights, daytime running lights, signal lights etc.). Solutions have been provided in the art including high visibility strobing systems such as those described in U.S. Pat. No. 9,481,331 to Tucker et al.

In some cases, a user of a vehicle that is so equipped, may inadvertently deploy a high visibility emergency strobe, or may deploy a high visibility strobe when conditions are not warranted. Over use of high visibility strobes could have the effect of desensitizing the driving public over time. In the short term, deployment of a high visibility strobe may represent a distraction when a genuine emergency does not exist.

What is needed is a system and method for addressing the above and related problems.

SUMMARY OF THE INVENTION

The invention of the present disclosure, in one aspect thereof, comprises a system having a microcontroller having operational control over a set of vehicle lights corresponding to left and ride sides of the vehicle, and a plurality of sensors associated with the vehicle and configured to provide data to the microcontroller indicative of whether the vehicle is nearer the left or right side of a roadway on which the vehicle was travelling. The microcontroller receives a request to strobe lights associated with the vehicle it strobes the set of vehicles light from right to left if the vehicle is within a first predetermined distance of a right side of the roadway. When the microcontroller receives a request to strobe lights associated with the vehicle it strobes the set of vehicle lights from left to right if the vehicle is within a second predetermined distance of a left side of the roadway.

In some embodiments, when the microcontroller receives a request to strobe lights associated with the vehicle it strobes the set of vehicle lights in a non-directional manner if the vehicle is outside of a third predetermined distance of the right or left sides of the roadway. The plurality of sensors may include a GPS sensor and/or a camera. The system may include a sensor in communication with the microcontroller indicating whether the vehicle is facing an incorrect direction on the roadway. The sensor in communication with the microcontroller indicating whether the vehicle is facing an incorrect direction on the roadway may comprise an accelerometer, a compass, a camera, and/or a radar.

The invention of the present disclosure, in another aspect thereof, comprises a system having a microcontroller with operational control over a set of vehicle lights corresponding to left and ride sides of the vehicle, and a plurality of sensors associated with the vehicle and configured to provide data to the microcontroller indicative of an operational state of the vehicle. When the microcontroller receives a request to strobe lights associated with the vehicle it strobes the lights when it determines, based on data from the plurality of sensors, that the vehicle is in a distressed state.

A distressed state may be indicated by airbag deployment, ABS deployment, a rollover event, and/or activation of a traction control system. In some embodiments, the microcontroller strobes the lights when it determines, based on data from the plurality of sensors, that the vehicle was in a distressed state within a predetermined time frame.

In some embodiments, the microcontroller flashes the lights associated with the vehicle when it receives a request to strobe lights associated with the vehicle, but the vehicle is in a non-distressed state based on data from the plurality of sensors. Indicators of a non-distressed state may include activation of cruise control, a vehicle speed over a predetermined limit, a phone call to a non-emergency number, and/or an excessive entertainment system volume.

BRIEF DESCRIPTION OF THE DRAWINGS

FIG. 17 is a timing diagram showing on and off states for left and right signal lamps over time in a left to right signaling pattern.

FIG. 18 is a timing diagram showing on and off states for left and right signal lamps over time in a right to left signaling pattern.

DETAILED DESCRIPTION OF THE PREFERRED EMBODIMENTS

Figure 1:
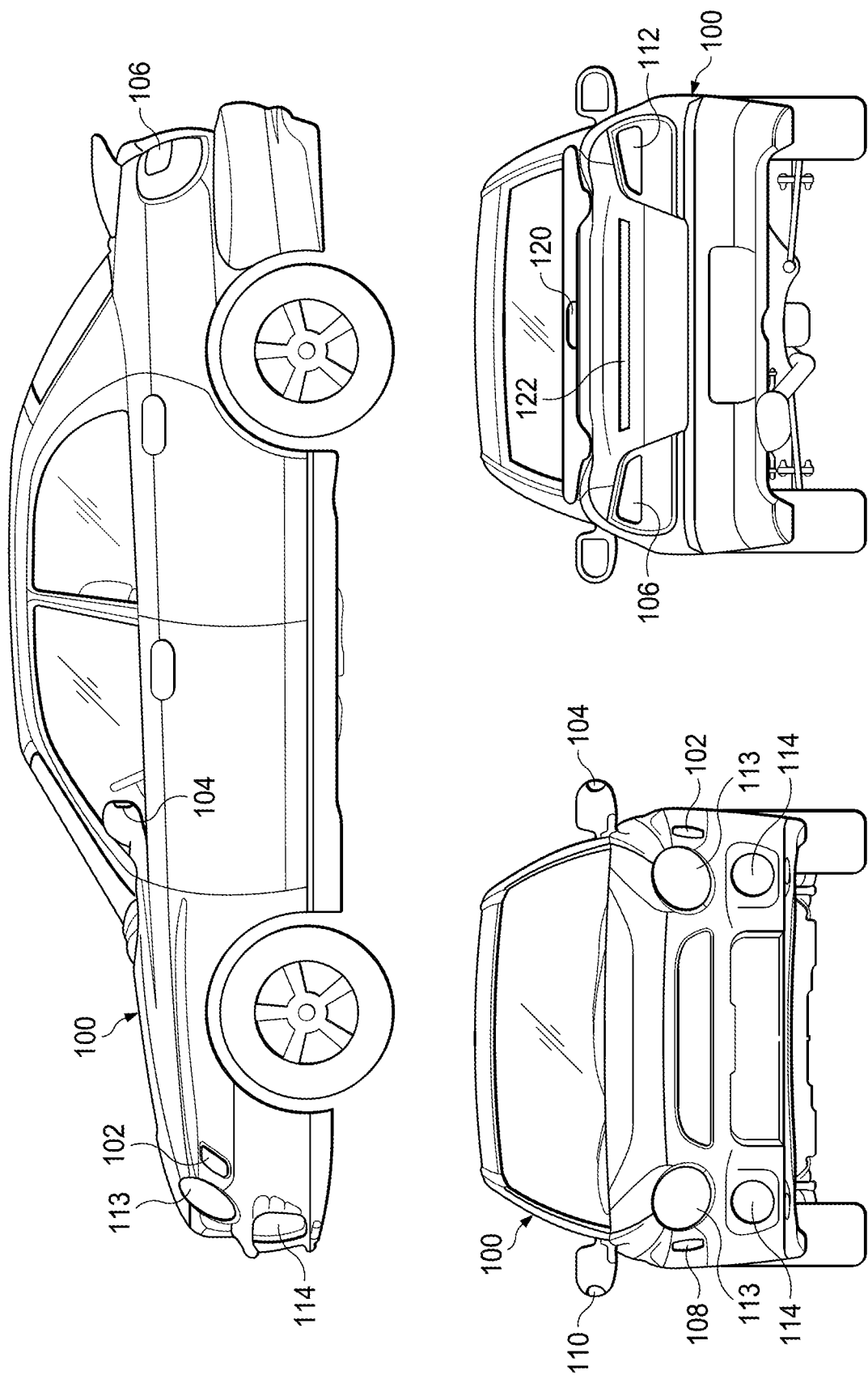
FIG. 1 illustrates an exemplary placement of signal indicators and hazard flashers on a typical vehicle.

In various embodiments of the present disclosure, devices and systems are implemented that provide enhanced visual communication cues via existing or replacement signal and/or hazard lights on an automobile. Signal and hazard lights in most cars cycle between light and dark at a rate between once and twice per second or 1-2 Hz. Such a rate is believed to be adequate for signaling lane changes and other non-emergency situations. However, existing cars and hazard light flasher systems do not take in to account the need for, and benefit of, communicating an emergency situation utilizing an enhanced flash rate. A vehicle traveling 70 miles per hour will travel over 50 feet before a 2 Hz cycle has completed one time. This distance can mean the difference between an accident and a close call. Further, reaction time and ability to maneuver or stop must be taken into account. The quicker a driver takes notice of a problem, the more likely he or she can still have time to avoid a serious accident.

For purposes of the present disclosure, an enhanced flash rate is one that is perceptibly altered, or has at least a component of the flashing cycle that is increased in flashing speed, from the high end of the normal flash rate of about 2 Hz. Such flash rate may be referred to as a "strobe" instead of a flash or signal for purposes of the present disclosure. In some embodiments, a strobe has a cycle rate of 3 Hz or above (although slower rates may still be considered "enhanced" or "strobing" so long as there is a perceptible increase in rate over that of a typical signal light). In other embodiments, the strobe rate is 4 Hz or above, representing a doubling of the fastest typical vehicle signal light or hazard light flash rate. It is believed that the faster a light strobes with adequate delineation and contrast between light and dark periods, the more attention grabbing the light is perceived to be. Accordingly, in another embodiment, the strobe rate is 6 Hz, or a factor of three faster than the fastest flash rate expected to be encountered from a standard signal or hazard light. In further embodiments, the strobe rate is 8 Hz or above.

It should be understood that lighting patterns may be produced that comprise strobed illumination (e.g., light and dark cycles repeating at 2 Hz or more) interspersed with longer dark or non-illuminated periods. For purposes of the present disclosure, the term strobe encompasses patterns of flashing lights, part of which are strobing per the definition above, and part of which may be dark or non-illuminated, steady state illuminated (at full or partial maximum output), or flashed at a rate that is slower than a strobe. The term strobe should also be understood to encompass patterns that contain strobing portions of varying frequency. A non-limiting example of such a pattern would start flashing at 2 Hz and increase over time to 8 Hz or more before repeating or moving to another pattern. It should also be understood that, in various embodiments of the present disclosure, signal lights (e.g., left and right signal) are maintained at the normal 1-2 Hz, while emergency or hazard flashers are deployed at a strobing rate or in a strobing pattern. Moreover, as described in detail below, a normal slower flash rate may be optionally available when the hazard flashers are deployed.

Emergency vehicles have been quipped for many years with brightly and rapidly cycling lighting systems. These have been based on complex mechanical systems involving rotating reflectors and the like that increase apparent flash rate beyond what is normally achievable with traditional incandescent based circuitry. Unfortunately, such systems were specialized add on equipment to the basic underlying vehicle, and not normally available or cost effective for the general public to utilize, even for legitimate purposes. Newer systems based on light emitting diodes (LEDs) are available but, again, are specialized equipment, typically added to a vehicle after it leaves the manufacturer, and requiring separate controls, circuitry, and possibly power supplies from what is available from a factory vehicle.

A traditional signal light system for a consumer automobile, and its associated hazard flashing system, has a flash rate on the order of 1-2 Hz. This was originally based in part on the use of incandescent light bulbs in the older systems (typically 6V or 12V bulbs), which rely on internal filaments that heat up and glow in order to operate. The filaments do not glow sufficiently to be able to provide appropriate visual cues until power has been applied a sufficient amount of time. Further, they do not stop glowing instantaneously when power is removed. Thus, the rate at which the signal light or hazard flashers could be cycled was limited. Other limitations existed based on the fact that the original circuitry driving the flashing operation was based on analog thermal switches or other electromechanical components, which could not drive incandescent bulbs much beyond around 2 Hz. For purposes of the present disclosure, an existing vehicle circuit implementing the periodic activation of lights for signaling or hazard indications (whether based on thermal switches or otherwise) is referred to as a flasher module or relay, signal module or relay, or blinker module or relay.

Strobe lights based on exclusively on analog circuitry have been available for some time but require arrangements of transformers to produce voltages on the order of hundreds of volts, capacitors, and delicate gas discharge tubes to operate. Again, none are suitable for consumer use with ordinary automobiles.

LED lighting systems have now made their way to many vehicle models as standard equipment. LED upgrade kits are available for older and newer model cars as well. However, the operation of the LED lighting systems operates in the same manner and provide the same functions that were available with the incandescent lighting systems (albeit at greater efficiency and/or intensity).

In various embodiments, the present disclosure provides systems and methods that are capable of providing strobing effects in existing lighting systems for factory standard automobiles. Such systems and methods rely on existing wiring, LED lights, and controls (switches, etc.). In other embodiments, the systems and methods of the present disclosure are applicable to vehicles produced without LED lights, but which have been upgraded from the basic incandescent bulbs, at least so far lights for which strobing effects are sought. The existing wiring may be employed in such embodiments and the existing controls are utilized. In other words, embodiments of the present disclosure provide for strobing effects of vehicle signal lights, brake lights, or other existing lights to be available to a driver or vehicle occupant and to be operable with existing and familiar hazard light switches or other activation means. Automatic deployment of strobing effects can be tied to signals received from existing vehicle control or safety systems corresponding, for example, to air bag deployment, ABS activation, hard braking, rollovers, etc. It is also possible to add at least some automatic deployment features for older vehicles based on the use of separate accelerometers not present in the existing vehicle systems. Various embodiments of the present disclosure can be installed or implemented at the time of manufacture as factory standard equipment, or entirely as an aftermarket system relying on factory installed controls, wiring, and to the extent possible, existing bulbs.

Referring now to FIG. 1, exemplary placement of various signal lights and/or hazard lights is shown on a typical automobile 100. It should be understood that the terms automobile, car, and vehicle, are used interchangeable herein, and the systems and methods of the present disclosure are equally applicable to all of these. The terms, lamp, light, indicator, flasher, signal and blinker as used in the present disclosure in the context of the strobing systems presented herein should be understood to mean an LED light placed appropriately on a vehicle or automobile 100 to be visible to other drivers or observers outside the vehicle. FIG. 1 shows the automobile 100 from side, front, and rear views. A left front indicator light 102, left side indicator light 104, and left rear indicator light 106 can be seen at typical locations on the automobile 100. Similarly, along the right side of the automobile 100 are right front indicator light 108, right side indicator light 110, and right rear indicator light 112. It should be understood that the placement of the indicator lights is for illustration only, and the present disclosure is not limited to the placement shown. On most, if not all, available vehicles, the left front indicator light 102 and right front indicator light 108 will generally be toward the front of the automobile 100, visible to facing or oncoming traffic. These are generally forward of left side indicator light 104 and right side indicator light 110 (if the vehicle is so equipped) which are visible from the sides of the automobile 100. The left side indicator light 104 and/or right side indicator light 110 may also be mounted on the body of automobile 100, rather than on the mirrors, or on another location. Finally, left rear indicator light 106 and right front indicator light 108 are generally mounted rearward on the 100 so as to be visible to traffic behind the automobile 100.

In addition to the vehicle lights that are normally deployed as part of the signal light or hazard flasher system, vehicles typically have additional lights that are dedicated to other purposes. For example, headlights 112 are provided as standard equipment. Fog lights 114 may be standard, optional, or aftermarket. Brake lights are standard equipment as well. Rear brake lights on some vehicles serve a dual purpose and function as part of the existing signal or hazard flasher system. Vehicles of recent years provide a high center mounted stop lamp (HCMSL) 120 that functions along with the other brake lights. The HCMSL 120 is not normally shared with any other vehicle function (except as provided herein). After market light bars or light strips 122 can be added to most any vehicle. Although, as explained below, certain embodiments of the present disclosure are intended to operate only through standard or factory installed vehicle lights, it should be understood that aftermarket or add-on lights can be controlled as well. An after-market or add-on light should not be confused within the present disclosure for what are later referred to as auxiliary or multi-purpose lights. Auxiliary and/or multi-purpose lights, within the present disclosure, specifically denotes lights for which a use is already designated by the vehicle (e.g., an HCMSL) but which may be additionally or supplementally deployed or activated by systems of the present disclosure.

As described above, the various indicator lights, marker lights, or other vehicles lights may be LED lights or may have originally been incandescent bulbs (or a mixture of the two) that have been changed out for LED lights in order to allow effective strobing, as provided by various embodiments of the present disclosure. In various embodiments of the present disclosure, the existing location, placement, and color of lights is retained as the vehicle was manufactured, or would be manufactured, without any of the systems of the present disclosure.

Figure 2A:
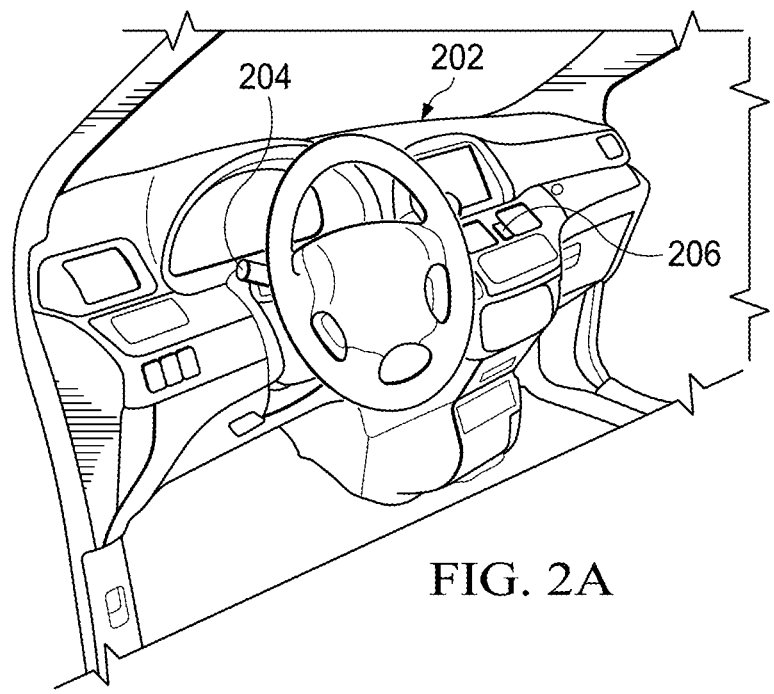
FIG. 2A illustrates an exemplary vehicle dashboard and exemplary placement of certain controls.

Referring now to FIG. 2A, a vehicle dashboard 202 is shown. The dashboard 202 is meant to represent any vehicle dashboard as are widely known to the public. A turn signal stalk 204 is generally provided to the left of the steering wheel and operated to activate signal lights. Normally, movement of the turn signal stalk 204 downward indicates a left hand signal and movement of the turn signal stalk 204 upward indicates a right hand signal. Upon activation and the appropriate signal lights are illuminated in a slow, periodic flashing manner.

A hazard flasher button 206 may be located at various locations on the interior of a vehicle. Here, the hazard flasher button 206 is shown in the center of the vehicle dashboard 202 but it could be placed on a steering column, below the vehicle dashboard 202, or elsewhere.

Embodiments of the present disclosure are designed to work with the exiting signal and hazard light controls (e.g., the turn signal stalk 204 and hazard flasher button 206) such that a driver or user does not have to learn or remember any separate controls. As described below, some embodiments of the present disclosure allow a selection of various strobe or flashing lights to be implemented. These may be implemented by sequential presses of the hazard flasher button 206. No separate manual controls are needed or provided. Thus, the user is not presented with a confusing array of options or controls during an emergency and does not have to suffer any unwanted modifications that are visible on the interior of the vehicle.

Figure 2B:
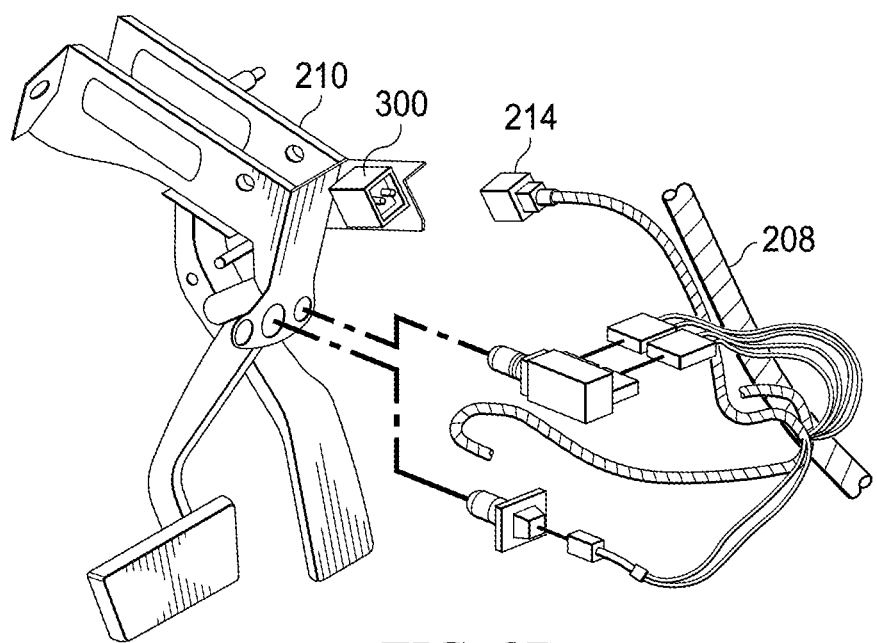
FIG. 2B illustrates an exemplary vehicle wiring harness and location for a strobe module to replace a flash relay.

Referring now to FIG. 2B, an exemplary vehicle wiring harness 208 and location for a strobe module to replace a flash relay is shown. The wiring harness 208 is shown as only that portion of the harness that interconnects with a strobe module 300 according to aspects of the present disclosure. It should be understood that the wiring harness may run throughout a vehicle and may be constructed of multiple separate pieces. According to embodiments of the present disclosure, a strobe module 300 replaces an existing flasher relay device and provides a strobing circuit for the hazard lights in an existing vehicle. The strobe module 300 may even be mounted in the same location as the original relay. In some embodiments, the strobe module 300 is pin-compatible with an existing connector 214 on the wiring harness 208 and performs all of the functionality described below relying on the power, signaling, and other connections provided via the wiring harness 208. In other embodiments, an adapter (not shown) may interpose the strobe module 300 and the wiring harness connector 214 such that a single embodiment of a strobe module 300 can be connected to a wide variety of vehicles and wiring harnesses.

In some embodiments, as explained below, the strobe module 300 may not be able to provide the full contemplated functionality interfacing to the vehicle exclusively via the wiring harness 208. In such cases, additional leads may be routed to power, ground, or wherever needed. In embodiments where a body control module (BCM) is present, the strobe module 300 may have little or no interaction to the vehicle via the connector 214, but may be spliced and wired into the vehicle at a convenient location to receive output from the BCM and drive the associated vehicle lights (as described further below).

For purposes of the present disclosure, any electronic or electromechanical mechanical device with control or programmable control (whether or not reprogrammable) over the signal lights or hazard lights of a car is considered a BCM. A BCM may incorporate one or more silicon based processors, microprocessors, controllers, microcontrollers, chips, gate arrays, or other logical devices. In some cases, the BCM may contain relatively complex multifunctional components such as system-on-a-chip devices. Additional names or designators for a BCM may include, but are not limited to, computer, control unit, electronic control unit (ECU) body computer, body computer module, body controller, body control module, and on board controller. The BCM may or may not control additional aspects of the vehicle in addition to hazard or signal lights.

An existing mounting point 210 may be provided on the vehicle for physically locating and affixing the original flasher relay. The same location 210 may be used to store and secure the strobe module 300. In embodiments where the strobe module 300 interfaces with the vehicle at least partially via the wiring harness 208, the mounting point may be near the connector 214.

Figure 3:
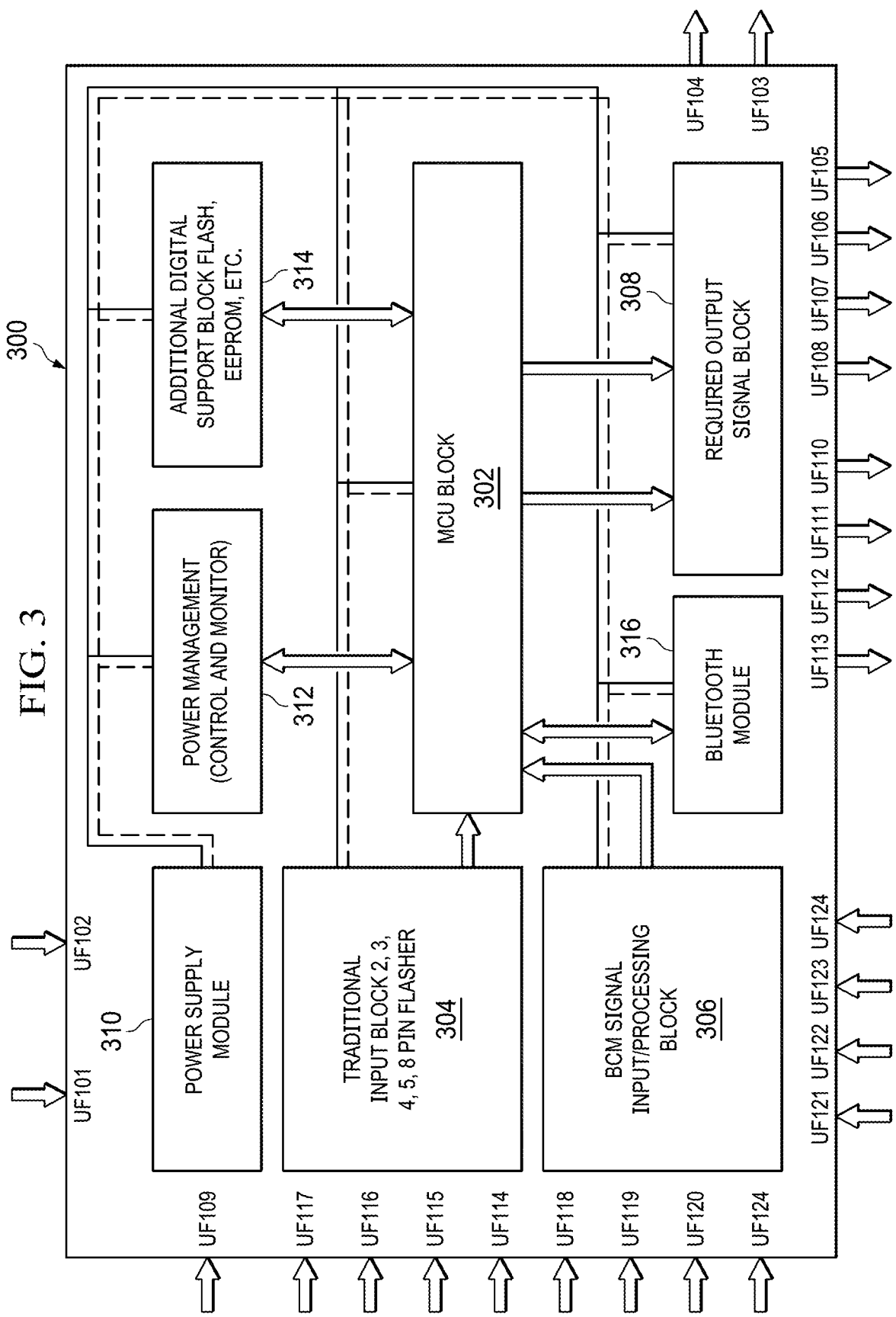
FIG. 3 is a block diagram of a strobe module for vehicle hazard lights according to aspects of the present disclosure.

Referring now to FIG. 3, a block diagram of a strobe module for vehicle hazard lights according to aspects of the present disclosure is disclosed. Arrows in FIG. 3 are indicative of direction of signaling, information, or power flow. In the embodiment of FIG. 3, the primary functionality of the strobe module 300 is provided by a microcontroller 302. The microcontroller 302 may be a general purpose microcontroller that is suitable to the environment in which is it used (e.g., a vehicle interior or engine compartment). The microcontroller 302 may be programmed using, for example, assembly language or a higher level language when suitable. In some embodiments, the microcontroller 302 may be less advanced than a general purpose microcontroller and may comprise a field programmable gate array (FPGA) or the like. An application specific integrated circuit (ASICS) may also be used.

It will also be appreciated that a system-on-a-chip device might be employed to fulfill the functions of the microcontroller 302 as well as providing integrated memory and storage, I/O ports, D/A, A/D, timing functions, and the like. In some cases, wireless communication capabilities may even be provided on a single chip. Such an embodiment is within the scope of the present disclosure and simply moves certain aspects or functions of the strobe module 300 from the various individual components as described herein and consolidates them onto a single silicon device.

In the illustrated embodiment of FIG. 3, the microcontroller 302 receives input from an analog input block 304. The analog input block 304 provides signal connections to those automobiles relying on older or traditional analog blinker or hazard flasher modules. The analog input block 304 provides the appropriate leads and connections to mimic the interface to the automobile of various legacy flasher systems (e.g., via the connector 214). These include, for example, existing 2, 3, 4, 5, or 8 pin flasher schemes. Exemplary detailed wiring diagrams for these systems are explained below. However, in each case, the functionality is similar. The strobe module 300 operates on the basis of the microcontroller 302 reading or accepting the signals or voltages that would normally be provided to the existing flasher module or relay and replicating the appropriate output signal or voltage at output signal block 308, which connects to the downstream electrical components responsible for illuminating the relevant signal light (in many cases, the only existing downstream component will be the bulb or LED that is visible to other drivers). For example, a driver may flip a signal light stalk upward to signal a right turn. This would normally send a signal in the form of a voltage to the flasher relay. In response, the existing signal or hazard module would provide the traditional periodic illumination of the relevant signal lights. A driver may also deploy a hazard light switch, and in response, the existing hazard module would provide periodic illumination of all signal lights. The strobe module 300 replicates this functionality as a replacement for the existing hazard or signal module. However, in the event that hazard lights are activated (as indicated on the analog input block 304), the microcontroller 302 is programmed to deploy the signal or hazard lights in a strobing fashion.

As described, a strobing light appears substantially different than a normal flashing light as have been seen to date on automobiles. However, since strobing lights are attention grabbing devices associated with hazardous conditions, it may be a better choice not to strobe the relevant lights when a simple signal light is indicated on the analog input block 304. Accordingly, the microcontroller 302 may be programmed to flash, rather than strobe, the relevant lights or LEDs when a turn signal is indicated when such a distinction is supported by the existing vehicle wiring.

In some embodiment, the strobe module 300 is deployed or implemented in a newer automobile that may utilize a computer or set of computers that control non-engine related functions referred to as a body control module (BCM). In such cases, the signal stalk and the hazard flasher button may be connected directly to the BCM, which then deploys the signal lights as signal lights (one side only) or as hazard lights (both sides simultaneously). It is possible to implement the systems of the present disclosure by initial programming (or reprogramming where allowed) of the BCM. However, on vehicles that are already built and on the road, access to, and reprogramming of, the BCM is generally time consuming and cost prohibitive to a degree it may not be likely to gain wide acceptance. Further BCM schematics and programming routines are rarely made public. Accordingly, the strobe module 300 may have a BCM input block 306 instead of (or in addition to) the analog input block 304.

The BCM input block 306 may comprise a series of leads that are wired to intercept the outputs from the existing BCM that drives the vehicle signal and hazard lights. When the microcontroller 302 detects that the BCM indicates a signal light, it may utilize the output signal block 308 to activate the relevant lights in the traditional signaling manner. On the other hand, if the microcontroller 302 detects on the BCM input block 306 that the BCM indicates a hazard flash, the output signal block 308 will be used to drive the strobing effect on the exterior lights as described.

The output signal block 308 provides electrical connections to each bulb or LED that forms an existing part of the signal or hazard flasher system of the automobile into which it is installed. Such connections may include connections to lights visible outside the car, as well as indicator lights visible to the driver. The microcontroller 302 may or may not have the capacity to directly drive the LEDs comprising the flasher or signal system of the car. Consequently, as is known in the art, amplifiers, relays, or other circuitry that is capable of driving the LEDs in the required manner may comprise the output signal block 308, which, in turn, drives the LEDs.

A power supply module 310 may be integrated with the strobe module 300 to power the microcontroller 302, output signal block 308, and/or other components. The power supply module may be configured to draw power from the existing 12 volt system of the vehicle. In another embodiment, it may draw power from a regulated accessory bus (e.g., 5 V, 12 V, or other).

Power management circuitry 312 may be provided for converting voltage from that received by the power supply module 310 to that utilized by the other components of the strobe module 300. The power management circuitry 312 may also prevent power surges or spikes from reaching the microcontroller 302 and other sensitive components. In some embodiments, battery back-up may be provided the microcontroller 302. Where space and/or battery capacity permit, a backup battery could even drive the LEDs via the output signal block 308 when the vehicle electrical system becomes exhausted or fails due to damage sustained, for example, in a crash.

The microcontroller 302 may be configured to communicate with various existing vehicle subsystems for automatic deployment of strobing lights. For example, in the event of an air bag deployment, the emergency lights may be set to strobe. Similarly, if a deployment of an anti-lock brake system or stability system is detected, the microcontroller 302 may activate strobing lights. In some embodiments, deactivation of the strobing lights may be automatic as well based on information received from other vehicle subsystems.

In other embodiments, the strobe module 300 has one or more on-board (not presently shown) accelerometers that detect rapid acceleration (or deceleration), skids, overturns, and other non-typical driving maneuvers and can deploy strobing lights without input from the driver. The microcontroller 302 can be programmed such that the strobing ceases automatically upon resumption of a normal speed or orientation for the vehicle, or they may remain activated until the microcontroller 302 is reset (for example, by a press of the hazard light switch by the driver or occupant).

In some cases, it may be desirable to allow reprogramming of the microcontroller 302 after installation. Accordingly, the strobe module 300 may be equipped with a wireless module 316. The wireless module 316 may be a Bluetooth module that can communicate in an ad hoc fashion with a variety of devices. The wireless module 316 could also be an IEEE 802.11 or "WiFi" enabled chip to take advantage of the WiFi network provided by some newer cars or mobile hotspots. The wireless module 316 can allow reprogramming of the microcontroller 302 even if the strobe module 300 is installed in a location in the vehicle that is difficult to access.

The wireless module 316 may also be used to interface with Bluetooth® equipped LED modules installed in place of original incandescent LED signal or flasher lights. In such embodiments, the LED lights may behave as customary flashing signal or hazard lights unless instructed via the wireless module 316 to strobe. Naturally, such a solution requires additional circuitry at each LED or bulb location and may be more cumbersome to install and maintain. However, such a configuration would have the advantage of allowing the existing signal and hazard light switch gear to remain in place. In such an embodiment, some or all of the output signal block 308 of the strobe module 300 may be eliminated and the wiring passing to the signal or hazard lights may simply be a pass-through arrangement. The input for the microcontroller 302 may then be gathered from the analog input block 304 and/or BCM input block 306. A simple determination of which line or signal was active would be all that is needed in such an embodiment since the signal is passed "downstream" to the lights. The microcontroller 302 still determines whether to deploy a strobe or traditional flash based upon detection of whether a signal or hazard light was indicated. Further, in this and other embodiments, various capacities of the strobe module 300 might be turned on or off by a user via the wireless module 316.

Figure 4:
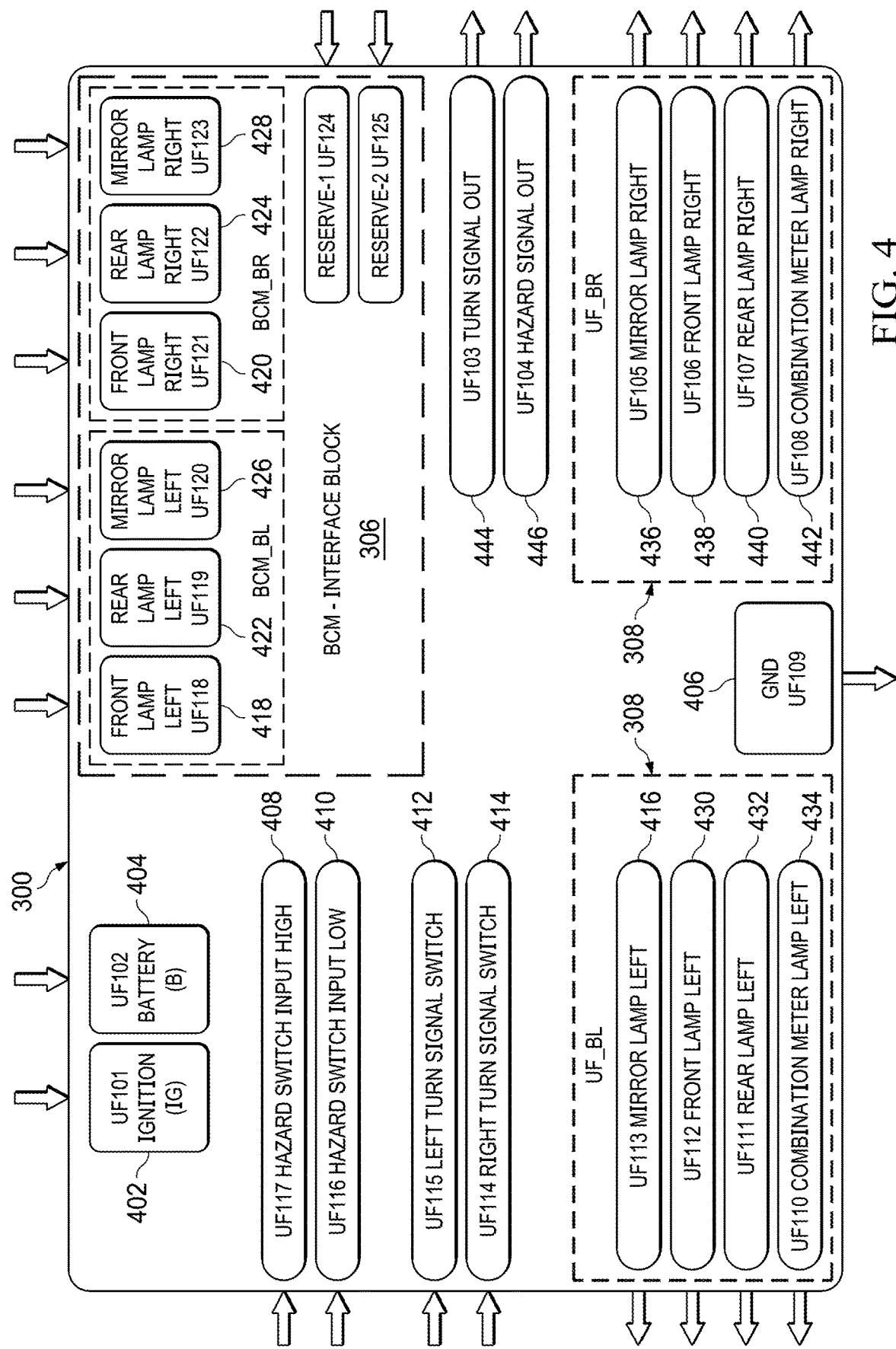
FIG. 4 is a schematic diagram input/output diagram of a strobe module according to aspects of the present disclosure.

Referring now to FIG. 4, a schematic input/output diagram of the strobe module 300 according to aspects of the present disclosure is shown. In FIG. 4, arrows around the periphery of the strobe module 300 indicate whether the associated connection is an input or output. For example, inputs received from existing vehicle controls (e.g., hazard switch input high 408) are shown with an inward facing arrow.

It will be appreciated that a number of existing vehicle signal and hazard light wiring schemes are in existence, whether on an analog basis or on the basis of utilizing a newer BCM. Accordingly, in order to work with a wide array of vehicles, various embodiments of the present disclosure may have different pinouts and wire compatibilities. In some embodiments, leads that are not used are simply ignored. However, where it is more economical to do so, various embodiments of the present disclosure may be built with only the ports, pins, and wiring needed for the immediate application for which it is intended. In such case, a fit-list might be developed alongside that specifies, for particular embodiments, those makes and models of vehicle with which it is compatible. After describing the inputs and outputs that are available, a number of examples are given below as to how various embodiments of the present disclosure are adapted to work with various wide spread wiring schemes currently in existence.

An ignition connection 402 may be provided as a part of the power supply module 310. The 202 provides indication to the microcontroller 302 that the vehicle is switched on (normally, signal lights do not deploy when the vehicle ignition is off, but hazard lights do). A separate connection to power, battery connection 404 is also provided and allows for deployment of certain function (e.g., strobing hazard lights) when the ignition of off. The ignition connection 401 may also be part of the power supply module 310. A ground lead 406 is also provided. In some embodiments, ground is provided via the connector 214, but in other embodiments, it is a separately attached lead to the strobe module 300.

Forming a part of the analog input block 304 may be leads or connections for hazard switch input high 408, hazard switch input low 410, left turn signal switch 412, and right turn signal switch 414. Two hazard switch input options are provided to account for the fact that in some existing systems the existing relay is activated by providing a high voltage to the relay. In others, the activation lead remains high unless the relay is to be deployed to flash the hazard lights. In such case, a ground or low voltage signal indicates hazard deployment. By providing both hazard switch input high 408 and hazard switch input low 410 leads, the strobe module 300 is compatible with both types of systems.

The strobe module 300 can be programmed to be capable of multiple flashing and strobing patterns. For example, a single press of the existing hazard switch might be intended to signal the traditional slow cycling flash. A second press would be intended to select a high speed strobe. Therefore, when various embodiments of the strobe module 300 are installed, a driver or passenger can deploy hazard lights in the manner in which they are accustomed. This also eliminates the need for separate switches or controls to gain full functionality of what is considered a vehicle safety system.

Hazard switches on certain vehicles provide two discrete positions (high and low). Typically, hazard flashers in such systems are deployed when the button is pressed and then remains depressed. Such switches actually activate the existing flasher relay by operating as a power switch. A second press releases the switch to the high position and depowers the hazard lights. The strobe module 300 may still be configured to operate with such systems, even so far as providing both flashing and strobing, or multiple strobing patterns. The strobe module 300 in such case may be programmed to "count" the number of presses, or transitions from on to off and vice versa provided via the legacy two-position switch. Relying on the battery connection 404 and/or the on board battery to keep the microcontroller 302 and other components powered the strobe module 300 provides the programmed or desired operations notwithstanding that the existing relay may have been powered only by the power flowing through the existing switch.

The lead for the left turn signal switch 412 and the right turn signal switch 414 act to inform the strobe module 300 when left or right turn signals are activated. As described above, the strobe module 300 may activate the left or right turn signals in response to movement of the existing turn signal stalk in a manner that replicates the existing slower flash of the turn signals, or a strobing flash.

In embodiments where the strobe module 300 interfaces with a BCM, the BCM input block 306 provides a front left lamp input 418 and a front right lamp input 420. A rear left lamp input 422 and rear right lamp input 424 are also provided. If the vehicle is so equipped, a left mirror lamp input 426 and right mirror lamp input 428 may be provided as well. Since the BCM controls input or interface with the driver (e.g., via the turn signal stalk), the strobe module 300 may not receive any direct indication of the stalk position, nor of the position of the hazard light switch. Instead, the strobe module 300 may infer what the driver is doing based upon these inputs from the BCM. For example, if lights on one side or the other of the vehicle are activated based on the BCM inputs, the strobe module 300 simply replicates those outputs via the output signal block 308. On the other hand, where lights for both sides of the vehicle are activated at once, the hazard lights have been deployed. The strobe module 300 will then use the output signal block 308 to effect a strobe on the vehicle's signal lamps.

For ease of understanding, in FIG. 4, output signal block 308 is shown split into left and right components or left and right LED groups. Lights associated with the left side of the vehicle may be controlled by a left mirror lamp output 416, a front left lamp output 430, a rear left lamp output 432, and/or a combination meter left output 434. The output signal block 308 has a similar set of outputs for the right side of the vehicle including a right mirror lamp output 436, a right front lamp output 438, a rear right lamp output 440, and/or a combination meter right output 442. It is understood that not all of these outputs will be employed in every installation or in every embodiment of the strobe module 300. For example, if a vehicle does not have a lamp associated with the left hand mirror, the left mirror lamp output 416 will be absent, or simply left unconnected. It is also understood that each of these outputs are equipped with whatever additional circuitry is needed to adequately drive the associated LEDs being activated.

The strobe module 300 also provides two additional signal outputs that are utilized with certain existing vehicle wiring systems as will be explained below. These include a turn signal out indicator 444 and a hazard signal out indicator 446. The signals output on the turn signal out indicator 444 and hazard signal out indicator 446 are controlled by the microcontroller 302 as with the other outputs.

Figure 5:
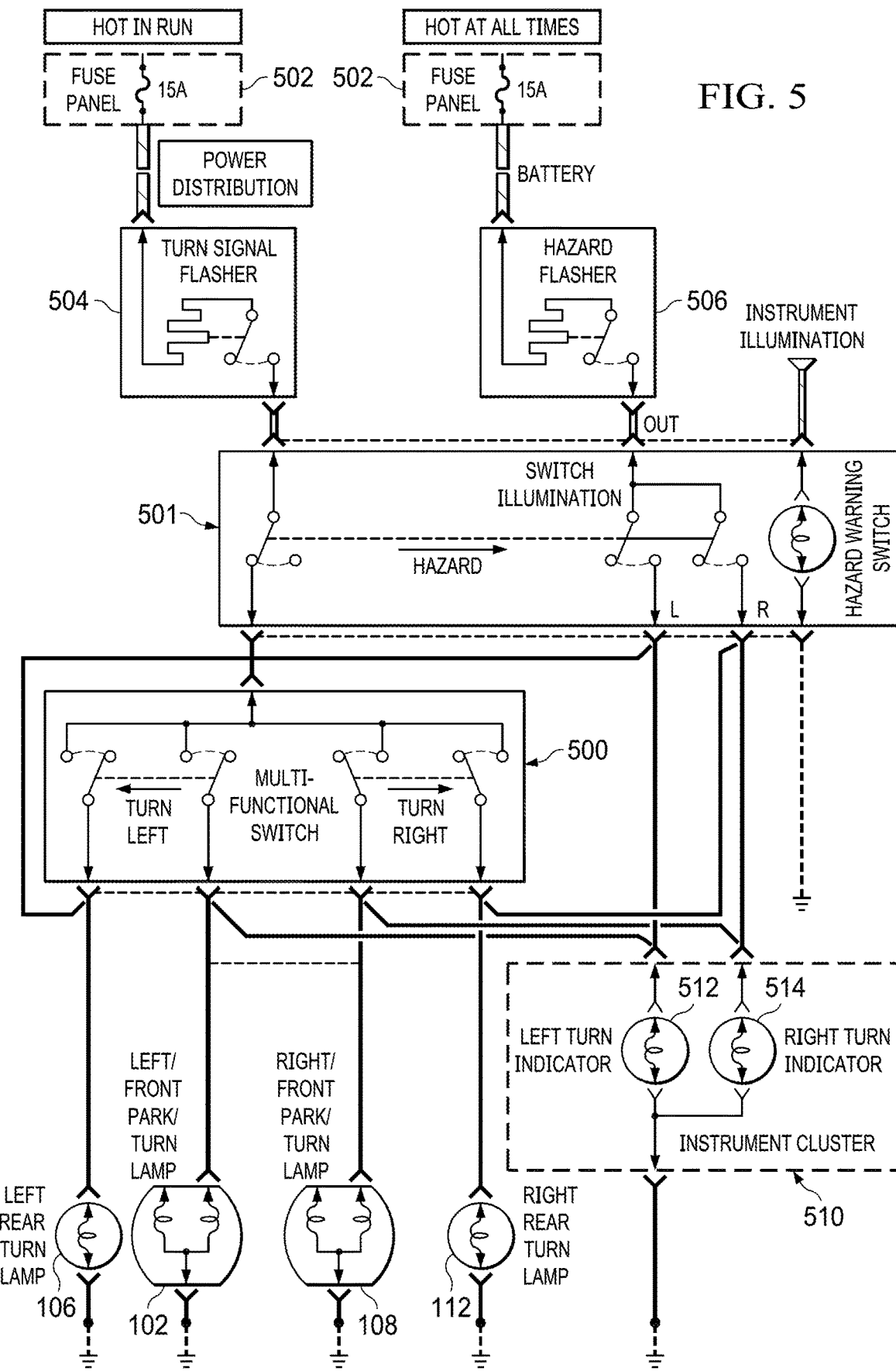
FIG. 5 is a wiring diagram of a two-pin flasher system.

Referring now to FIG. 5, a wiring diagram of a two-pin flasher system is shown. The system shown in FIG. 5 is an existing two-pin flasher system and is denoted as such in the present disclosure by virtue of the fact that the existing hazard flasher 506 interacts with the remainder of the system via only two-pins as explained herein. In the present case, the two pins represent an input from power and an output to the light or lights to be flashed. It should also be understood that other configurations for two-pin flasher systems may also exist. The system of FIG. 5 utilizes a pair of similar thermal cycling switches 504, 506 that control turn signals and hazard flashers, respectively. The turn signal flasher 504 may connect to power via fuse box 502 and be wired such that power is available only when the associated vehicle ignition switch is turned on. The hazard flasher 506 may be connected to fuse panel 502 such that power is continuously available to the hazard flasher 506. Activation of the hazard flasher may be controlled by switch 501 which begins thermal cycling of the hazard flasher 506 providing power and illumination to left rear lamp 106, left front indicator light 102, right front indicator light 108, and right rear indicator light 112. An instrument cluster 510 may be provided with a left turn indicator 512 and a right turn indicator 514. When the circuit has been placed under control of the hazard flasher 506 by the switch 501, both of the turn indicators 512, 514 may flash periodically in unison. Where the turn signals are also utilized as hazard flashers, a multi-function switch 500 may be provided for turning on and off the turn signal flasher 504 as well as directing current to the appropriate lamps on the right or left side of the vehicle.

Figure 6A:
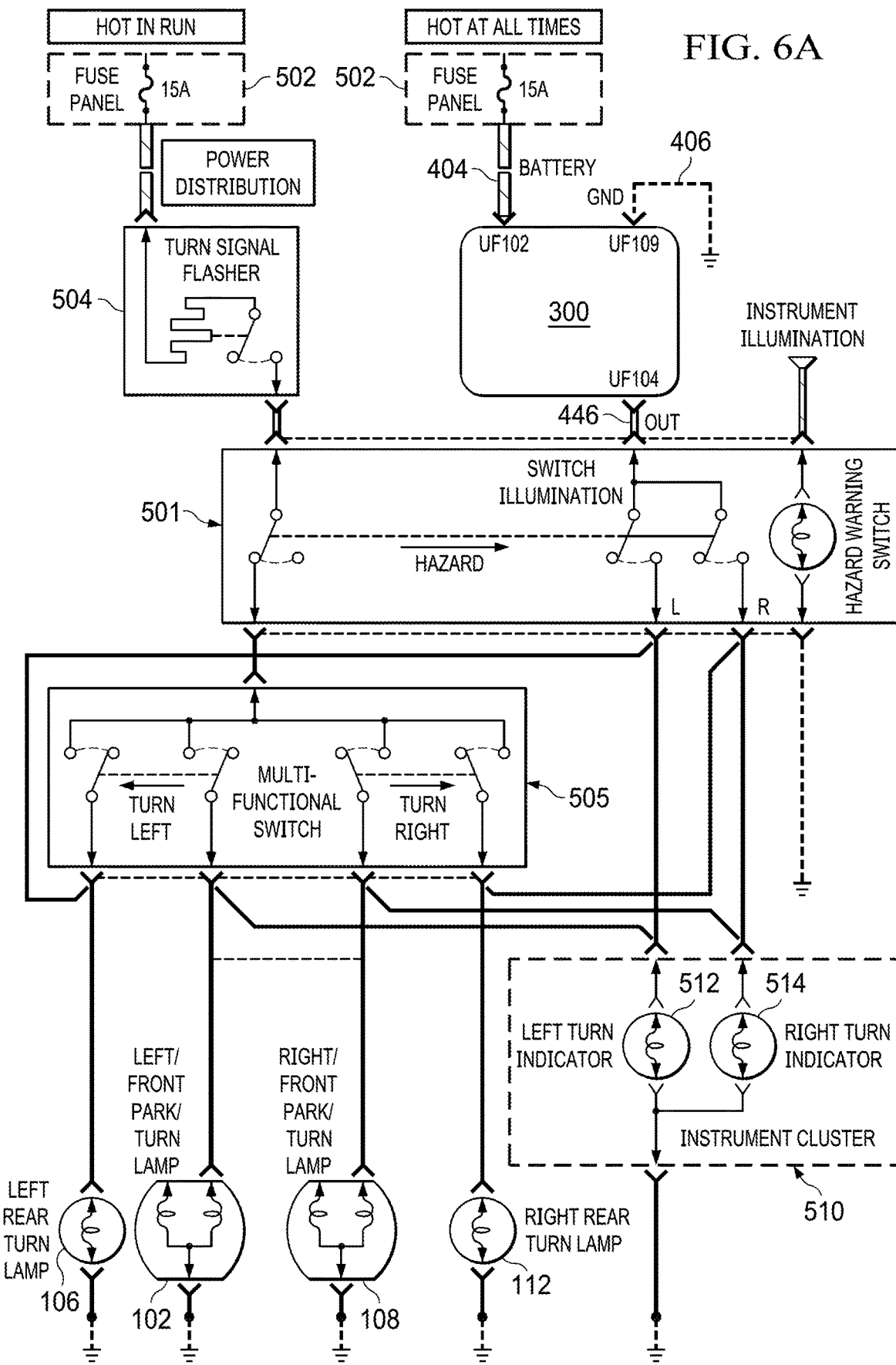
FIG. 6A is a wiring diagram showing an embodiment of a strobe module according to aspects of the present disclosure installed into the generic two-pin flasher system of FIG. 5.

Referring now to FIG. 6A, a wiring diagram showing an embodiment of a strobe module 300 according to aspects of the present disclosure installed into the two-pin flasher system of FIG. 5 is shown. Here the existing thermal hazard flasher 506 has been replaced with the strobe module 300 of the present disclosure. As mentioned above, the strobe module 300 in the present embodiment interacts with the existing system via only two-pins. In the present embodiment, the additional the ground lead is utilized 406. The remaining inputs and outputs of the strobe module 300 (e.g., described with respect to FIG. 4) may be left unused or the strobe module 300 may be manufactured only with the inputs and outputs needed. In the configuration of FIG. 6A, when the hazard switch 501 is activated, the strobe module 300 will drive the signal lamps at a strobing rate previously described. Thus, in the present configuration, the strobe module 300 stands in for the replaced hazard flasher 506.

Figure 6B:
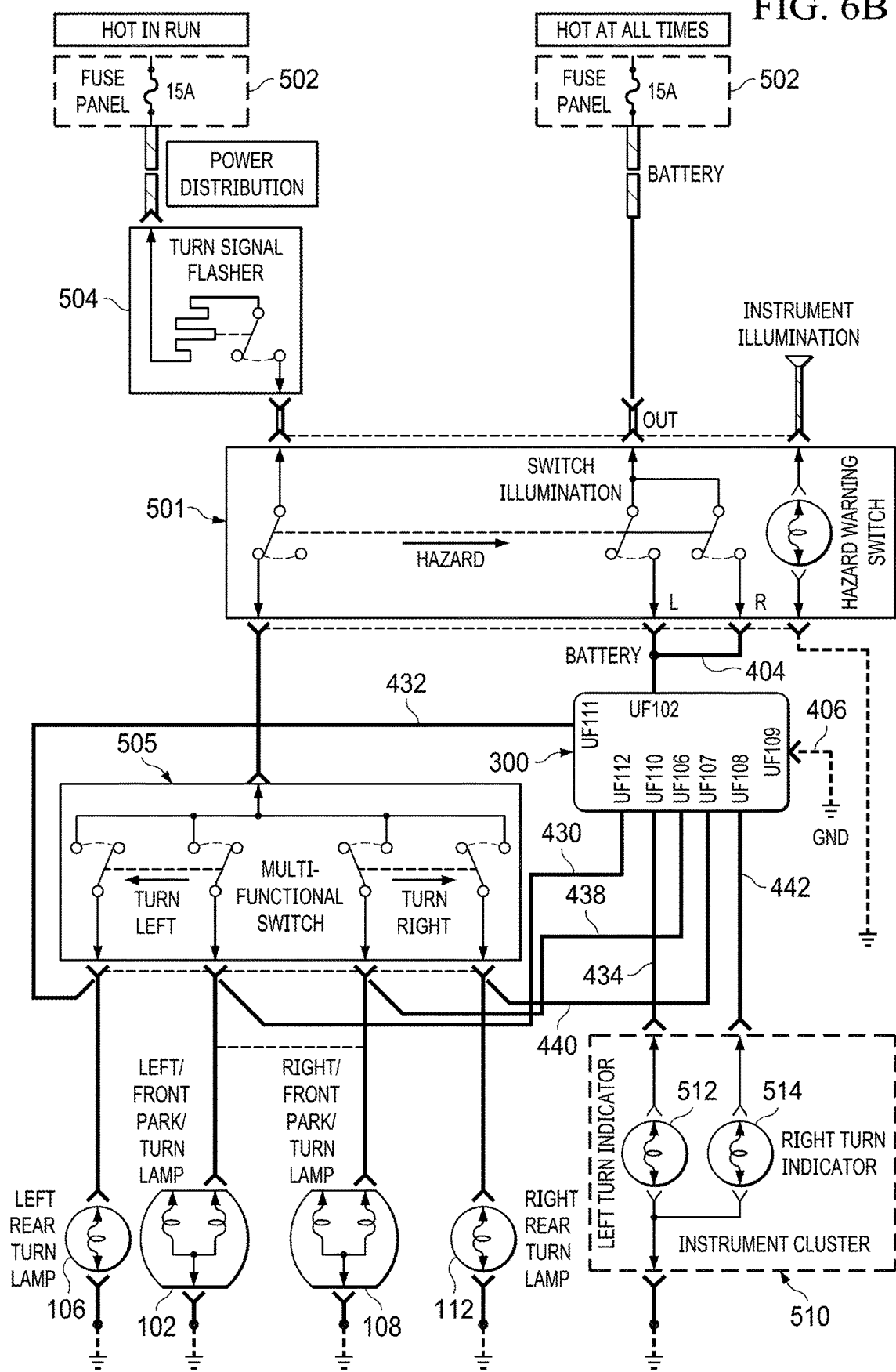
FIG. 6B is a wiring diagram showing an embodiment of a strobe module according to aspects of the present disclosure installed into the generic two-pin flasher system of FIG. 5 in a different manner.

Referring now to FIG. 6B, a wiring diagram showing an embodiment of the strobe module 300 installed differently into a two-pin flasher system is shown. One advantage of installing the strobe module 300 in the manner shown in FIG. 6B is that the strobe module 300 is only connected to battery power when activated by the hazard switch 501. This can prevent a potential drain on the vehicle battery that could result from the continuous operation of the internal microcontroller and other components of the strobe module 300. Here, outputs from the switch 501 selectively connect the battery connection 404 of the strobe module 300 to the power. When the strobe module 300 in the present configuration is provided with power, the front left lamp output 430, rear left lamp output 432, front right lamp output 438, and rear right lamp output 440 are utilized to drive the individual respective front and rear turn signals rather than driving all of them simultaneously via the hazard signal out indicator 446 (which is unused in the configuration of FIG. 6B). Left meter output 434 may be utilized to drive the left turn indicator 512 and the right meter output 442 may be used to drive the right turn indicator 540.

Figure 7:
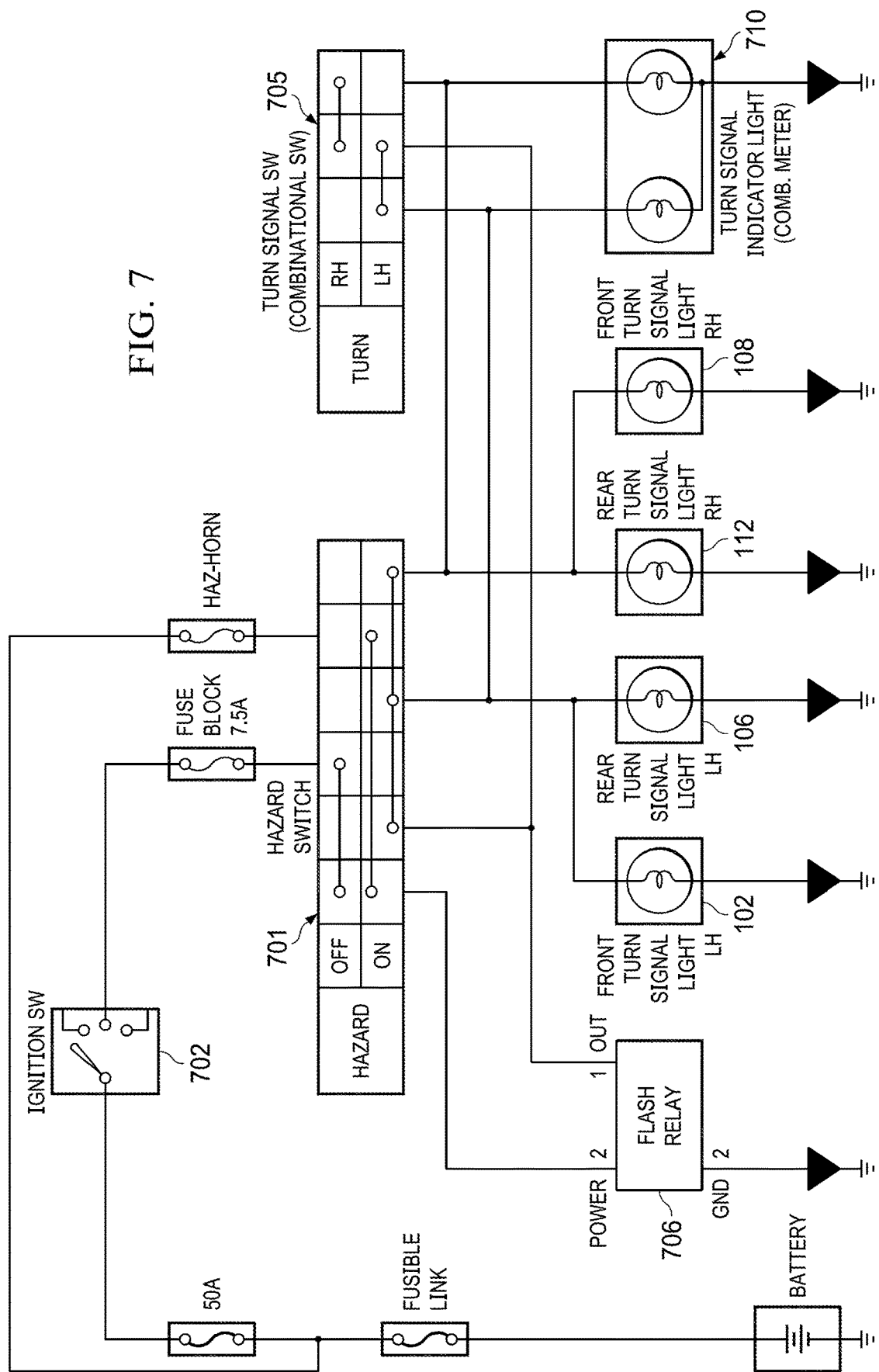
FIG. 7 is a wiring diagram of a three-pin flasher system.

Referring now to FIG. 7A, a wiring diagram of a three-pin flasher system is shown. It should be understood that the three-pin flasher system of FIG. 7 is only an example and that other three-pin flasher systems may exist. In the three-pin flasher system, the existing flash relay 706 provides cycling power on an output based upon a setting of an ignition switch 702 and a hazard switch 701. Three-pin flasher systems generally provide at least a front left turn signal 102, a rear left signal 106, a front right signal 108, and a right rear signal 112. A turn signal indicator 710 may also be provided. Under normal operation the turn signals are controlled by the turn signal switch 705 which may comprise a turn signal stalk next to a steering wheel. When power is on at the ignition switch 702, the left or right side signal lights may be periodically activated via the flash relay 706. The hazard switch 701 may be utilized to provide a cyclic flash via the flash relay 706 to all of the signal lights.

Figure 8:
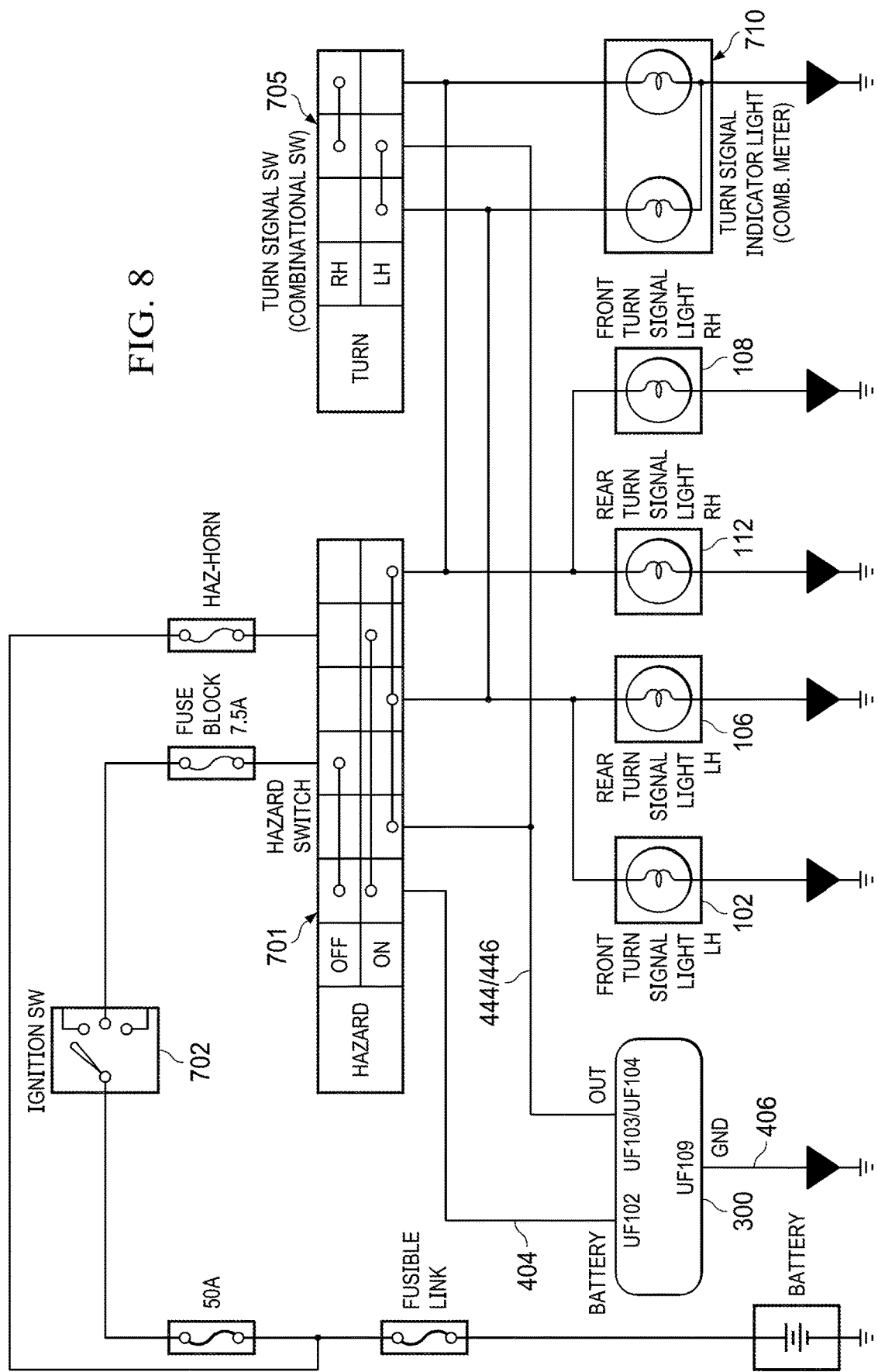
FIG. 8 is a wiring diagram showing an embodiment of a strobe module according to aspects of the present disclosure installed into the three-pin flasher system of FIG. 7.

Referring now to FIG. 8, a wiring diagram showing an embodiment of a strobe module 300 according to aspects of the present disclosure installed into the three-pin flasher system of FIG. 7 is shown. Here, the flash relay 706 has been replaced by the strobe module 300 of the present disclosure. The battery lead 404 is connected to the hazard switch 701 and the signal out indicator 444 and the hazard signal out indicator 446 are connected both into the relay system of the hazard switch 701 and the turn signal switch 705. This allows the strobe module 300 to serve as the provider of both strobing effects when the hazard switch 701 is activated as a signaling light provider when the turn signal switch 705 is activated.

Figure 9:
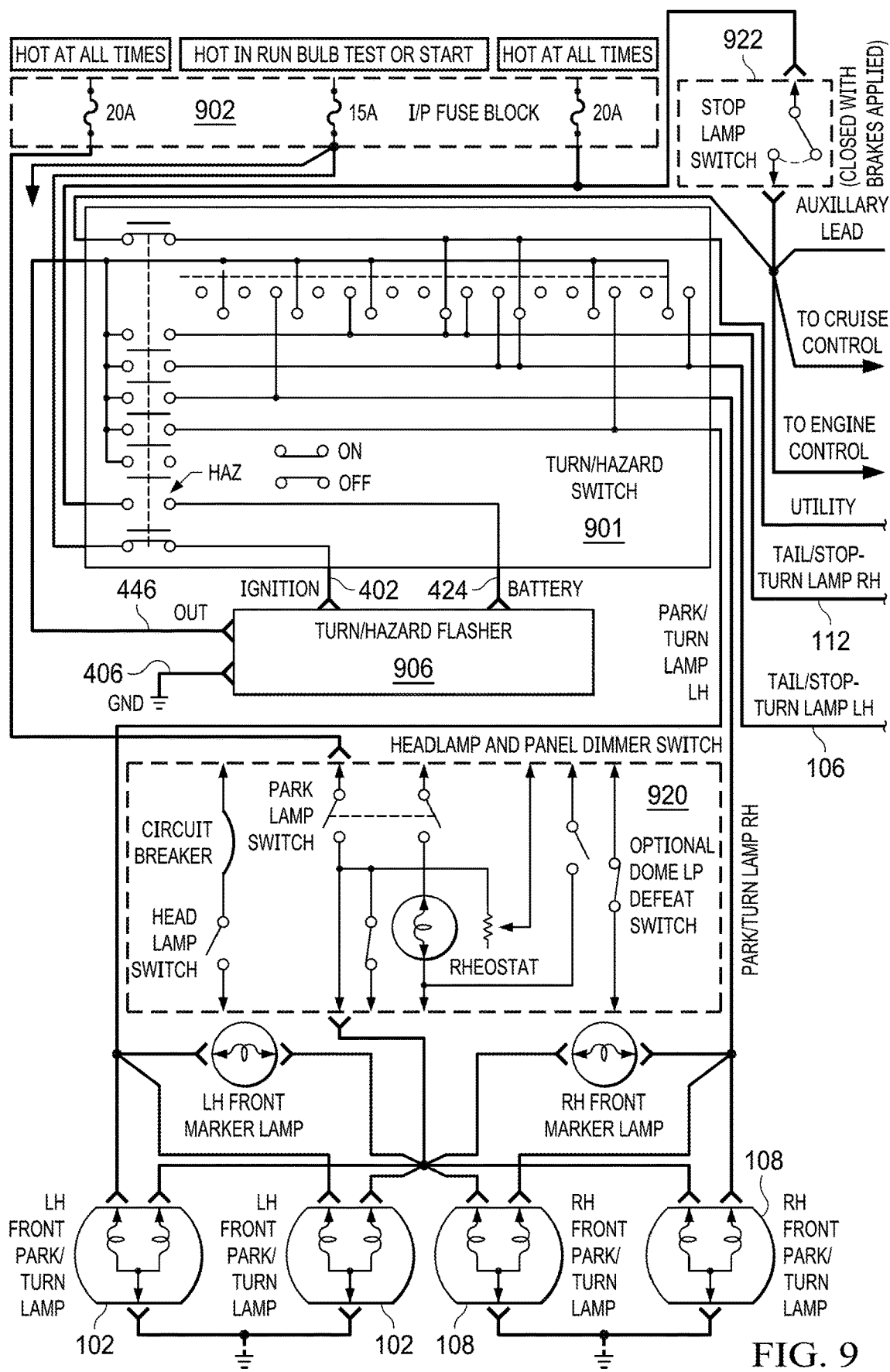
FIG. 9 is a wiring diagram of a four-pin flasher system.

Referring now to FIG. 9, a wiring diagram of a four-pin flasher system is shown. With the four-pin flasher system the existing flasher device 906 interacts with the remainder of the system via four separate pins. The system of FIG. 9 is more complex than those previously discussed and a single switch 901 may be utilized to activate both signal lights and hazard lights. This may be powered via a fuse block 902 providing both full time power and intermittent power based on the position of the ignition switch. Some four-pin flasher systems utilize two left front turn signals or indicator lights 102 and two right front turn signals or indicator lights 108. Single right rear turn signals 112 and left rear turn signals 106 are utilized. Each of these may be wired into the combination switch 901. However, the flashing of the signal lights is controlled by the existing flasher 906.

Figure 10:
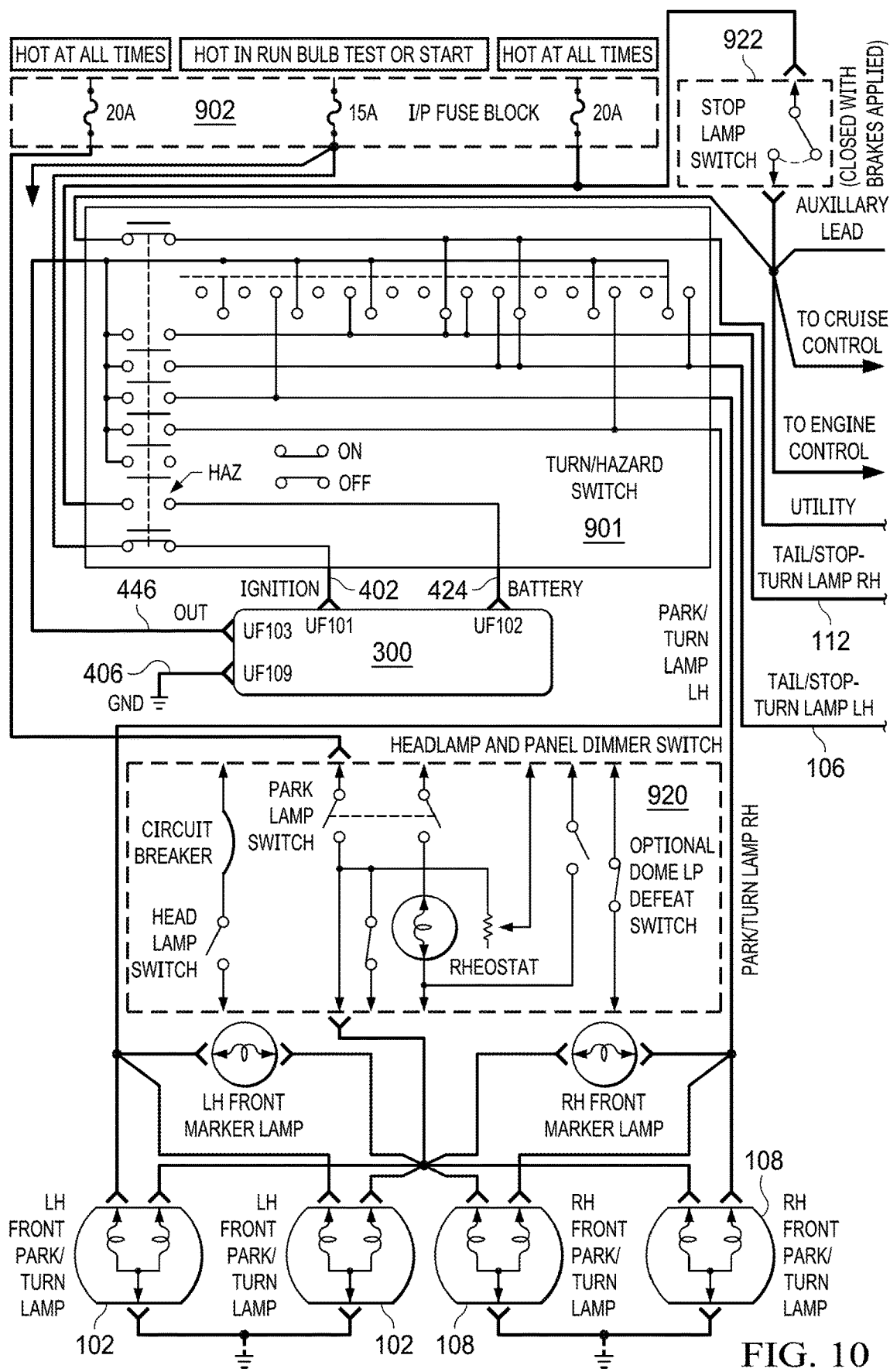
FIG. 10 is a wiring diagram showing an embodiment of a strobe module according to aspects of the present disclosure installed into the four-pin flasher system of FIG. 9.

Referring now to FIG. 10, a wiring diagram showing placement of the strobe module 300 of the present disclosure into the four-pin flasher system of FIG. 9 is shown. Here, the strobe module 300 is connected via the combination switch 901 both on the ignition connection 402 and the battery connection 404. Indication to activate hazard lights by the combination switch 901 activates both the battery connection 404 and the ignition connection 402 of the strobe module 300. In turn, the strobe module 300 provides a strobing signal on hazard signal out indicator 446. The hazard signal out indicator 446, having been connected in place of the previous flash output, will cause the associated signal lights to be driven in the previously described strobing fashion.

Figure 11:
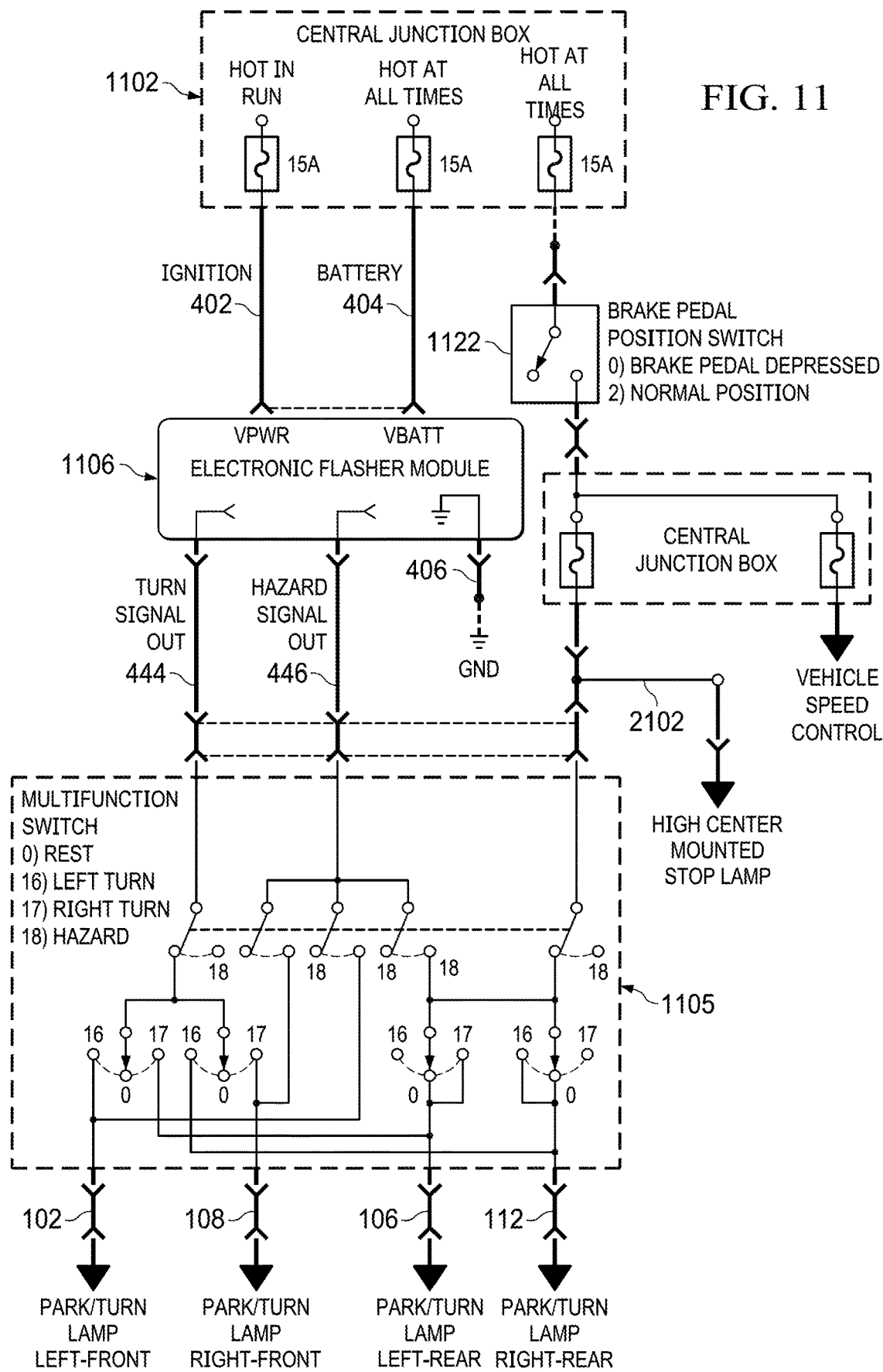
FIG. 11 is a wiring diagram of a five-pin flasher system.

Referring now to FIG. 11, a wiring diagram of a five-pin flasher system is shown. Five-pin flasher systems provide five-pin connections to an existing flasher module 1106. As of previous embodiments a fuse box 1102 may be connected to the existing flasher module 1106 to provide power both when the ignition is on, as well as a full time connection. The existing flasher module 1106 controls the flashing of both the turn signals and the hazard flashers based on position information received from a multi-function switch 1105. The multi-function switch 1105 provides selective power to some or all of the left front signal light 102, the right front signal light 108, the left rear signal light 106, and the right rear signal light 112.

Figure 12:
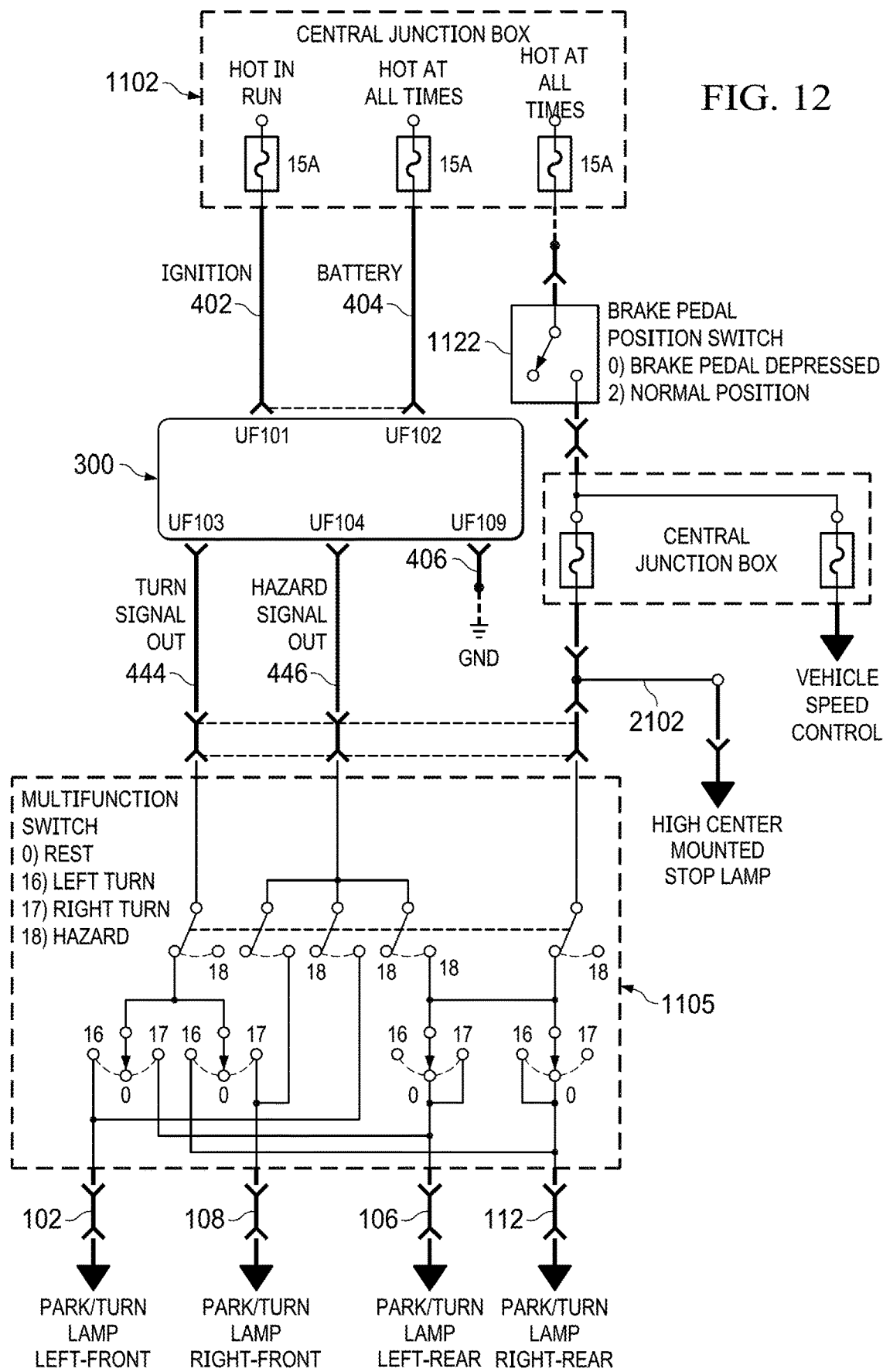
FIG. 12 is a wiring diagram showing an embodiment of a strobe module according to aspects of the present disclosure installed into the five-pin flasher system of FIG. 11.

Referring now to FIG. 12, the five-pin flasher system of FIG. 11 is shown with the strobe module 300 of the present disclosure inserted therein. The strobe module 300 takes the place of the flasher module 1106 of the existing system. When the ignition connection 402 and the battery connection 404 are both powered, the strobe module 300 provides strobing outputs on the hazard signal output 446 and may provide a signal output on the turn signal output 444. As before, the multi-function switch 1105 is wired to determine which of the signal lamps receive the respective signal from the strobe module 300.

Figure 13:
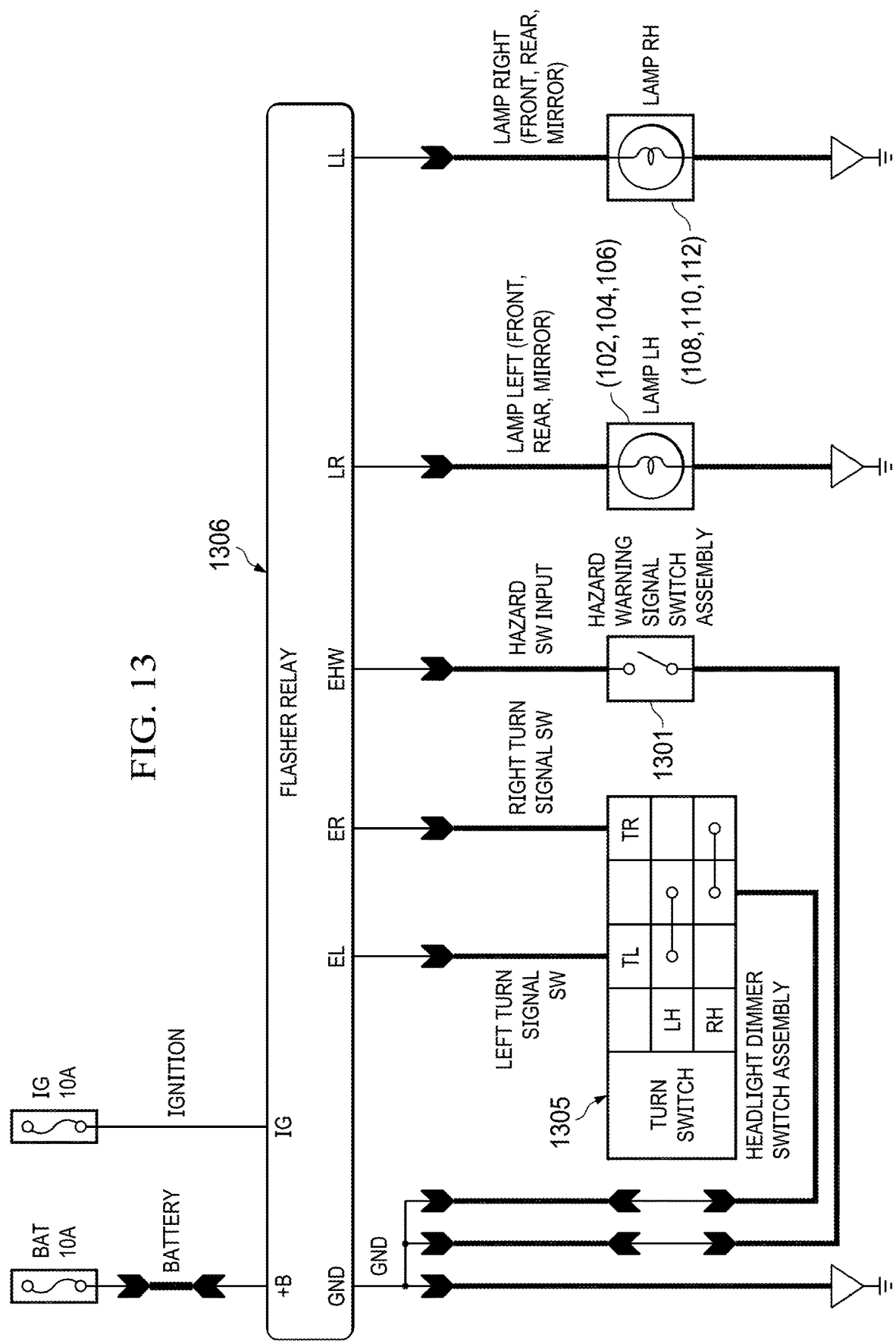
FIG. 13 is a wiring diagram of an eight-pin flasher system.

Referring now to FIG. 13, a wiring diagram of an eight-pin flasher system is shown. The eight-pin flasher system of FIG. 13 interacts with the existing flasher relay 1306 via eight separate pins. A turn switch 1305, which may be associated with a steering column mounted stalk, signals to the existing flasher relay 1306 whether a left or right turn signal has been activated. The existing relay then provides the appropriate flashing output on either the left or right side signal lights. A separate hazard flasher switch 1301 indicates to the existing flasher relay 1306 when a hazard condition has been signaled in the flasher relay 1306 illuminates all of the signal lights in the traditional flashing manner.

Figure 14:
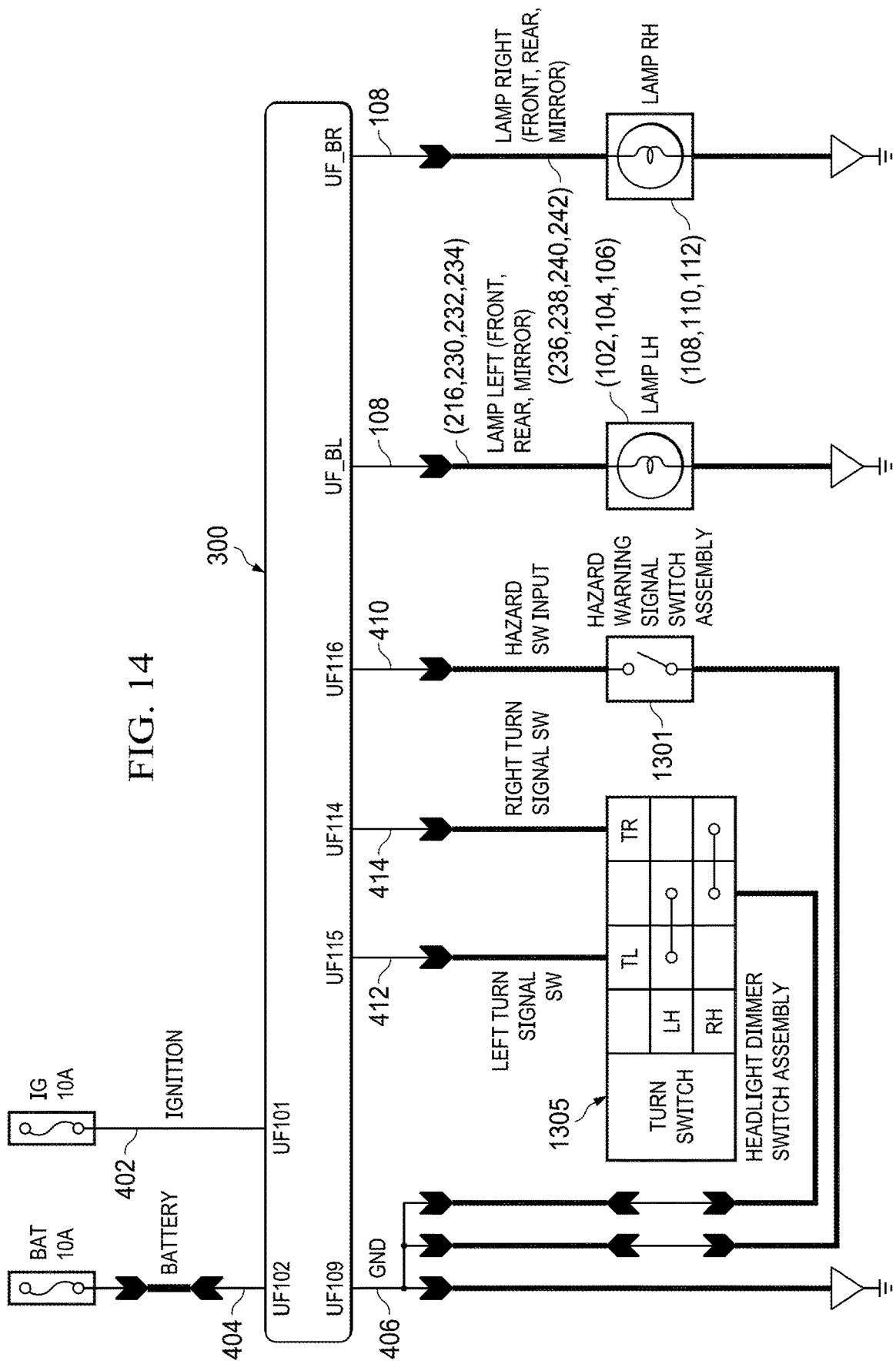
FIG. 14 is a wiring diagram showing an embodiment of a strobe module according to aspects of the present disclosure installed into the eight-pin flasher system of FIG. 13.

Referring now to FIG. 14, a wiring diagram showing the eight-pin flasher system of FIG. 13 equipped with a strobe module 300 according to aspects of the present disclosure is shown. Here, the strobe module 300 is connected to an ignition power switch via ignition connection 402 and is connected to the battery via battery connection 404. The ground connection 406 is also utilized. Outputs from the existing turn signal switch 1305 are provided in the case of the left turn signal to the left turn signal switch input 412 and in the case of the right turn signal to the right turn signal input 414. The separate hazard switch input low 410 is provided since the shown eight-pin flasher system activates the hazard flasher by grounding the pin. Based upon the signal received on inputs 412, 414, 410 the strobe module 300 acts either as a turn signal activating only the left or right side lights or acts as a flash module and provides a strobing output on all of the signal lights. These may include left side lamps 102, 104, 106 and right side lamps 108, 110, 112. It will be appreciated that the strobe module 300 may have outputs dedicated to each of the individual lamp positions as previously described. These may each be used or only one may be used for each side of the vehicle.

Figure 15:
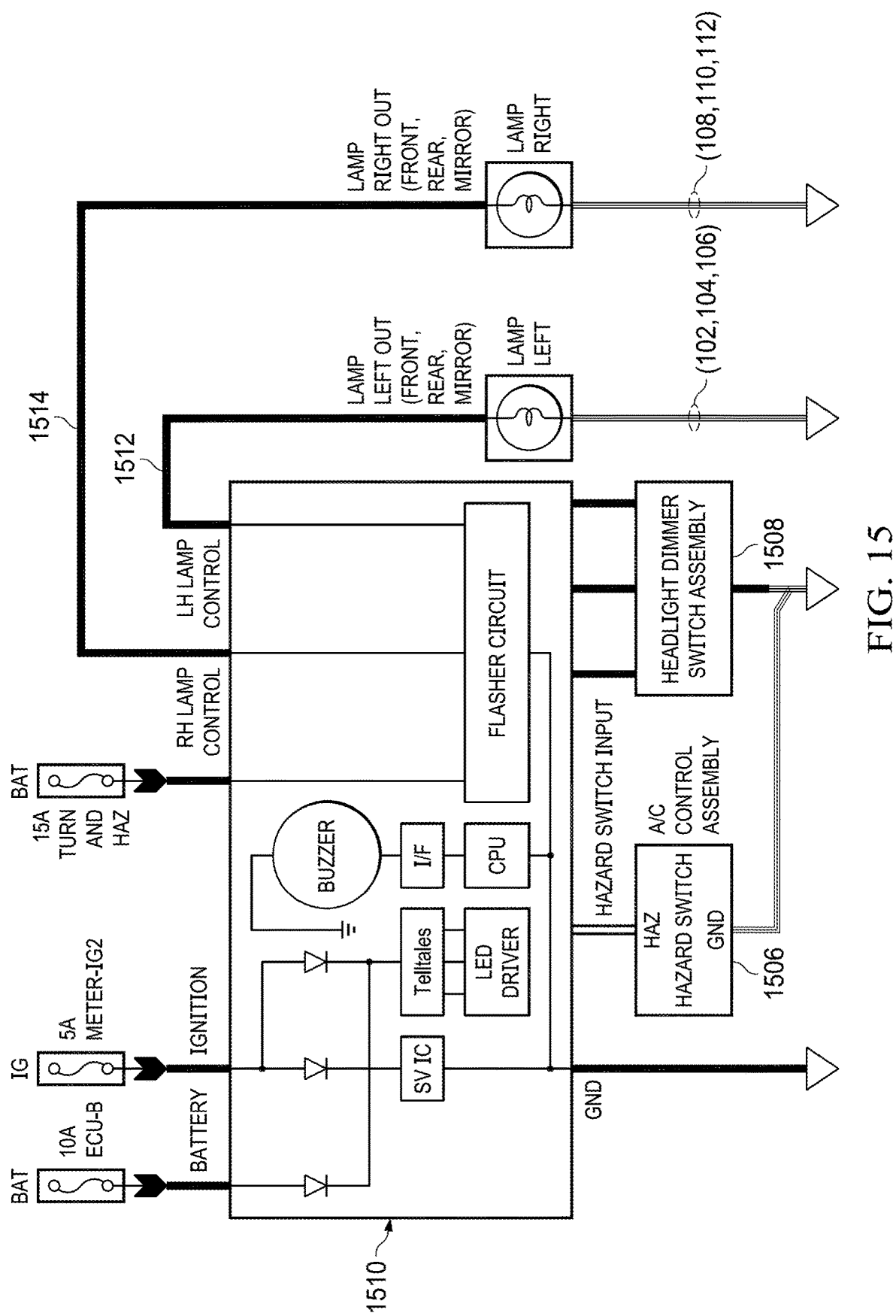
FIG. 15 is a wiring diagram of a flasher system controlled by a body control module (BCM).

Referring now to FIG. 15, a wiring diagram of a flasher system controlled by a BCM is shown. As previously described, BCM systems are not necessarily well documented. However, based on functions provided by various BCMs, certain internal components are known (for example, as shown, interior to BCM 1510). Typically, a BCM will receive inputs both from a hazard switch 1506 as well as turn signal indicators. Left side outputs 1512 controls the left side lamps 102, 104, 106 and a right side output 1514 may control right side lamps 108, 110, 112.

Figure 16A:
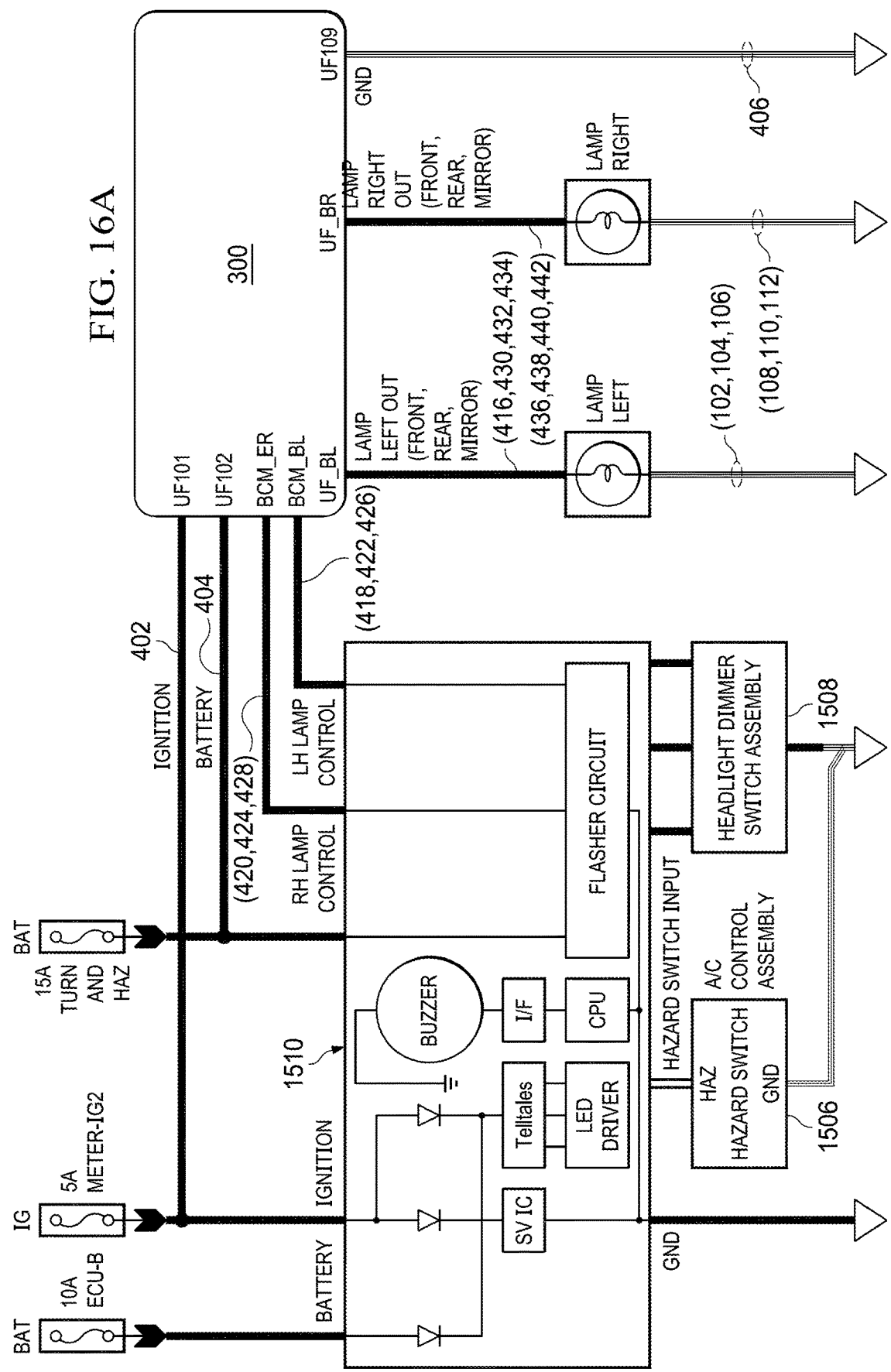
FIG. 16A is a wiring diagram showing an embodiment of a strobe module installed into the BCM controlled flasher system of FIG. 15.

Referring now to FIG. 16A, a wiring diagram showing the strobe module 300 of the present disclosure installed in a BCM system is shown. In the installation of FIG. 16A, the strobe module 300 may be required to be separately connected to the ignition by the ignition connection 402 and to the battery by the battery connection 404. The strobe module 300 then intercepts the output from the BCM 1510 to determine when signal lights or hazard lights have been activated. All or only part of the connections available on the BCM input block 306 may be utilized. These may include a front left lamp input 418, a rear left lamp input 422, a left mirror lamp input 426, as well as the corresponding inputs on the right side of the vehicle such as the front right lamp input 414, the rear right lamp input 422, and the right mirror lamp input 428. Similarly, depending upon the particular configuration all or perhaps only some of the lamp driving outputs of the strobe module 300 may be utilized. For example, regarding the left side of the vehicle, the left mirror lamp output 416, the front left lamp output 430, the rear left lamp output 432, and/or the meter output 434 may be utilized. With regard to the right side of the vehicle, the right mirror lamp output 436, the right front lamp output 438, the right rear lamp output 440, and/or the meter output 442 may be utilized. Lamps may include but are not limited to the left front lamp 102, left mirror lamp 104, and left rear lamp 106. On the right side, the lamps may include but are not limited to the front right lamp 108, the front mirror lamp 110, and the right rear lamp 112.

Figure 16B:
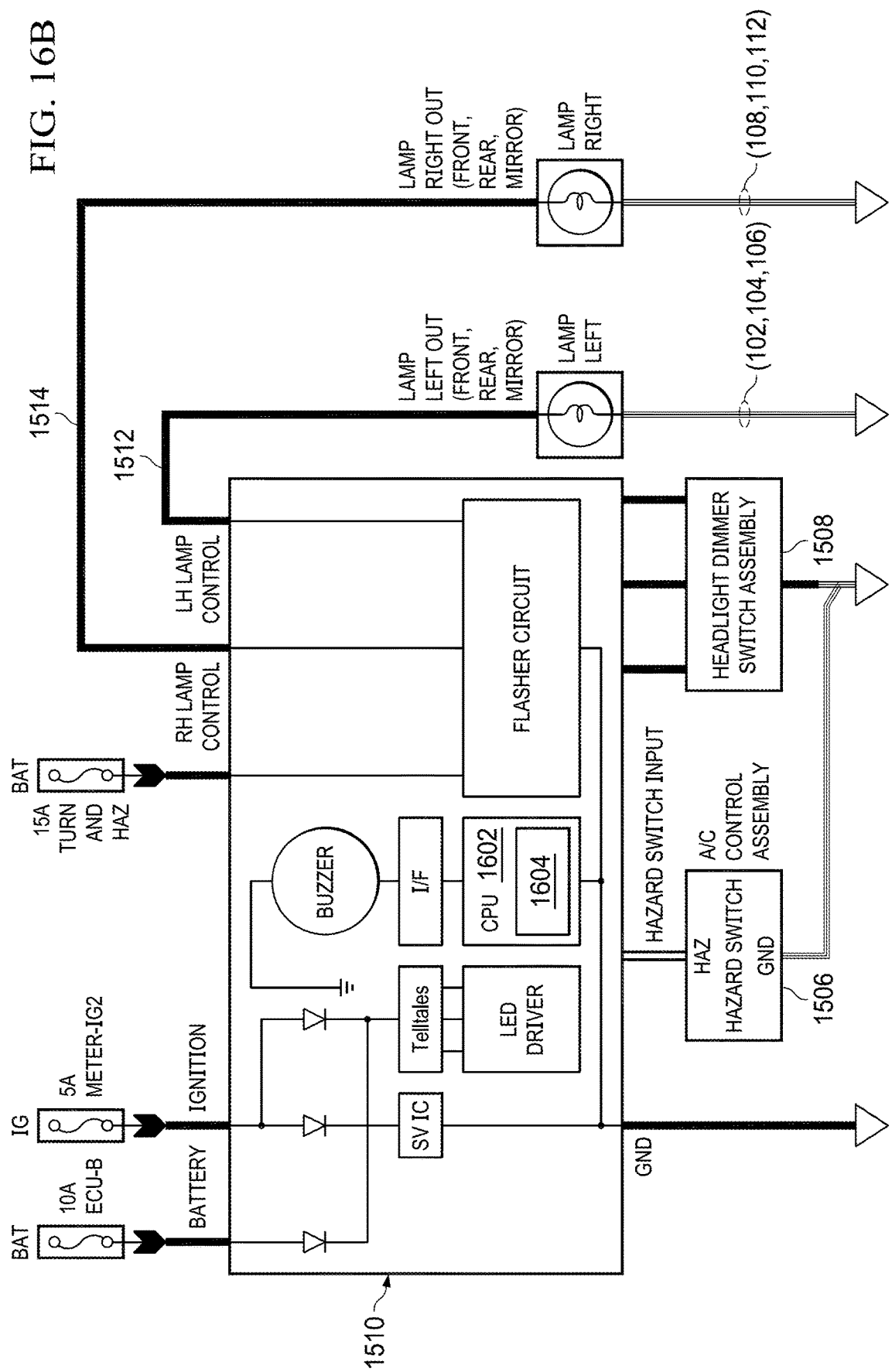
FIG. 16B is a wiring diagram showing an embodiment of a strobe module installed into the BCM controlled flasher system of FIG. 15 via modification of a microcontroller.

Referring now to FIG. 16B is a wiring diagram showing an embodiment of a strobe module installed into the BCM controlled flasher system of FIG. 15 via modification of a microcontroller. As previously described, and as known to those of skill in the art, the BCM 1510 may comprise one or more microcontrollers or central processing units 1602. The CPU 1602 may execute the logic associated with the various functions of the BCM including, but not limited to, operation of the signal lights and hazard lights. Here, the BCM 1502 is configured to directly control the strobing functions of the hazard lights as described herein (in contrast to the system of FIG. 16A where the strobing functions are implemented "downstream" of the BCM). This may be accomplished by an auxiliary chip 1604 that may contain memory and instructions for proper timing of the hazard lights (e.g., a strobe effect or effects). Such an auxiliary chip 1604 may be wired to the BCM 1510 or CPU 1602 directly or may communicate with the BCM 1510 or CPU 1602 via a bus (not shown) such as a controller area network (CAN) bus (many vehicles today are already equipped with a CAN bus). In another embodiment, additional chips or memories are not needed as the BCM 1510 contains all of the necessary logic and timing information to drive the vehicle lights in a strobing fashion in response to inputs from the hazard switch and/or signal stalk.

It should be understood that the various configurations described above and illustrated in FIGS. 5-16B employing various embodiments of strobe modules according to the present disclosure are illustrative only, and should not be taken as exhaustive. One of skill in the art can develop additional configurations employing the functions and abilities of various embodiments of strobe modules (e.g., strobe module 300) described herein.

In operation, once installation is complete, and depending upon the existing vehicle circuitry and the limitations inherent therein, more than one strobe pattern may be accessed and activated by the driver or user. For example, upon an initial activation of the strobe module 300 in the context of deployment of a hazard switch, the strobe module 300 may be programmed to flash in the traditional manner (e.g., with a cycle of about 2 Hz). A second press of activation of the vehicle's hazard switch (e.g., hazard switch 206 of FIG. 2) may result in the strobe module switching from a slow cycle to a strobing cycle (e.g., around 8 Hz). Further options can be embedded or programmed into strobe module (e.g., using the microcontroller 102) such as strobe pattern that moves from right to left or vice versa. One such pattern is illustrated in FIG. 17 where the left side lights strobe briefly and then cease while the right side lights strobe slightly longer before the cycle repeats. This is suggestive that traffic or other observers of the hazard lights should move to the right. A similar pattern can be developed to suggest movement to the left as shown in FIG. 18.

Figure 19:
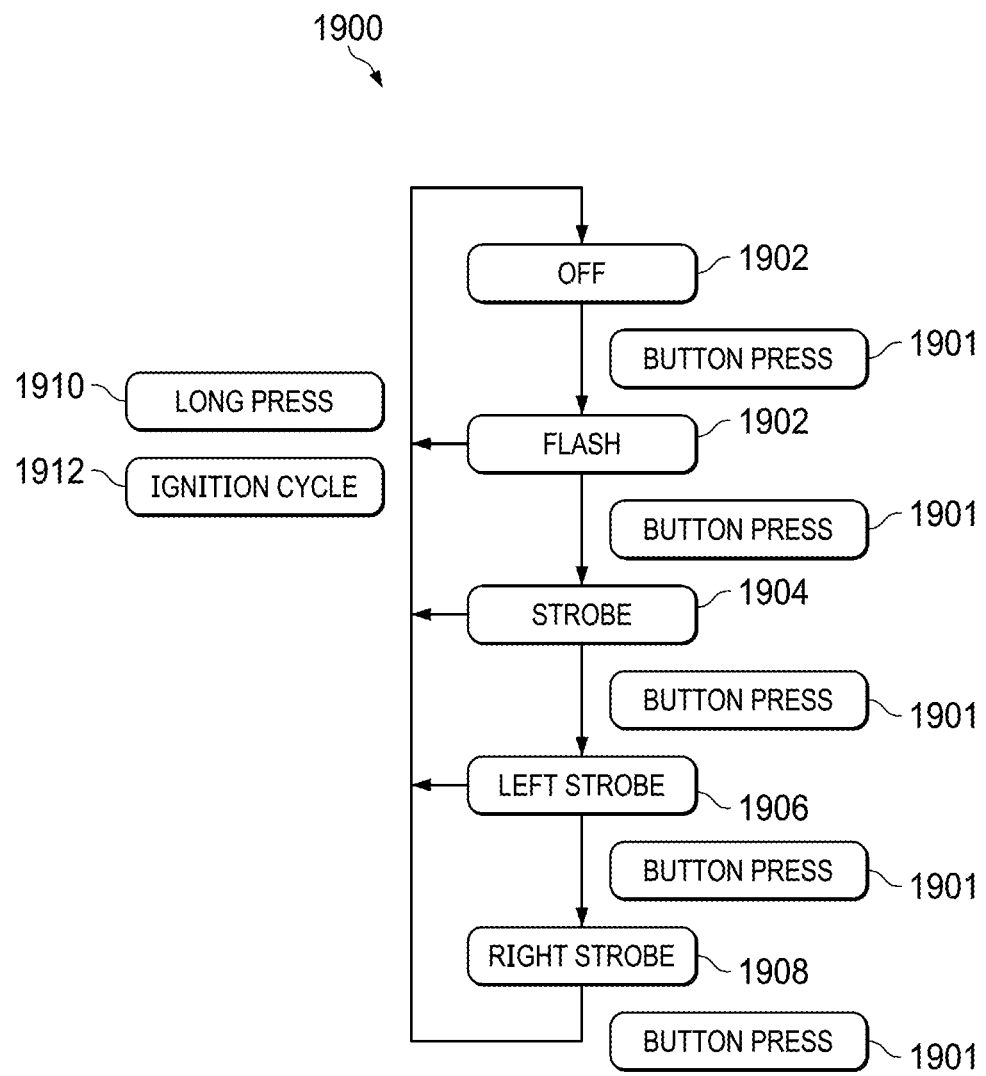
FIG. 19 is a state diagram corresponding to one method of operating a strobe module according to aspects of the present disclosure.

An exemplary state diagram corresponding to the operation of the strobe module 300 is shown in FIG. 19. In some embodiments, continued presses of the hazard switch are needed to cycle the strobe module, as shown in FIG. 19. An off state is shown at 1902. A single button press 1901 or switch throw (e.g., deployment of the hazard switch 206) may move the strobe module 300 to a traditional flashing configuration 1902. From here, another press 1901 moves the strobe module 300 to a strobe 1904. In some embodiments, further presses 1901 move the module 300 to a right to left strobe 1906 and a left to right strobe 1908. However, depending upon the switch gear available in the existing vehicle into which the strobe module 300 is installed, a single, long press 1910 of the hazard switch may be used to reset the strobe module to off 1902 from any other state. In another embodiment, cycling or interrupting the power supply to the strobe module through the ignition (e.g., ignition connection 402) may be employed to "reset" the strobe module 300.

Figure 20:
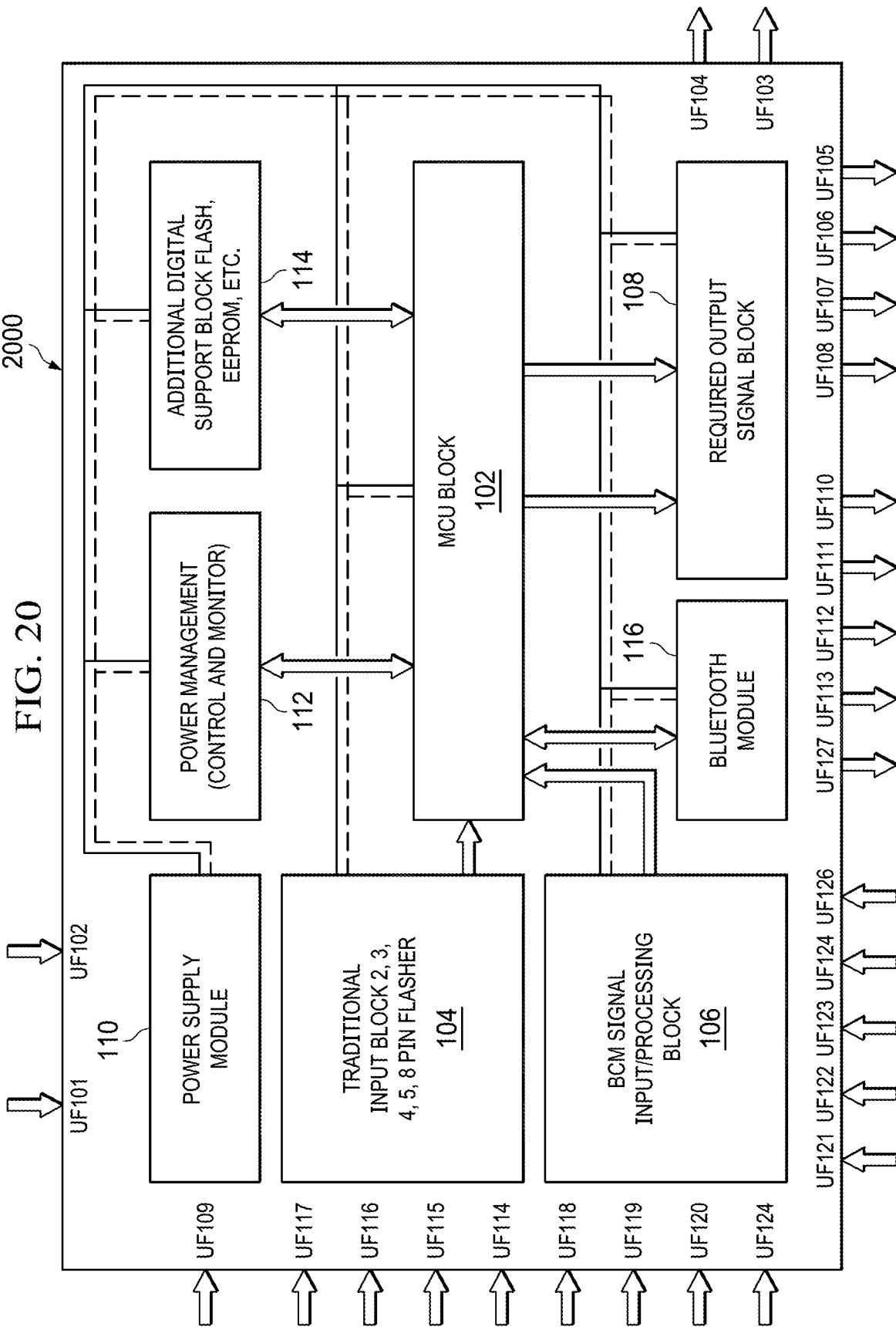
FIG. 20 is a block diagram of a strobe module according to aspects of the present disclosure.
Figure 21:
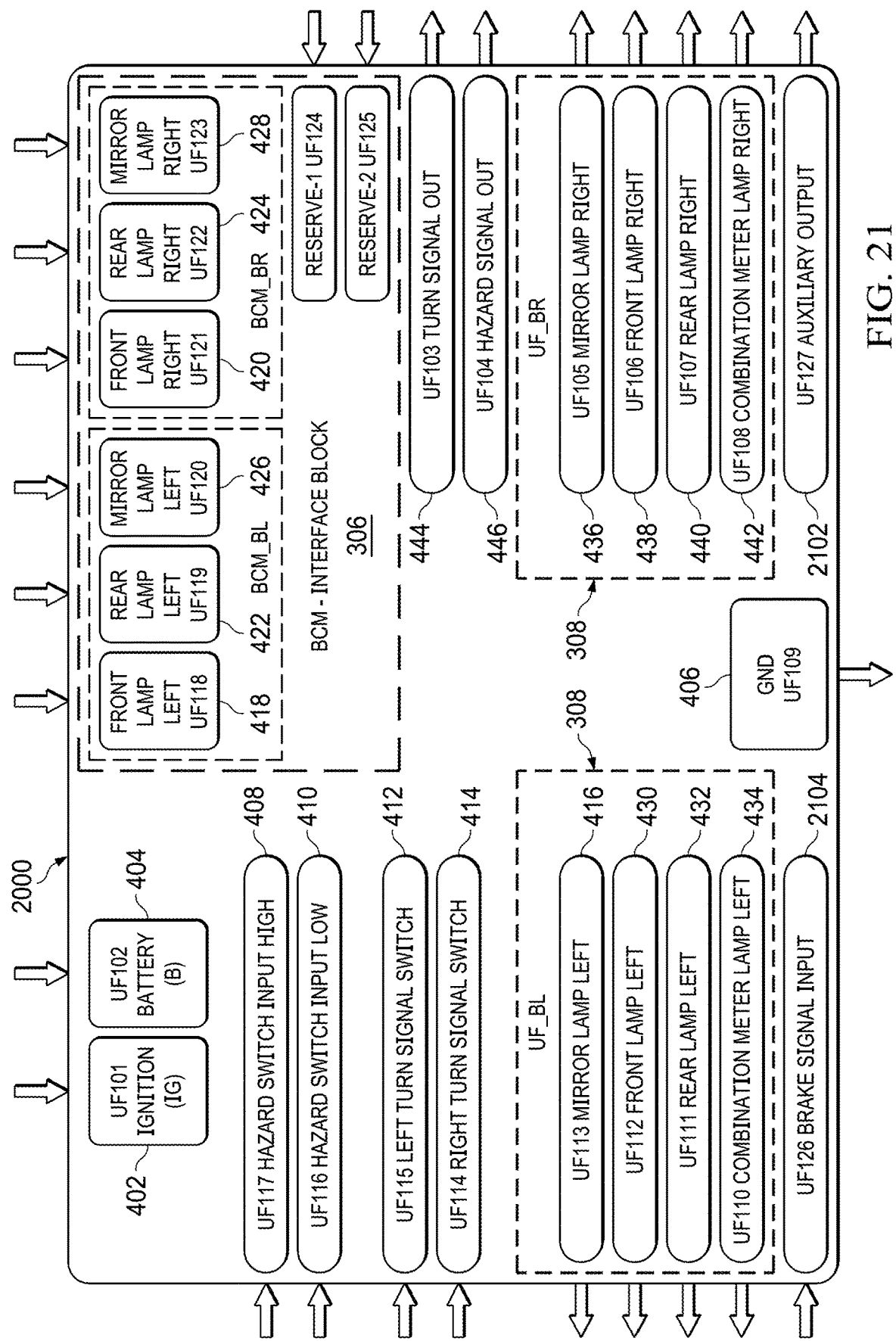
FIG. 21 is a schematic input/output diagram of the strobe module of FIG. 20.

Referring now to FIG. 20, a block diagram of a strobe module 2000 according to aspects of the present disclosure is shown. Referring also to FIG. 21, a schematic input/output diagram of the strobe module 2000 is shown. The strobe module 2000 is substantially similar to the strobe module 300 previously described but has additional inputs and outputs as described herein. The strobe module 2000 has the ability to incorporate additional vehicle lighting that is not a part of usual signal light setup of the vehicle into which it is installed. The additional lighting may be purpose-specific (installed specifically to be a part of the strobe effect) but, perhaps more importantly, may be lights that already have a function or use by the subject vehicle. For example, the additional lighting may include headlights, tail lights, fog lights, marker lights, brake lights, internal lights or others. Such lighting that already has a purpose or use on the vehicle may be referred to as multi-purpose lighting. In other words, the multi-purpose lighting has an existing use on the vehicle, but will gain an additional use by connection to the strobe module 2000, namely, a strobing function. From the point of view of the strobe module 2000, the multi-purpose lighting may be considered multi-purpose auxiliary lighting since it is not a part of the normal standard flasher system that is being augmented or replaced by the functionality provide by the strobe module 2000.

As shown in FIG. 21, the strobe module 2000 may provide an auxiliary light output 2102 that may be used to selectively illuminate or strobe one or more multi-purpose auxiliary lights. In some embodiments, more than one auxiliary light output may be provided. With all auxiliary light outputs, the function of the associated light (which may be one or multiple LEDs) may be to strobe when activated by the output 2102. In this way, the multi-purpose light can be made to strobe along with the existing vehicle hazard flashers, thereby increasing the visibility and utility of the systems of the present disclosure. As previously described, the strobe module 300 is capable of strobing lights associate with one side of the vehicle or the other independently (e.g., to generate a left to right strobe or vice versa). The strobe module 2000 provides the same ability and it may associate the one or more auxiliary light outputs 2102 with either or both "banks" of strobing lights. In other words, the auxiliary light output 2102 may be activated when the left side outputs 416, 430, 432, and/or 434 are activated, when right side outputs 436, 438, 440, and/or 442 are activated, or when either left or right side outputs are activated. In some embodiments, the auxiliary light output 2102 may be activated alone, or independently of the left side outputs 416, 430, 432, and/or 434 or right side outputs 436, 438, 440, and/or 442.

Although the auxiliary light output 2102 could be used to power a light having no additional purpose (e.g., a light or set of lights purposely installed only for strobing), the auxiliary light output 2102 is utilized in other embodiments to control or strobe a light that may already be configured to operate in an existing circuit. In one particular embodiment, the auxiliary light output 2102 may be used to activate a vehicle's existing high center mounted stop lamp (HCMSL). The existing HCMSL (or any other auxiliary light) could be disconnected from its original circuit and simply used as a part of the strobing systems of the present disclosure. However, it may be strongly preferred to not only provide strobing operations to the existing light, but also to retain its original function.

As one possible means for allowing consideration and integration of the existing function of the auxiliary multi-purpose light, the strobe module 2000 may provide an auxiliary light input 2104 that accepts input that would otherwise signal or power the associated auxiliary multi-purpose light. This input 2104 may be utilized to signal the strobe module 2000, and specifically the microcontroller 302, when the existing vehicle systems indicate that the auxiliary multi-purpose light should be activated or illuminated whether the strobe module 2000 is currently employing the associated auxiliary multi-purpose light in a strobing capacity or not.

Figure 22:
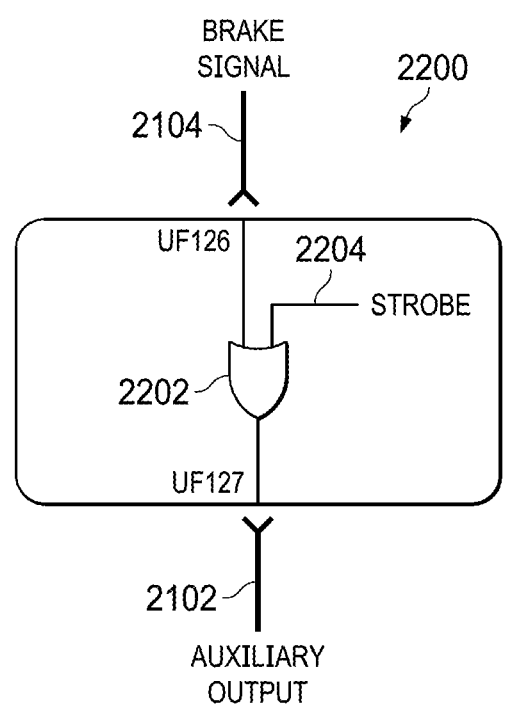
FIG. 22 is a schematic diagram of an OR function implemented by a strobe module of the present disclosure.

Referring now also to FIG. 22, a schematic diagram of an OR function implemented by the strobe module 2000 of the present disclosure is shown. The function of the OR circuit 2200 is represented here logically by the OR gate 2202 (although as explained further below it may not be implemented by a digital gate but by mechanical relays, solid state relays, field effect transistors, bipolar junction transistors, or any other switching scheme that is appropriate for reliable operation of the system). In operation, the circuit 2200 accepts the auxiliary light input 2104 as one input to the OR gate 2202. A second input to the OR gate is generated internally (e.g., by the microcontroller 302) and becomes active when the strobe module 2000 operates to strobe whatever light or lights may be connected to the auxiliary light output 2102.

The OR circuit 2200 may be implemented within the same physical packaging as the other components of the strobe module 2000, or may be implemented externally. Again, the illustrated OR gate 2202 is only a logical representation. Physically, the OR gate 2202 and the functionality of the circuit 2200 may be implemented via mechanical relays, solid state relays, field effect transistors, bipolar junction transistors, or any other switching scheme that is appropriate for reliable operation of the system.

Figure 23:
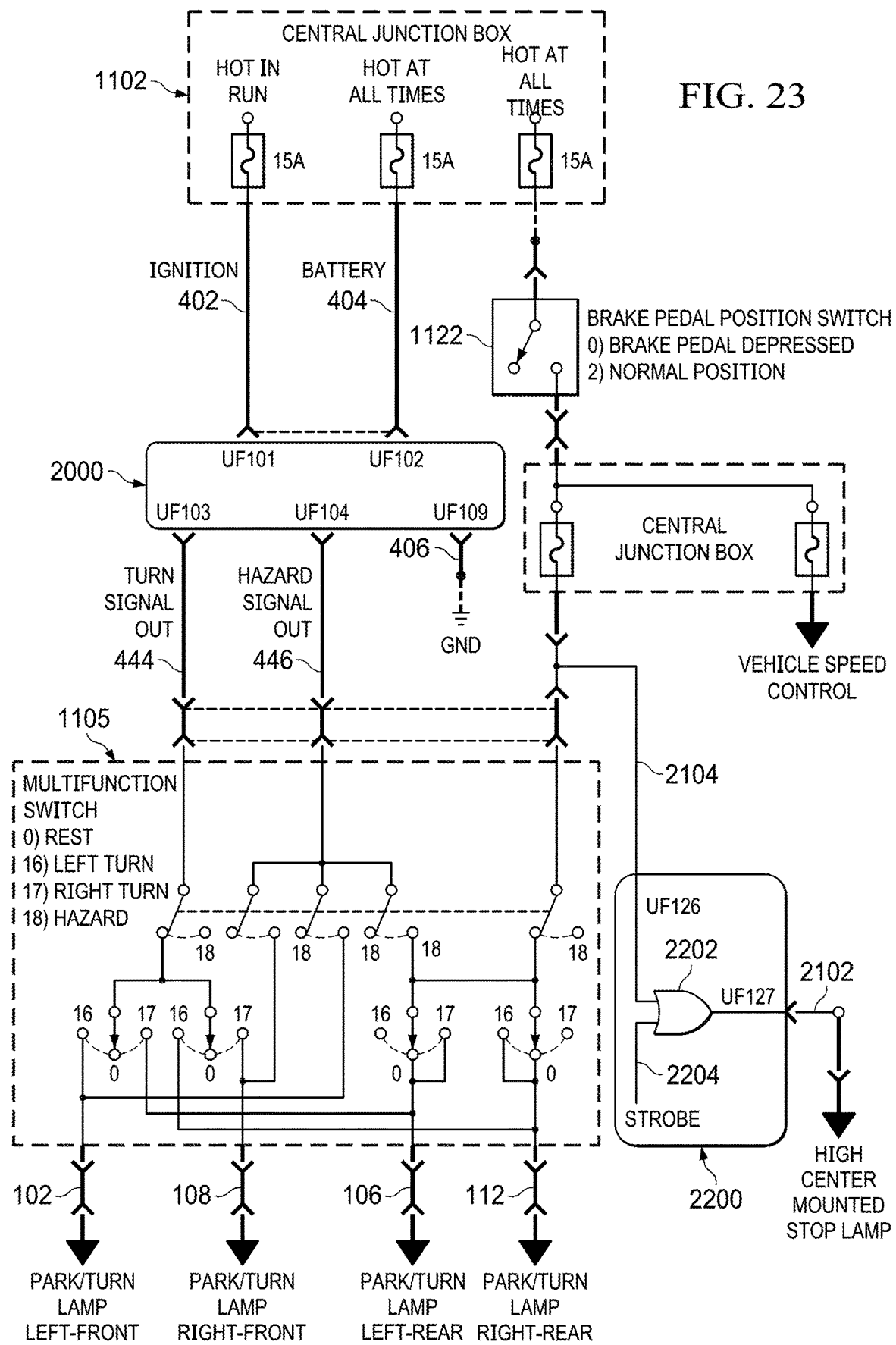
FIG. 23 is a wiring diagram of a strobe module of the present disclosure installed into a five-pin flasher system and additionally controlling a high center mounted stop lamp.

Referring now to FIG. 23, a wiring diagram of the strobe module 2000 installed into a five-pin flasher system and additionally controlling a high center mounted stop lamp (HCMSL) as a multi-purpose auxiliary lamp is shown. It should be understood that the HCMSL is only one option for a multi-purpose auxiliary lamp and the strobe module 2000 is capable of utilizing additional or different multi-purpose auxiliary lamps or lights associated with the vehicle into which the strobe module 2000 is installed. The five-pin flasher system before modification with the strobe module 2000 can be seen back in FIG. 11. The five-pin flasher system including modification with the strobe module 300, that did not include auxiliary light control, can be seen in FIG. 12.

Except where otherwise indicated, the strobe module 2000 integrates with the five-pin system similarly to the manner in which the strobe module 300 does. In the case of the strobe module 2000 having auxiliary multi-purpose light controls, the auxiliary light input 2104 of the OR circuit 2200 is connected to the power lead or signal that would normally feed to the HCMSL. An internal strobe signal 2204 feeds into the logical OR gate 2202 along with the input 2104. If either of these inputs 2104, 2204 are active, the gate 2202 provides a signal or power on the multi-purpose auxiliary output 2102 resulting in illumination of the HCMSL.

From the described arrangement, it should be understood that the application of the brake pedal in the vehicle in which the strobe module 2000 is installed will always result in steady illumination of the HCMSL as a user would expect. Only if the HCMSL is not otherwise activated by the vehicle will the strobe module 2000 be able to activate the same. In this way, function of any auxiliary lamp or light is only enhanced by the strobe module 2000. The HCMSL or any other auxiliary multi-purpose lamp to which the strobe module 2000 is connected may be strobe activated along with the existing hazard flasher lights. In cases where the hazard lights are strobed in groups (e.g., left to right or right to left) the auxiliary multi-purpose lamp may be strobed along with one of these groups, or may be strobed as its own groups (e.g., left, center, then right strobe, or vice versa). In some embodiments the connected auxiliary multi-purpose lamps may be strobed alone. It should be appreciated that all of these functions may be controlled by the vehicle's existing hazard switch (e.g., hazard switch 206 of FIG. 2). The functions may be activated by sequential presses or activations of the switch 206 such that additional controls or switchgear are not required to be installed in the user's vehicle. However, in cases where a user desires multiple controls or switches, the same could be installed and accommodated by the strobe module (300 or 2000) but at the expense of interior vehicle modifications that may not be desirable.

In some embodiments, the strobe module 2000 is activated solely by the switch 260 but may be controlled via Bluetooth or another wireless protocol. The wireless module 316 may be used to allow a user to set or select a particular strobe pattern or protocol. For example, with a single press of the switch 216 the traditional hazard flashers may be activated. Using wireless communication, the user might select that the HCMSL should be strobed while the existing hazard lights are flashed. The user might also select that all connected lights should strobe, or that a left to right or right to left pattern should be implemented. It should be understood that not only a HCMSL, but any auxiliary light might be employed in a similar manner by the strobe module 2000.

The strobe module 2000 can be integrated into any type of existing hazard flasher system in a similar manner as the strobe module 300 previously described. Further, in any system where deployment of an auxiliary or auxiliary multi-purpose lamp or light is desired (or a plurality of these), the same may be wired an implemented as shown in FIG. 23, for example. Once the strobe module 2000 is installed into the existing vehicle system as described herein, the multi-purpose auxiliary lights may be integrated by connecting the existing output from the existing vehicles system to these lights to the auxiliary input 2104 associated with the strobe module 2000 and the lights themselves connected to the output 2102. In this way, the original function of the respective auxiliary light is retained while it is also employed as part of the strobing function of the strobe module 2000.

Figure 24:
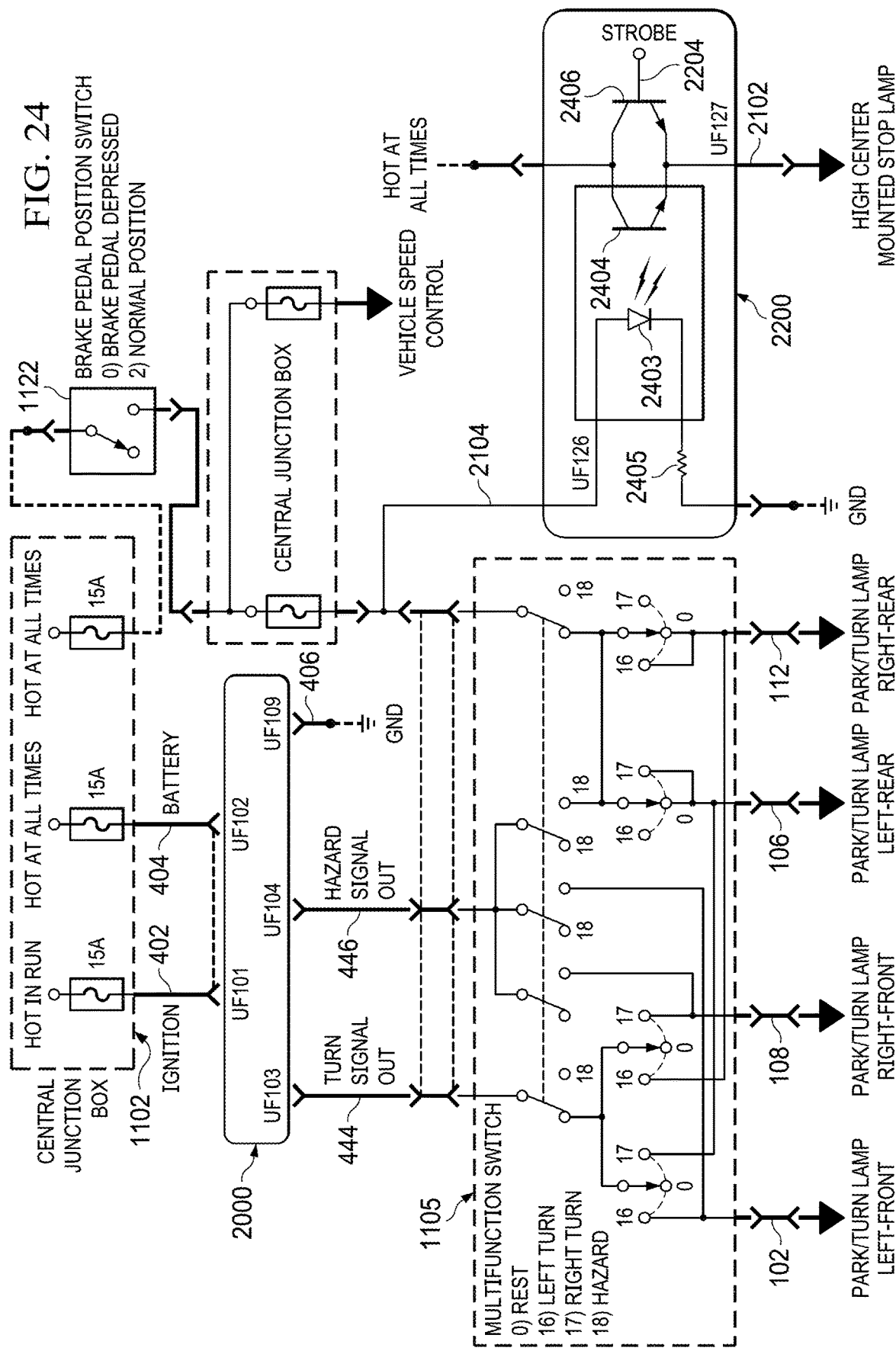
FIG. 24 is a wiring and schematic diagram illustrating further implementation options for a strobe module of the present disclosure installed into a five-pin flasher system and additionally controlling a high center mounted stop lamp.

Referring now to FIG. 24, a wiring and schematic diagram illustrating further implementation options for the strobe module 2000 of the present disclosure installed into a five-pin flasher system and additionally controlling an HCMSL. However, the HCMSL is exemplary only and the multi-purpose auxiliary lighting that may be connected as shown in FIG. 24 is not limited to an HCMSL. FIG. 24 represents one option for isolating and protecting the function of the HCMSL (or other multi-purpose auxiliary light) while incorporating the same into the strobing functions of the strobe module 2000. The OR circuit 2200 (which may be integrated physically with the rest of the strobe module 2000 or may be physically separate as needed) provides the auxiliary input 2104 for taking the output that would otherwise go directly to the HCMSL or other multi-purpose auxiliary light. As a part of the OR circuit 2200, this input 2104 feeds into an optoisolator 2402. The connection from the input 2104 feeds to a light emitting diode (LED) 2403 internal to the optoisolator 2402. If necessary, the LED 2403 may be grounded through a resistor 2405. When the input 2104 becomes active or energized the LED produces photons which are detected by a paired phototransistor 2104. When the phototransistor 2104 is activated by the LED 2403, current and voltage are provided at the output 2102 to power the HCMSL or other auxiliary lighting device. The voltage and current to power the output 2102 may be provided through the power supply module 310, or from a separate full time or ignition switched connection to vehicle power.

In parallel with the phototransistor 2404 is a second transistor 2406 which may be activated to allow current flow by the internal circuitry of the strobe module 2000 (e.g., it may be controlled directly via the microcontroller 302). Internally this may be denoted as strobe signal 2204.

It should be appreciated that the OR circuit 2200 as shown in FIG. 24 allows for the original function of the HCMSL or other multi-purpose auxiliary light to be achieved via the optoisolator 2402 (whether a flash, steady state, or other) while the same device can be activated by the strobe module 2000. Naturally, as long as either the existing vehicle systems or the strobe module 2000 activate the HCMSL or other multi-purpose auxiliary light, the same will illuminate. It should also be appreciated that a steady state illumination by the vehicle systems will override any strobe or any intermittent activation on the part of the strobe module 2000. Thus existing vehicle functions of the HCMSL or other multi-purpose auxiliary light or not coopted, but only enhanced.

Figure 25:
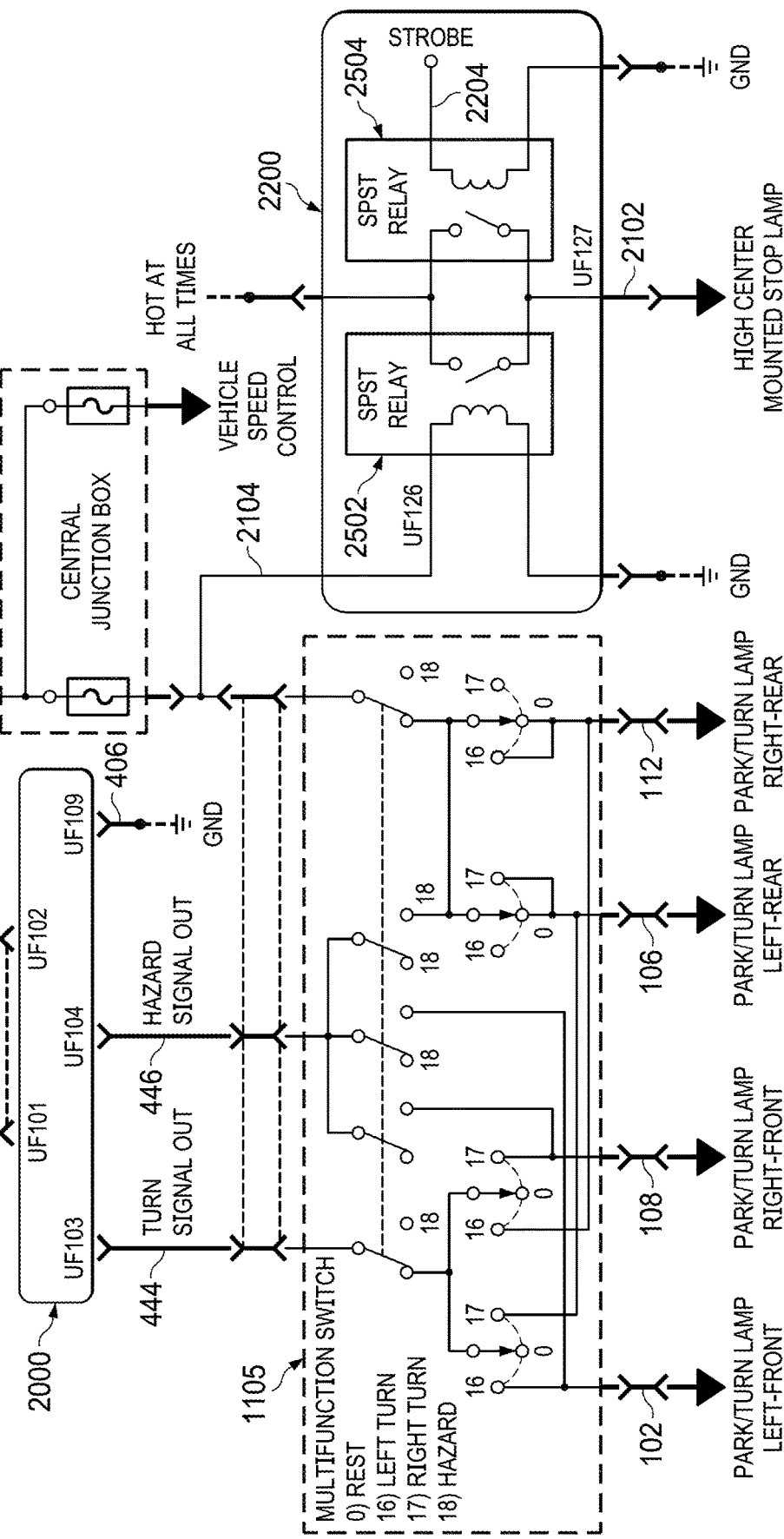
FIG. 25 is another wiring and schematic diagram illustrating further implementation options for a strobe module of the present disclosure installed into a five-pin flasher system and additionally controlling a high center mounted stop lamp.

Referring now to FIG. 25, another wiring and schematic diagram illustrating further implementation options for a strobe module 2000 of the present disclosure installed into a five-pin flasher system and additionally controlling a high center mounted stop lamp is shown. Here the OR circuit 2200 comprises a pair of single pole, single throw (SPST) relays 2502 and 2504. The relay 2502 accepts the input 2104 and, upon activation of the same by the vehicle, closes to supply power and voltage to the HCMSL or other auxiliary light on output 2102. Similarly, relay 2504 closes upon input from the strobe signal 2204. It can be appreciated that if either relay 2502, 2504 closes as a result of activation of input 2104 or strobe signal 2204, respectively, the output 2102 becomes energized. Thus the system functions substantially similar to that of FIG. 24.

Figure 26A:
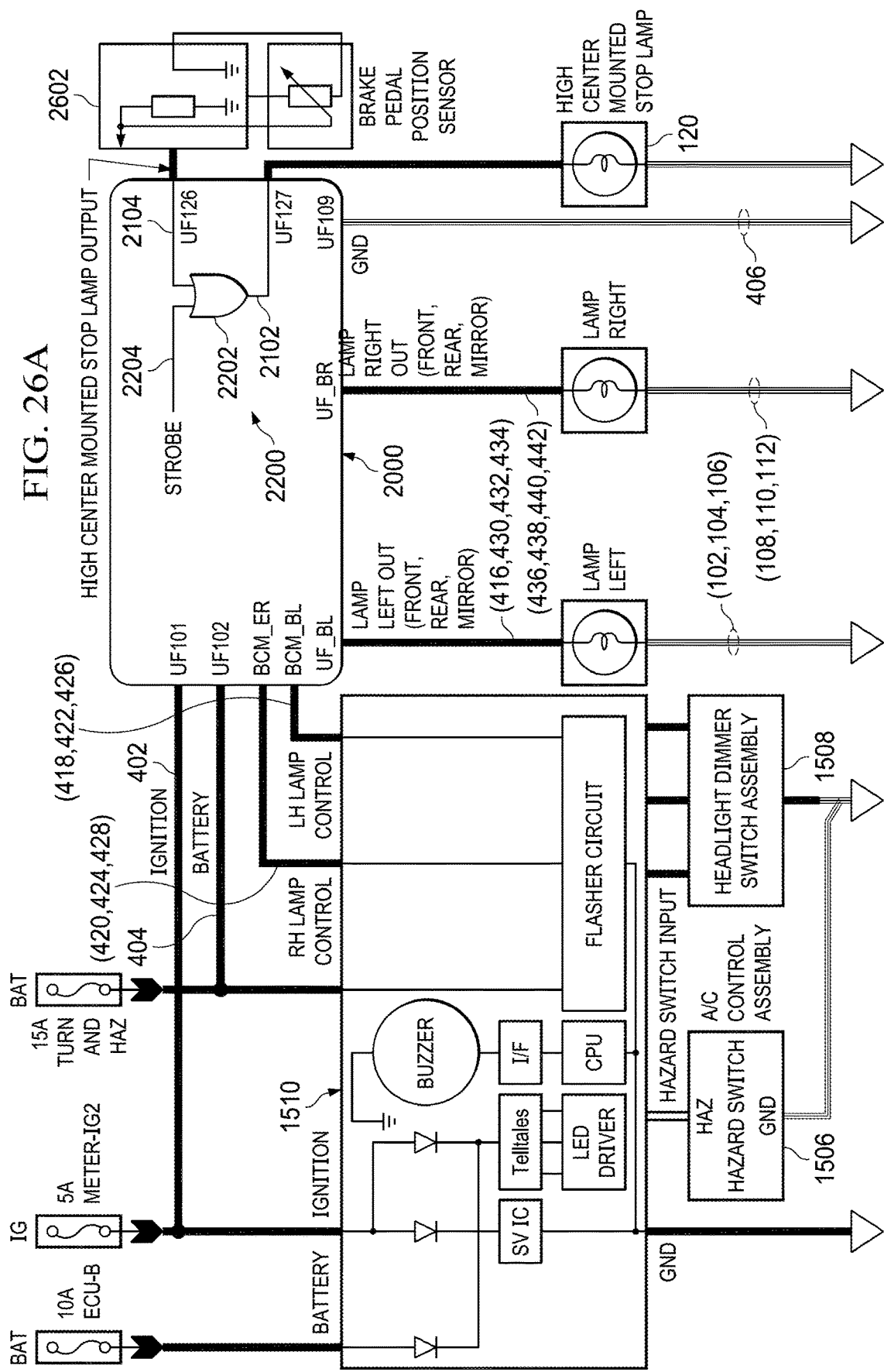
FIG. 26A is a wiring diagram illustrating a strobe module of the present disclosure controlling a high center mounted stop lamp and installed with a BCM flasher system.

Referring now to FIG. 26A a wiring diagram illustrating the strobe module 2000 installed with a BCM flasher system and controlling an HCMSL is shown. The system of FIG. 26A is shown prior to modification in FIG. 15 above. It is also shown after installation of the strobe module 300 (without HCMSL or other auxiliary control) in FIG. 16A. Here in FIG. 26A it can be seen that the strobe module 2000 may be installed into a BCM based system in a substantially similar manner as the system 300 with respect to existing hazard lights. The strobe module 2000 is shown in FIG. 26 with additional control over an HCMSL 120. As with previous embodiments, the HCMSL is exemplary of a multi-purpose auxiliary light but other multi-purpose auxiliary lights may be connected in a similar fashion for inclusion with the strobe functions of the strobe module 2000.

Here, the existing output to the HCMSL 120 is shown as output 2604 from a brake light activation circuit 2602 activated by a driver or vehicle occupant pressing the brake pedal. This output now becomes input to brake signal input 2104 feeding into the OR circuit 2200 or the strobe module 2000. It should be understood that whether the BCM itself controls the HCMSL 120 or whether it is controlled by a separate system or circuit of the automobile (e.g., brake light activation circuit 2602), the strobe module 2000 accepts the vehicle's normal output to the HCMSL 120 into input 2104. As previously described the OR circuit 2200 (which may be internal or external to the rest of the strobe module 2000) activates output 2102 in response to either an internal strobe signal (e.g., from the microcontroller 1602) or activation of the input 2104. Thus, as shown, the strobe module 2000 has functional control over all lights or lamps existing in the vehicle's signal light or hazard light circuit as well as the HCMSL 120 or other multi-purpose auxiliary lights. Thus, the strobe module 2000 can provide strobing functionality as described herein on a BCM controlled automobile setup including both signal or hazard lights as well as the HCMSL and/or other auxiliary or multi-purpose auxiliary lights. Any multi-purpose auxiliary lights will retain their original function (whether as a brake light or otherwise) as well as partake in strobing functionality when they are not otherwise deployed.

Figure 26B:
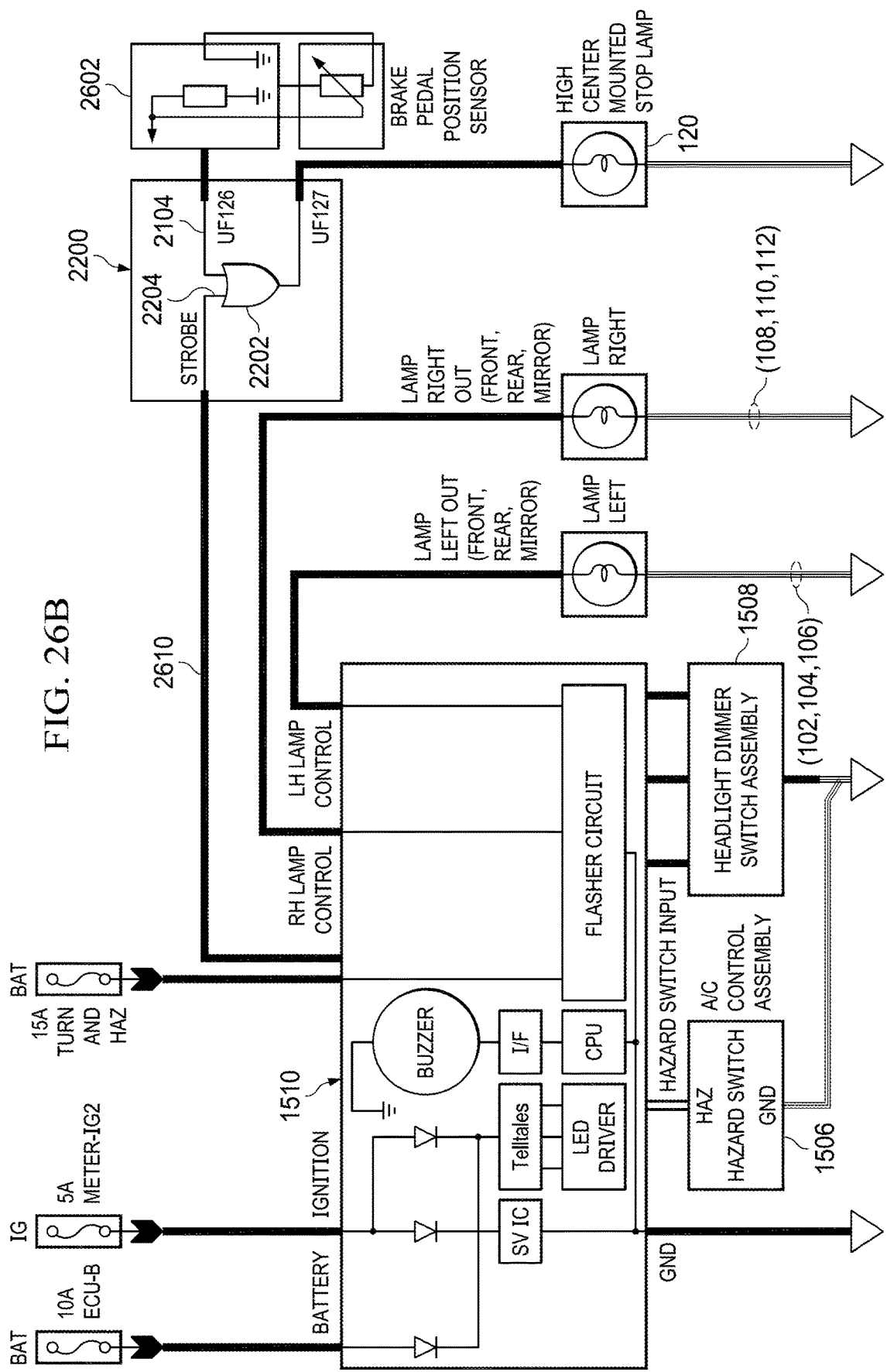
FIG. 26B is a wiring diagram showing an embodiment of a strobe module having multifunction light control capabilities installed into a BCM controlled flasher system via modification of a microcontroller.

FIG. 26B is a wiring diagram showing an embodiment of a strobe module having multi-purpose auxiliary light control capabilities installed into a BCM controlled flasher system via modification of a microcontroller. Similar to the embodiment shown in FIG. 16A, modifications to the existing functions of the BCM 1510 may be accomplished by an auxiliary chip 1604 that may contain memory and instructions for proper timing of the hazard lights (e.g., a strobe effect or effects). Again, such an auxiliary chip 1604 may be wired directly to the BCM 1510 or microcontroller 1602 or may communicate via a bus (not shown) such as a CAN bus. In order to integrate one or more multi-purpose auxiliary lights into a strobing program, one of the outputs from the BCM 1510 that provides a strobing output must be connected to such multi-purpose auxiliary light. Such a multi-purpose auxiliary light might be fed by one of the now strobe capable outputs to the existing vehicle flashers (e.g., one or more of 102, 104, 106, 102, 110, or 112).

On the other hand, in some embodiments, a separate strobe capable output 2610 from the BCM 1510 may feed into OR circuit 2200 to the strobe signal lead 2204. Output 2604 from brake activation circuit 2602 is connected to brake signal input 2104. In this manner, strobe activation may be controlled entirely by the BCM 1510 and one or more multi-purpose auxiliary lights, such as the HCMSL 120, may be integrated into the strobe functions while retaining its original function as well.

In another embodiment, additional chips or memories are not needed as the BCM 1510 contains all of the necessary logic and timing information to drive the vehicle lights (including the new output 2610) in a strobing fashion in response to inputs from the hazard switch and/or signal stalk. It should be appreciated that where the BCM 1510 can be made to control the strobing functions directly (either via auxiliary chip 1604 or by original programming or coding of a microcontroller), a separate OR circuit 2200 or may still be necessary to allow the multi-purpose auxiliary lights to be made a part of the strobing functions without loss of their original function. In cases of control of multi-purpose auxiliary lights exclusively by the BCM 1510 (e.g., where separate function of the auxiliary light is not needed or intended to be shared with another circuit such as a brake light circuit) all functionality might be achieved exclusively by programming, reprogramming, or augmented the logic on board the BCM 1510.

According to the present disclosure, there may be situations where systems such as those described above are restricted as to the conditions under which a high visibility strobe of any strobe-capable light may be deployed. In those embodiments utilizing a microcontroller, a BCM, or other electronic control device, various vehicle states may be taken into account when user or system input is received that is indicative of high visibility light deployment. For example, high visibility strobing may only be accessible when the vehicle is travelling below a certain speed (which would be more likely to be indicative of a genuine emergency). If a vehicle is below such a threshold speed when strobing lights are deployed, but then exceeds the speed, the microcontroller or BCM may deactivate the strobe and/or return hazard light operation to a "normal" low speed flash. In some embodiments, an audible or visual warning is be provided as the automobile approaches the threshold speed. This gives the operator or driver an opportunity to reduce speed and maintain high visibility strobing operation.

In other embodiments, additional vehicle states may be taken into account to allow strobing or other high visibility deployment at any speed. For example, if the vehicle ABS is active or has recently been active, strobing operation may be allowed at any speed, at least for a limited time. In other embodiments, strobing may be automatically active when ABS is active whether the operator has called for it or not. Other vehicle systems that are indictive of adverse road conditions may also provide input that may be taken into account with respect to strobing or non-strobing hazard light deployment. These include but are not limited to stability control, traction control, and rain or fog detection mechanisms.

Strobing may be automatically activated upon air bag deployment, or may be allowed at any speed following airbag deployment. In cases where the microcontroller or BCM that handles strobing operations can be provided with the appropriate information (e.g., via a Bluetooth or other communications module) that a vehicle operator or passenger is or has recently been in contact with police, EMS, fire department, etc., strobing may be allowed at least for a period of time.

Some newer vehicles are equipped with automated driving features such as adaptive cruise control, lane departure warning systems, and even full auto-park, auto-pilot/auto-drive systems. In some embodiments, utilization of specific automatic control features (not limited to those above) will preclude deployment of strobing functions by the associated microcontroller or BCM.

Systems that are suggestive of a distracted driver, who may have inadvertently deployed strobing functions, can also be used to limit strobing functions or cause a reversion to standard low-speed flashers. For example, if a vehicle entertainment system (e.g., radio, or DVD player) is above a certain volume, it may suggest distraction rather than genuine emergency thereby precluding strobing operations.

In certain embodiments, strobing of specific lights may only be deployed by the microcontroller or BCM based on vehicle inputs, but not solely on driver or operator manual input. For example, an operator may have the option to deploy hazard flashers at any time but the front facing flashers will only flash (not strobe) unless another vehicle system indicates the need for the same. The indicated need may come from a number of sources such as airbag deployment, ABS deployment, traction or stability control deployment or other sources.

In further embodiments, GPS information or information from other on-board sensors may be taken into account to determine when directional strobing is allowed, or to automatically deploy directional strobing. For example, information indicating to the microcontroller or BCM that the vehicle is stopped on or near the right side of a road way would result in a right to left strobe. This may occur automatically, based on user deployment, or following deployment by an automated system as described above. Similarly, if the vehicle is stopped on or near a left side of a road way, a left to right strobe may be deployed.

Information to determine an appropriate strobing direction may come from a number of sources. GPS is one example but other systems that are included with a vehicle or added-on may be utilized. For example, modern cars are provided with cameras, sonic sensors, radar sensors, and other input devices that can determine a vehicle's position on a road way with sufficient accuracy to enable lane departure warning, smart cruise control, and even automatic parking and driving features. Such sensors and systems may provide information to a hazard strobing microcontroller or BCM to enable the same to select the appropriate strobing pattern with or without explicit input from the driver or other user.

It will be appreciated that many decision trees can be implemented, logically, to determine when a user's request for strobing operation (whether via the hazard light switch or otherwise) is appropriate. In some embodiments more than one decision tree may be used depending on the circumstances of the driver and/or type of vehicle.

Strobing systems according to the present disclosure may rely upon a BCM, microcontroller, or other programmable device to allow fine-grained determination as to how and when to deploy a strobe over a low-speed flash. Such programming may be provided at the factory, or provided later by improved programming, updated firmware, etc. The present disclosure is not meant to be limited to specific means of providing the logical control and programming (unless recited in a claim). It should also be understood that the present disclosure is not mean to reduce safety, utility, or usefulness of any strobing system. Accordingly, in some embodiments, in cases where enough sensor input cannot be provided to determine if conditions warrant deployment of a strobing light, the default condition is to allow strobing upon user activation. This may occur where one or more vehicle sensors are defective or damaged.

Figure 27:
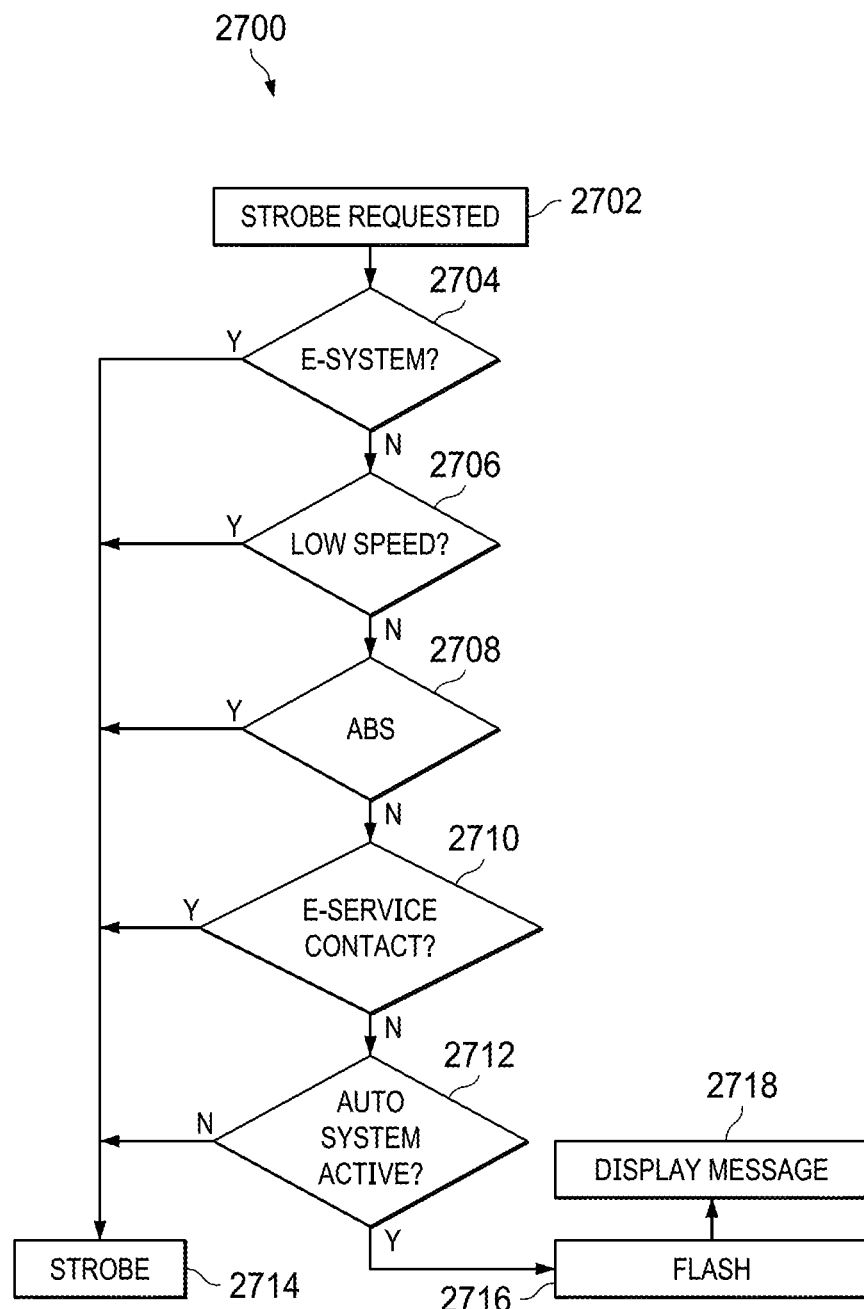
FIG. 27 is a flow chart depicting one embodiment of a decision tree for allowing strobing of hazard lights according to aspects of the present disclosure.

Referring now to FIG. 27, a flow chart 2700 depicting one embodiment of a decision tree for allowing strobing of hazard lights according to aspects of the present disclosure is shown. The flow chart 2700 may be suitable for implementation of various embodiments of systems and device according to the present disclosure. Such systems have capacity for implementation of the decision and logic represented by the flow chart 2700 by microprocessor, BCM, and/or combinations of various analog components and digital systems. At step 2702 a strobe is requested. According to embodiments, this may be strobing of hazard lights that are also utilized for non-strobing flashing and/or may be signal/hazard lights or auxiliary or add-on lights. In some embodiments, at step 2704 it is determined (e.g., by a microprocessor or BCM) whether the request for strobing comes from an emergency system associated with the vehicle. This may be a vehicle telematic system or another device in communication with the BCM or microcontroller. Communication may occur by direct connection, via bus (e.g., CANBUS) by wireless protocol (e.g., Bluetooth) or another system. In some embodiments, if the request is from an automated or emergency system, strobing may immediately be deployed as shown at step 2714.

In some cases, if the request does not come from an automatic or emergency system as determined at step 2704, it may be determined at step 2706 whether the vehicles is travelling below a threshold speed or is stopped. This may be based on information from a vehicle speedometer, GPS, accelerometers, or other sensors. If the vehicle is stopped or moving below a threshold speed strobing may be activated at step 2714. Otherwise, further analysis may be conducted.

At step 2708, for example, it may be determined whether ABS was recently deployed, which could be indicative of a situation calling for strobing. If not, further analysis may ensue. In some cases, a BCM or other microcontroller may be able to determine that an emergency contact was recently made (e.g., to police, fire, EMS) at step 2710. This step may be conducted by querying or otherwise receiving data from a vehicle telematics system or other automated system. The determination at step 2710 may be multi-layered to consider a number of factors including which type or service has been contacted (e.g., police, fire, roadside assist) and other factors. If the emergency service contact warrants, strobing may be effected at step 2714. If not, consideration may be given at step 2712 to whether an auto-drive system is deployed at present. This might include auto-park, cruise-control, auto-pilot or the like. In such case, strobing may be disabled and the vehicle (via the BCM or other control device) may flash at step 2716 instead of strobe. Further, a message may be displayed at step 2718 (e.g., on a dashboard, display screen, or other location) indicating that strobing is not active.

It will be appreciated that a control program a represented by flow chart 2700 may be useful to reduce or eliminate "nuisance" activation of a strobe system. However, if it cannot be determined that the strobe request was likely an error or nuisance activation, erring on the side of caution, the strobe may be allowed at step 2714. It will be appreciated that the order of testing may not be as shown in chart 2700, and that more or fewer tests may be required before strobing is allowed. However, given the speed of processors and BCMs in modern vehicles, the entire decision tree may be traversed in such short order as to be imperceptible to the user such that strobing will begin very quickly to provide all the associated safety and communication benefits associated therewith.

Figure 28:
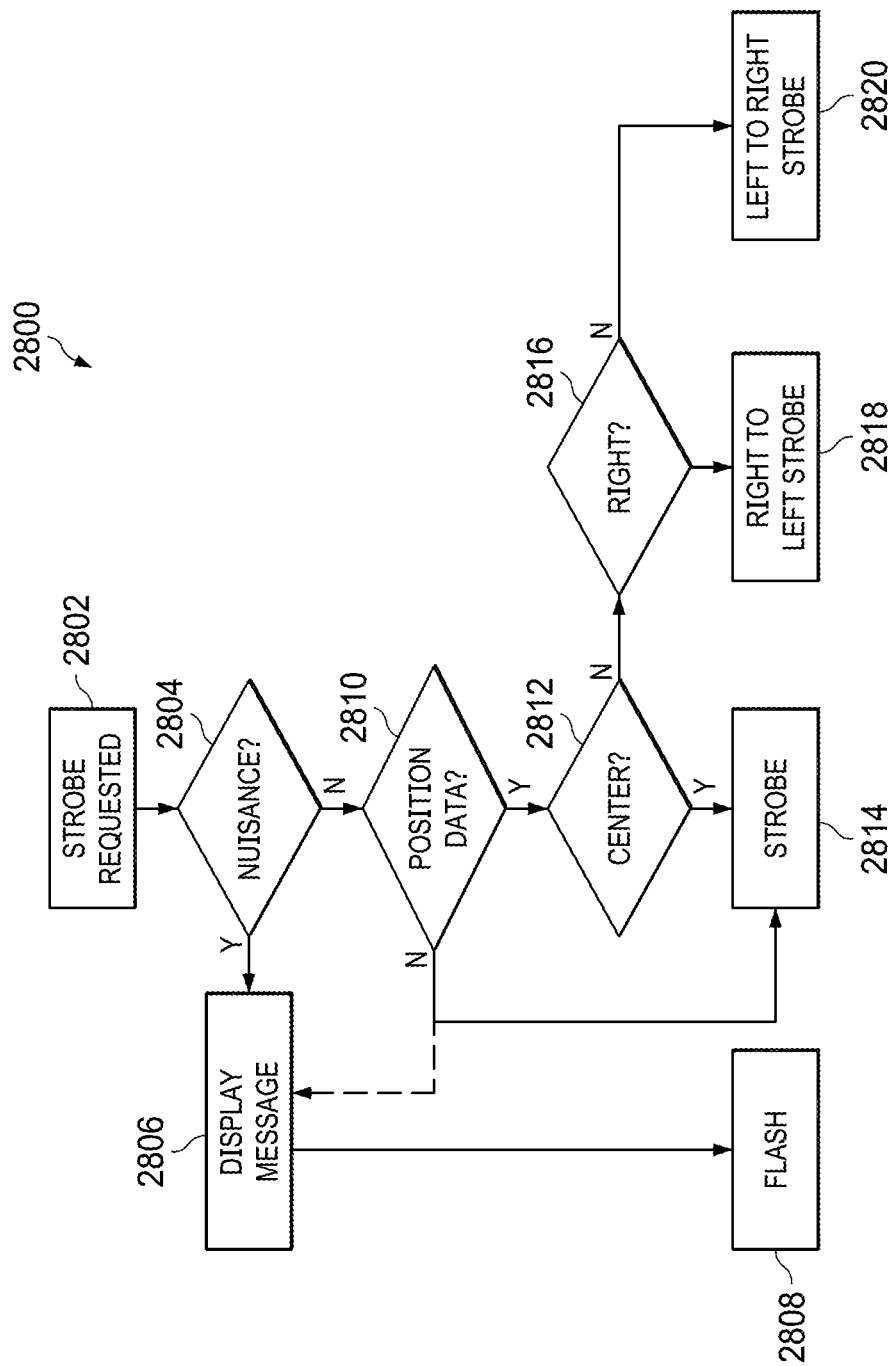
FIG. 28 is a flow chart depicting one embodiment of a method for deployment of directional strobing according to aspects of the present disclosure.

Referring now to FIG. 28 is a flow chart 2800 depicting one embodiment of a method for deployment of directional strobing according to aspects of the present disclosure is shown. The flow chart 2800 may be suitable for implementation of various embodiments of systems and device according to the present disclosure. Such systems have capacity for implementation of the decision and logic represented by the flow chart 2800 by microprocessor, BCM, and/or combinations of various analog components and digital systems. As shown in chart 2800, directional strobing may be implemented automatically to increase utility, safety, and capacity to communicate for systems of the present disclosure. However, it should be understood that directional strobing might also be implemented manually (e.g., as described above).

At step 2802 a strobe is requested. This could be a manual or automate requested (e.g., from another system on a CANBUS or other electronic communication system). At step 2804 it may be determined whether the request is likely to be a nuisance request (for example, utilizing a decision tree as depicted in FIG. 27). If it is, a message may be displayed at step 2806 and normal low-speed flashing may be deployed as shown at step 2808. At step 2810, a determination may be made (e.g., by the controller or BCM) as to whether position information for the vehicle is available. This may be from GPS, camera, accelerometer or other data. If such information is not available (e.g., due to sensor failure, inability to resolve, or any other reason) non-directional strobing may occur as shown at step 2814. Alternatively, the system may be arranged such that a message is displayed at step 2806 indicating lack of location resolution, followed by flashing, rather than strobing, at step 2808.

It should be understood that, in the present context, position data refers to where a vehicle is located in relation to a roadway, lane, or other relevant traffic way and/or how it is oriented. For example, position information may convey whether the vehicle is on a left or right shoulder of a roadway, whether the vehicle is facing the right way in traffic, whether it is in an intersection, whether it is right side-up, whether it has left the roadway, and/or other information.

At step 2812 if it is determined from the position information that the vehicle is centered, for example, a non-directional strobe may occur at step 2814. A centered vehicle would indicate that the vehicle is in the center of a roadway, intersection, or the like, and not closer to one side or the other or on the shoulder. In such case, the most useful course of action may be to strobe lights on all corners of the vehicle as a general warning of the hazard. A vehicle may also be deemed to be centered if GPS or other data indicates that the vehicle has completely left any roadway. In this case, the most useful course of action may be to strobe as an aid in locating the vehicle or to warn other drivers in general of a possible hazard.

If it is not determined that the vehicle is centered, a determination may be made as to whether the vehicle is positioned rightward at step 2816. This would be rightward with respect to oncoming traffic, so consideration may be given to whether the vehicle is facing the wrong direction relative to other vehicles (in such case, the vehicle's right may be traffic left and vice versa). In some embodiments, the intention is to signal the hazard or distress while also providing a maximum of visual communication. Thus the vehicle lighting system may be made to strobe so as to indicate to traffic which way to move to avoid the distressed vehicle. If the vehicle is determined at step 2816 to be oriented "right" relative to traffic (regardless of the way it is facing) a right to left strobe may be deployed at step 2818. In this manner, traffic approaching most closely to the distressed vehicle can be guided in an appropriate direction to avoid the distressed vehicle.

A positive determination can also be made as to whether a vehicle is oriented "left". However, it may be that if a vehicle is not centered (step 2812) and not right (step 2816) it may be assumed to be left, and a left to right strobe may be deployed at step 2820. Again, this provides the most useful information to other vehicles approaching the distressed vehicle. A vehicle disabled or distressed on the left side of a roadway should indicate to move right, while a vehicle disabled or distressed on the right side of a roadway should indicate to move left.

Figure 29:
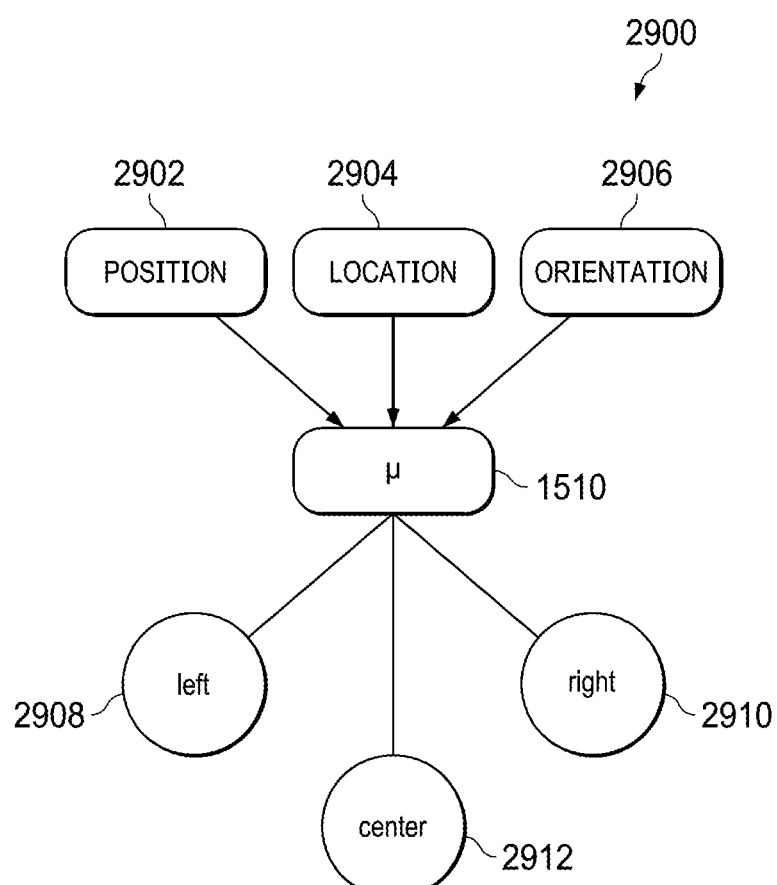
FIG. 29 is a relational diagram showing data inputs to determine strobe direction according to aspects of the present disclosure.

FIG. 29 illustrates a logical relation between data that may be used by a BCM 1510 or other microcontroller to arrive at a conclusion of whether a vehicle is left 2908, right 2910, or centered 2912. Position information 2902, location information 2904, vehicle orientation information 2906, as well as other information may all be utilized by a BCM 1510 or other microprocessor. Conflicting information may be weighted as desired for maximum safety or utility. For example, a disoriented (e.g., upside down) vehicle may always result in a center strobe determination as shown at 2912. Position (e.g., direction facing) 2902 may be considered along with location 2904 and orientation 2906 (e.g., vehicle is not inverted) to determine whether left 2908 or right 2910 strobing is activated.

Figure 30:
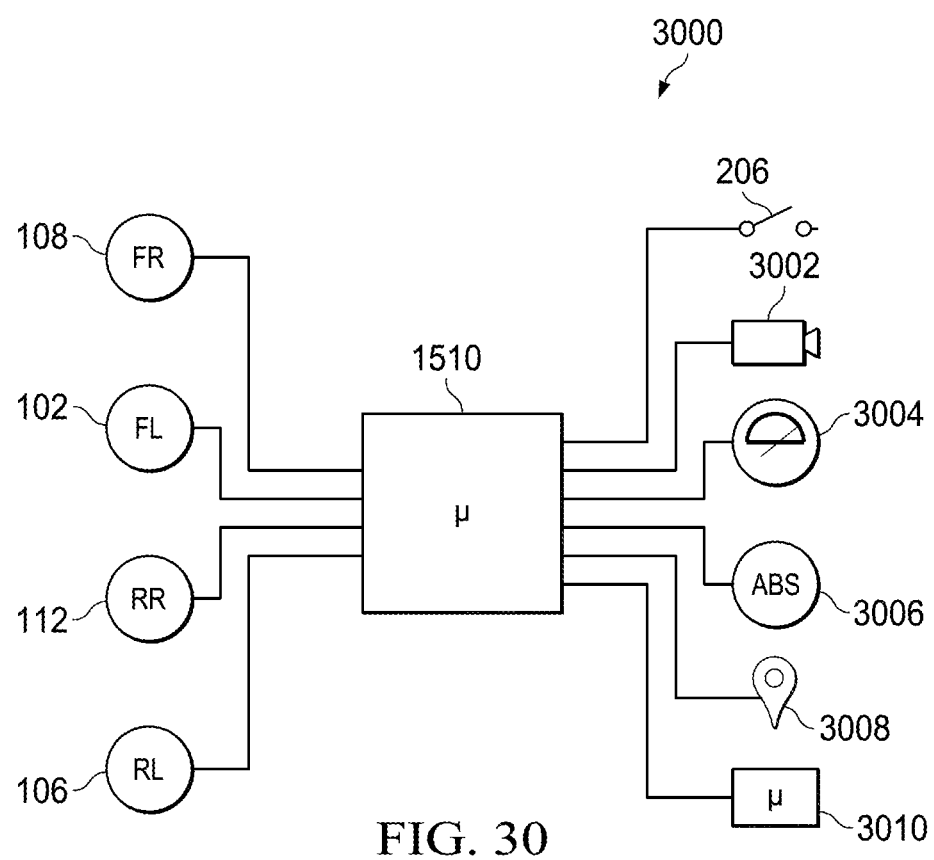
FIG. 30 is a simplified schematic diagram illustrating relationships between a BCM, hazard lamps, and sensor array according to aspects of the present disclosure.

FIG. 30 illustrates, at a high level, a relationship between components in systems of the present disclosure deploying directional and/or nuisance control according to the control logic above. However, FIG. 30 should not be consider limiting, as direction and nuisance control is operable with other systems described here throughout and that may be devised based on these and others. The microcontroller or BCM 1510 has operational control over front right signal lamps or lights 108, front left lights 102, rear right lights 112, rear left lights 106, and possibly others (such as HCMSL or auxiliary lights). The BCM 1510 may ultimately determine, based on control processes as described herein, or others, how to implement strobing or flashing of the various lights based on input or data from switches such as hazard switch 206 (and possible auxiliary or strobe switches), cameras 3002 (e.g., forward, rearward, or side facing cameras that may also be used for autopilot, auto park, cruise controls, etc.). Radar data (not shown) may also be used. Speedometer from a speedometer 3004 may be used. An ABS system 3006 and/or GPS system 3008 may also provide data. A microcontroller 3010 represents any additional system that may be associated with the vehicle, or otherwise have relevant data, that can be provided by any means to the BCM 1510.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
    a microcontroller having operational control over a set of vehicle lights corresponding to left and right sides of the vehicle, the set of vehicle lights being placed on a vehicle for signaling outside the vehicle both forward and rearward of the vehicle;
    a plurality of sensors associated with the vehicle and configured to provide data to the microcontroller indicative of whether the vehicle is nearer the left or right side of a roadway on which the vehicle was travelling;
    wherein, when the microcontroller receives a request to strobe lights associated with the vehicle it strobes the set of vehicles light from right to left if the vehicle is within a first predetermined distance of a right side of the roadway at least when the vehicle is stopped; and
    wherein, when the microcontroller receives a request to strobe lights associated with the vehicle it strobes the set of vehicle lights from left to right if the vehicle is within a second predetermined distance of a left side of the roadway at least when the vehicle is stopped.

2. The system of claim 1, wherein when the microcontroller receives a request to strobe lights associated with the vehicle it strobes the set of vehicle lights in a non-directional manner if the vehicle is outside of a third predetermined distance of the right or left sides of the roadway.

3. The system of claim 2, wherein the plurality of sensors includes a GPS sensor.

4. The system of claim 2, wherein the plurality of sensors includes a camera.

5. The system of claim 2, further comprising a sensor in communication with the microcontroller indicating whether the vehicle is facing an incorrect direction on the roadway.

6. The system of claim 5, wherein the sensor in communication with the microcontroller indicating whether the vehicle is facing an incorrect direction on the roadway comprises an accelerometer.

7. The system of claim 5, wherein the sensor in communication with the microcontroller indicating whether the vehicle is facing an incorrect direction on the roadway comprises a compass.

8. The system of claim 5, wherein the sensor in communication with the microcontroller indicating whether the vehicle is facing an incorrect direction on the roadway comprises a camera.

9. The system of claim 5, wherein the sensor in communication with the microcontroller indicating whether the vehicle is facing an incorrect direction on the roadway comprises a radar.

\* \* \* \* \*